US011297478B2

(12) United States Patent
Yadav

(10) Patent No.: US 11,297,478 B2
(45) Date of Patent: Apr. 5, 2022

(54) REAL-TIME, CROWD-SOURCED, GEO-LOCATION BASED SYSTEM FOR ENHANCING PERSONAL SAFETY

(71) Applicant: Marshalla Yadav, Sandy Springs, GA (US)

(72) Inventor: Marshalla Yadav, Sandy Springs, GA (US)

(*) Notice: Subject to any disclaimer, the term of this patent is extended or adjusted under 35 U.S.C. 154(b) by 0 days.

(21) Appl. No.: 16/852,772

(22) Filed: Apr. 20, 2020

(65) Prior Publication Data

US 2021/0067940 A1 Mar. 4, 2021

Related U.S. Application Data

(63) Continuation of application No. 16/050,348, filed on Jul. 31, 2018, now Pat. No. 10,631,156, which is a
(Continued)

(51) Int. Cl.
*H04M 11/04* (2006.01)
*H04W 4/90* (2018.01)
(Continued)

(52) U.S. Cl.
CPC .............. *H04W 4/90* (2018.02); *G01C 21/20* (2013.01); *G01C 21/3407* (2013.01);
(Continued)

(58) Field of Classification Search
USPC .............. 340/539.13; 342/357.09; 455/456.1
See application file for complete search history.

(56) References Cited

U.S. PATENT DOCUMENTS 6,888,464 B1 * 5/2005 Maloney ............ G08B 21/0269
340/539.1
7,911,334 B2 3/2011 Busey
(Continued)

FOREIGN PATENT DOCUMENTS

JP 07058689 A 3/1995

OTHER PUBLICATIONS

First Examination Report dated Nov. 5, 2020 from related IN application No. 201647042430, 10 pages.
(Continued)

*Primary Examiner* — David Q Nguyen
(74) *Attorney, Agent, or Firm* — Meunier Carlin & Curfman LLC

(57) ABSTRACT

The disclosure describes a crowd-sourced, social network and geo-location based system for enhancing personal safety via users' mobile devices. The system shares information (including images, video, and/or audio) about crimes, fires, accidents and public safety-related events and their geo-locations. Users selectively receive notifications for such events in a map view based on the events' proximity to users or on whether the notification was initiated by a person in the users' social network. The system also shares users' status and geo-location information with previously identified persons or with all persons in their social network to let them know their geo-location and/or when they have reached a destination. Through the system's operation, a user can cause sending of a distress signal to pre-identified persons, groups within their social network, or others who are within a pre-established distance. Additionally, the system can send a distress signal if the user fails to check in.

8 Claims, 77 Drawing Sheets

Related U.S. Application Data continuation of application No. 15/349,152, filed on Nov. 11, 2016, now abandoned, which is a continuation of application No. 14/276,880, filed on May 13, 2014, now Pat. No. 9,503,873, said application No. 15/349,152 is a continuation of application No. PCT/US2015/030671, filed on May 13, 2015, which is a continuation-in-part of application No. 14/276,880, filed on May 13, 2014, now Pat. No. 9,503,873.

(60) Provisional application No. 61/855,372, filed on May 14, 2013.

(51) Int. Cl.

| | | |
|---|---|---|
| *H04W 4/21* | (2018.01) | |
| *H04W 4/024* | (2018.01) | |
| *H04W 4/02* | (2018.01) | |
| *H04W 4/08* | (2009.01) | |
| *G01C 21/20* | (2006.01) | |
| *G01C 21/34* | (2006.01) | |
| *G01C 21/36* | (2006.01) | |
| *H04W 4/12* | (2009.01) | |

(52) U.S. Cl.
CPC ..... *G01C 21/3461* (2013.01); *G01C 21/3629* (2013.01); *G01C 21/3667* (2013.01); *H04W 4/023* (2013.01); *H04W 4/024* (2018.02); *H04W 4/08* (2013.01); *H04W 4/12* (2013.01); *H04W 4/21* (2018.02)

(56) References Cited

U.S. PATENT DOCUMENTS

| | | | |
|---|---|---|---|
| 8,024,111 B1 | 9/2011 | Meadows et al. | |
| 8,441,367 B1 | 5/2013 | Lee et al. | |
| 8,538,374 B1 | 9/2013 | Haimo et al. | |
| 8,559,975 B2* | 10/2013 | Lin | G01S 5/021 |
| | | | 455/456.1 |
| 8,606,517 B1 | 12/2013 | Ehrlacher et al. | |
| 2001/0009407 A1* | 7/2001 | Honda | G08B 25/016 |
| | | | 342/357.4 |
| 2001/0029506 A1* | 10/2001 | Lee | G06F 16/951 |
| 2006/0095344 A1 | 5/2006 | Nakfoor | |
| 2006/0187027 A1* | 8/2006 | Smith | G08G 1/207 |
| | | | 340/539.13 |
| 2007/0156692 A1* | 7/2007 | Rosewarne | G06F 16/95 |
| 2009/0098850 A1* | 4/2009 | Deaton | H04Q 3/0079 |
| | | | 455/404.1 |
| 2009/0157467 A1 | 6/2009 | Braxton | |
| 2009/0318121 A1 | 12/2009 | Marumoto | |
| 2010/0248681 A1* | 9/2010 | Phills | H04L 67/04 |
| | | | 455/404.2 |
| 2012/0171988 A1 | 7/2012 | Matsuo et al. | |
| 2013/0005294 A1 | 1/2013 | Levinson et al. | |
| 2013/0183924 A1 | 7/2013 | Saigh et al. | |
| 2013/0317868 A1 | 11/2013 | Diamond et al. | |
| 2014/0087780 A1 | 3/2014 | Abhyanker et al. | |
| 2014/0118140 A1* | 5/2014 | Amis | G08B 25/08 |
| | | | 340/539.13 |
| 2014/0164505 A1 | 6/2014 | Daly et al. | |
| 2014/0329486 A1* | 11/2014 | Choi | H04W 4/90 |
| | | | 455/404.1 |
| 2015/0147996 A1 | 5/2015 | Hobby et al. | |
| 2015/0230073 A1 | 8/2015 | Pandey et al. | |
| 2015/0281882 A1* | 10/2015 | Tomaszewski, Sr. | H04W 4/02 |
| | | | 340/539.13 |
| 2015/0301529 A1* | 10/2015 | Pillai | G08G 5/0069 |
| | | | 701/2 |

OTHER PUBLICATIONS

International Search Report for PCT/US2015/030671 dated Oct. 23, 2015.
Written Opinion of the International Searching Authority for PCT/US2015/030671 dated Oct. 23, 2015.
Notice of Allowance issued in U.S. Appl. No. 14/276,880, dated May 23, 2016.
Non Final Office Action issued in U.S. Appl. No. 14/276,880, dated Nov. 4, 2015.
Bright Autumn Sun (http://siren.org/2010/10/iphone-app-of-the-week-yelp/—Oct. 7, 2010), 3 pages.
Guardly (http://www.todaysiphone.com/2011 /06/app-review-guardly/—Jun. 9, 2011), 5 pages.
Mapperz (http://mapperz.blogspot.com/2011 /1 O/mapquest-mobile-flash-maps-api.html—Oct. 5, 2011), 3 pages.
Office Action dated Dec. 7, 2017, received in connection with European Application No. 15808932.6.
Extended European Search Report dated Nov. 27, 2017, received in connection with European Application No. 15808932.6.
Non Final Office Action issued in U.S. Appl. No. 15/349,152, dated Jan. 31, 2018.
Extended European Search Report issued for European Application No. 19177743.2, dated Jul. 4, 2019, 8 pages.

\* cited by examiner

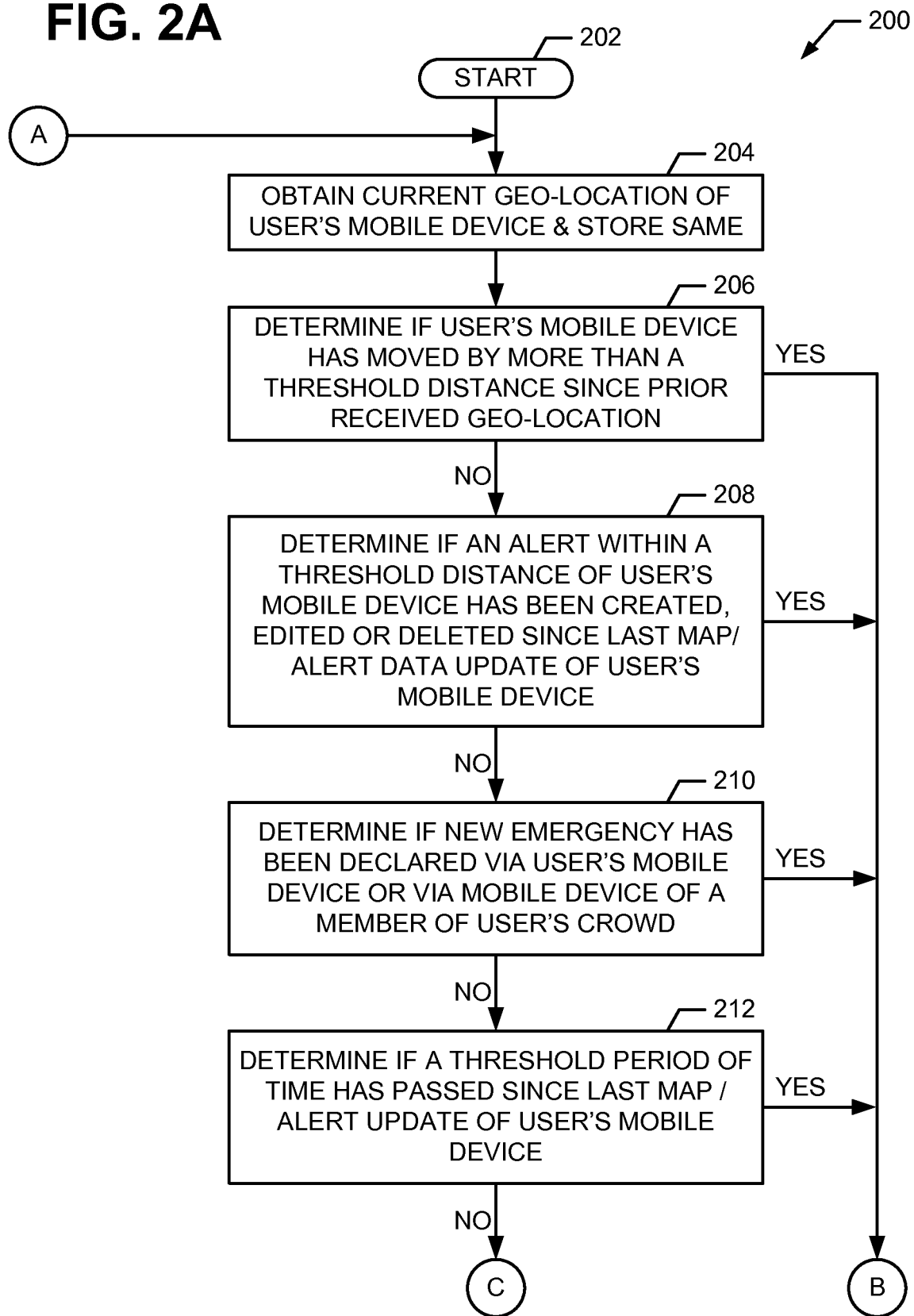

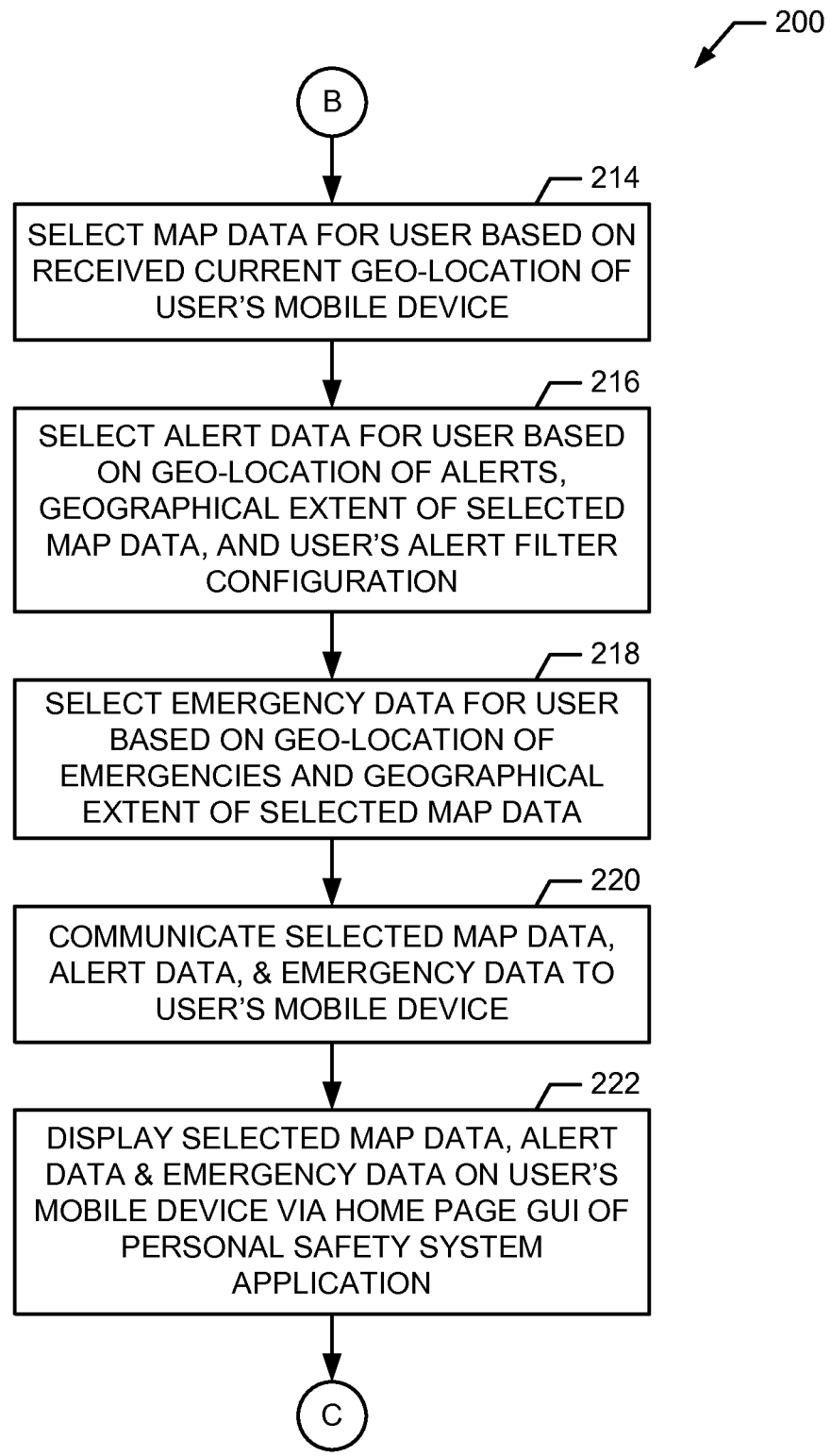

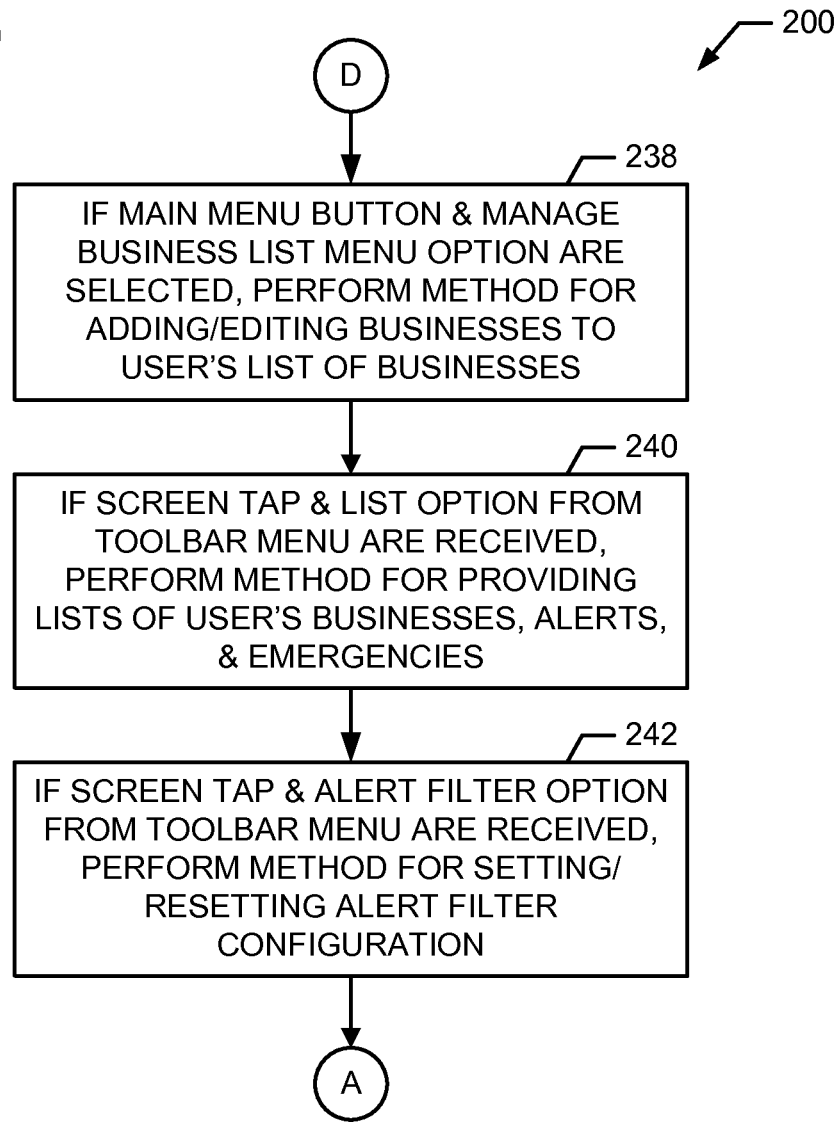

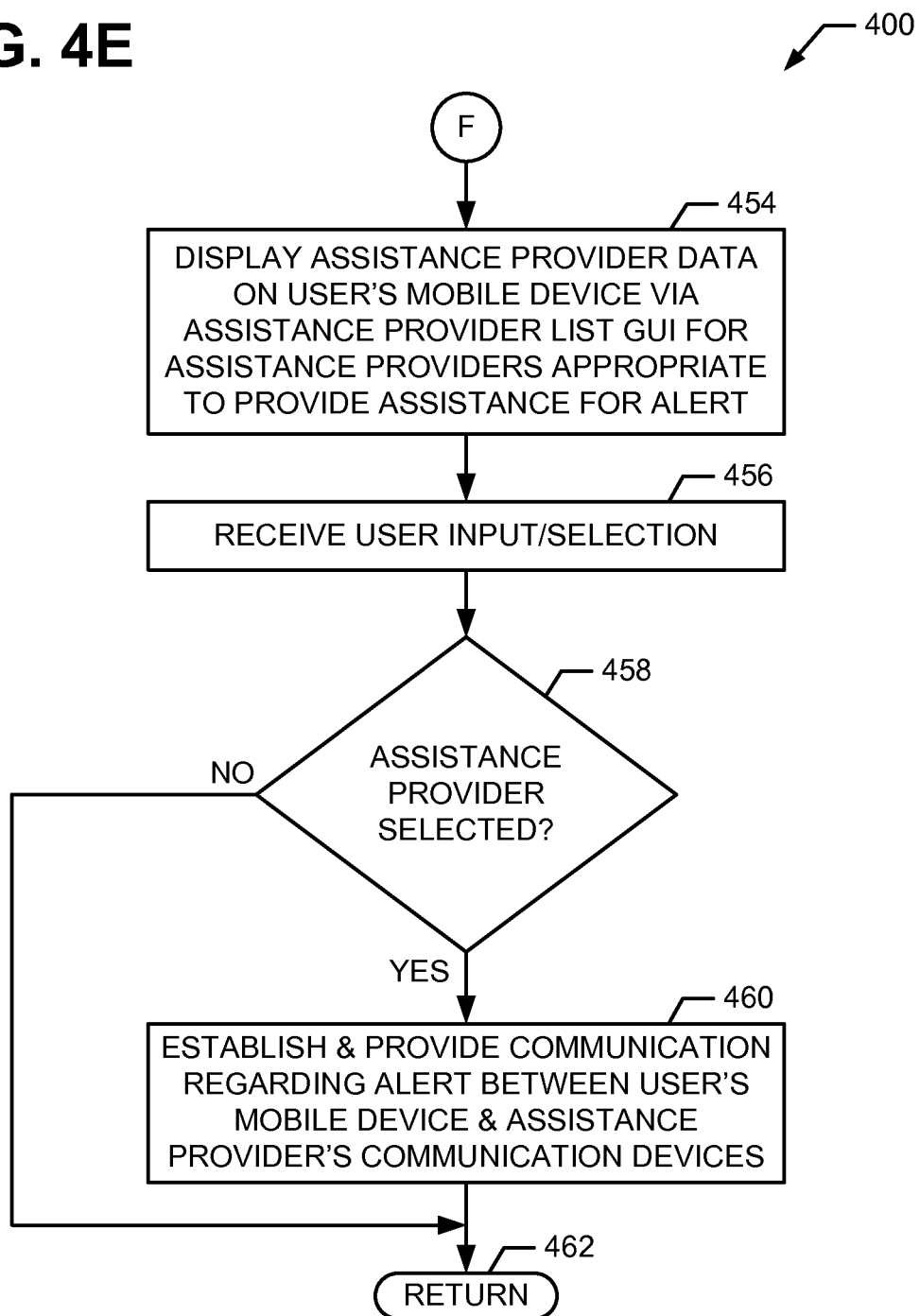

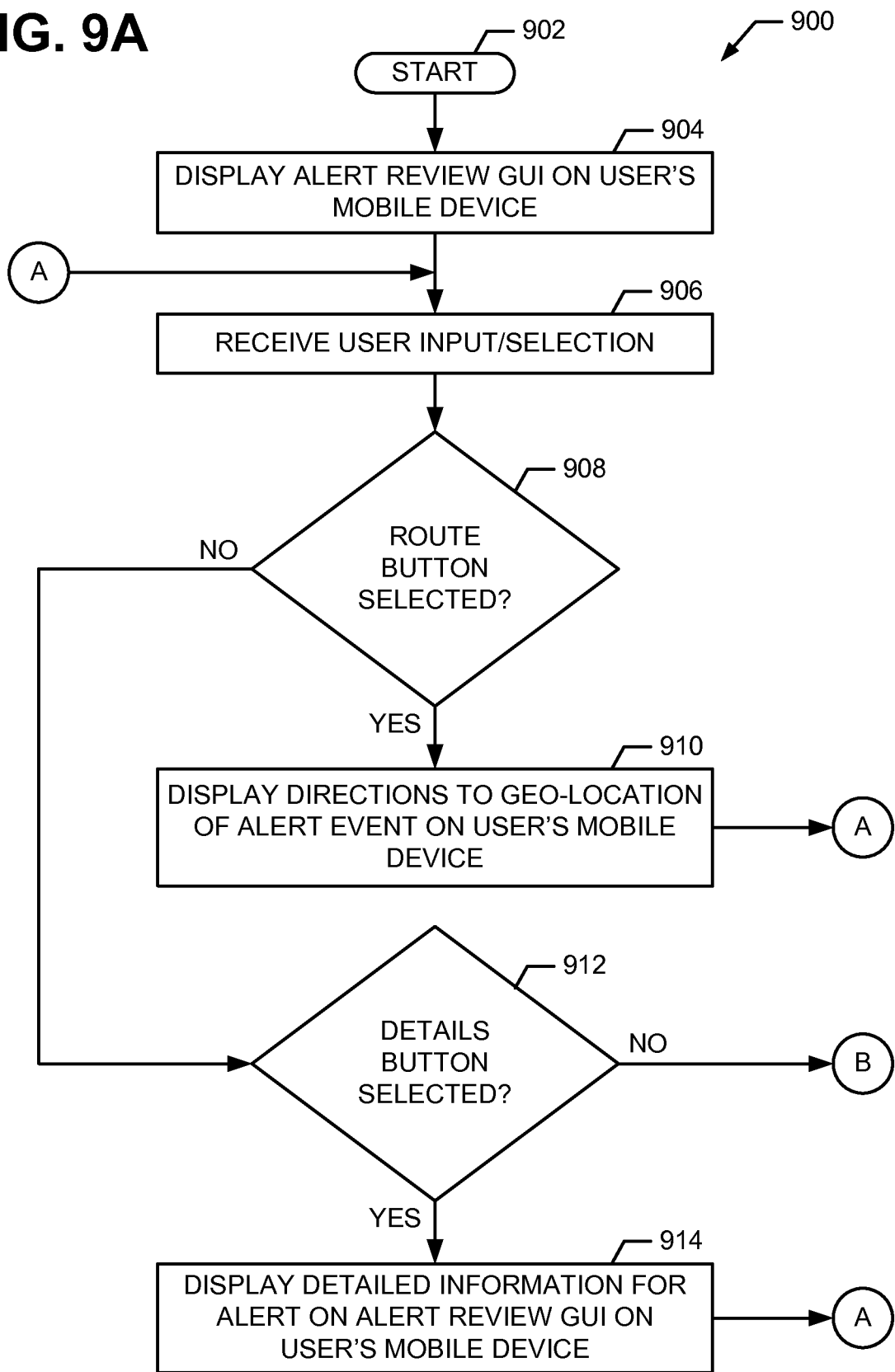

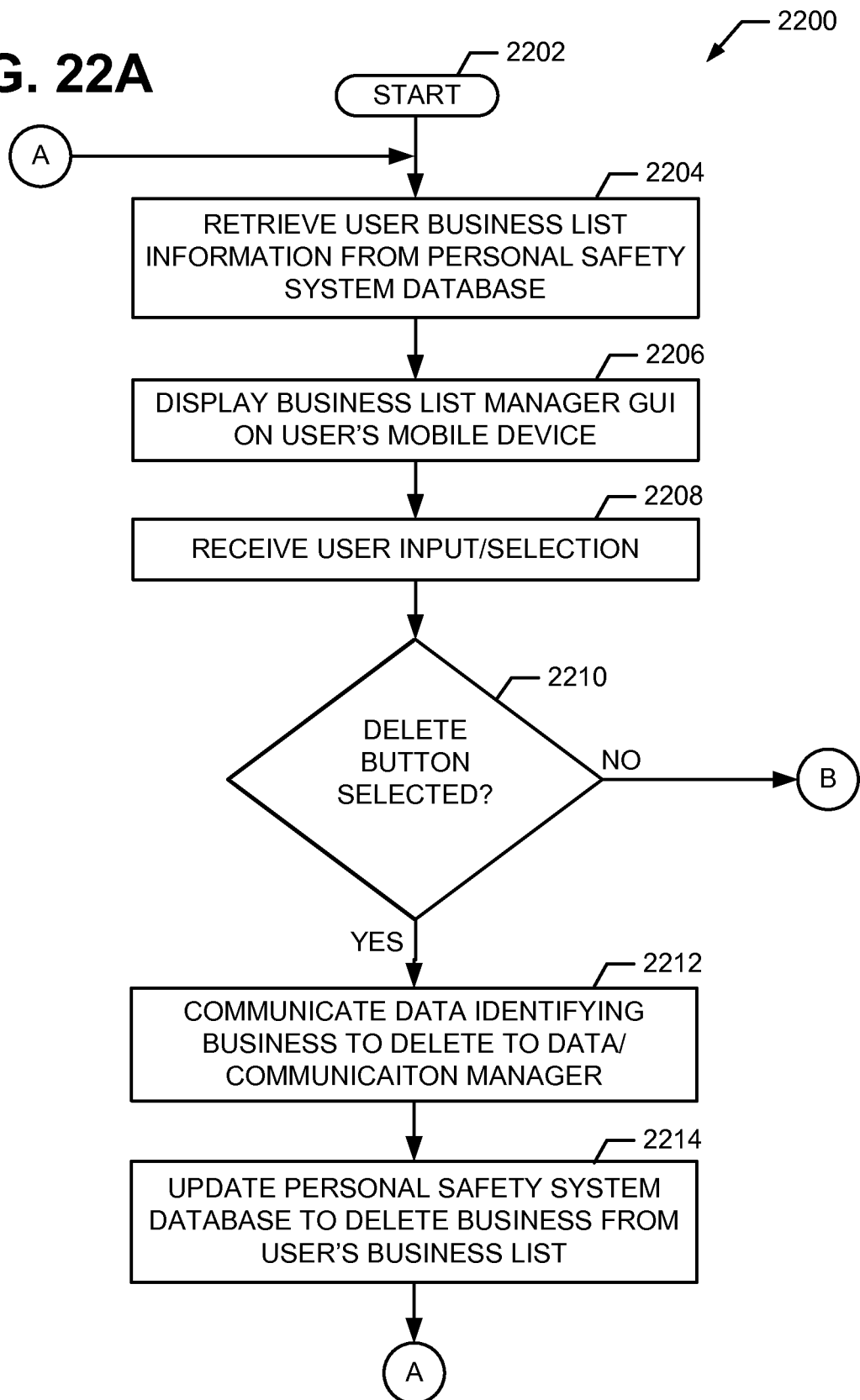

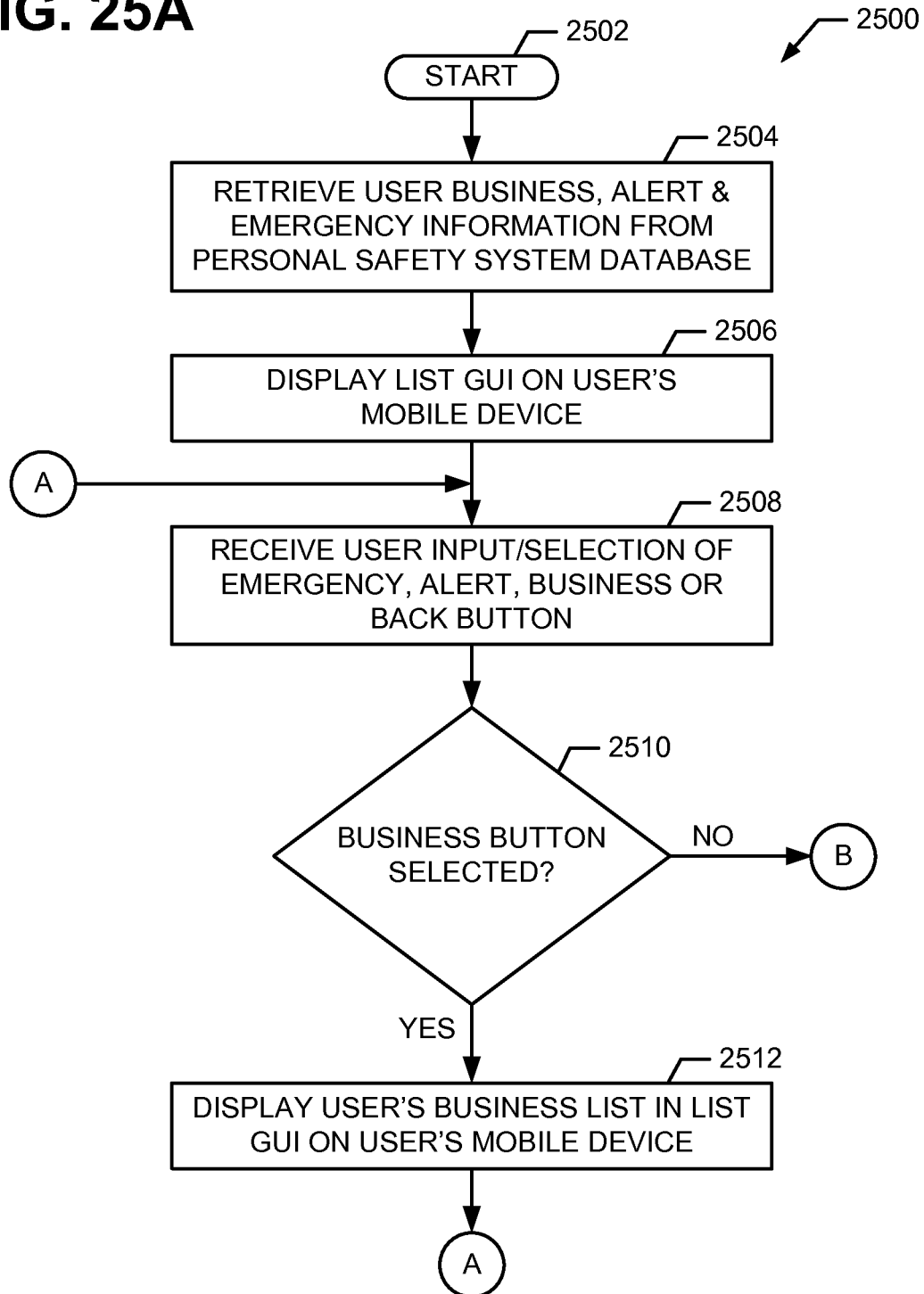

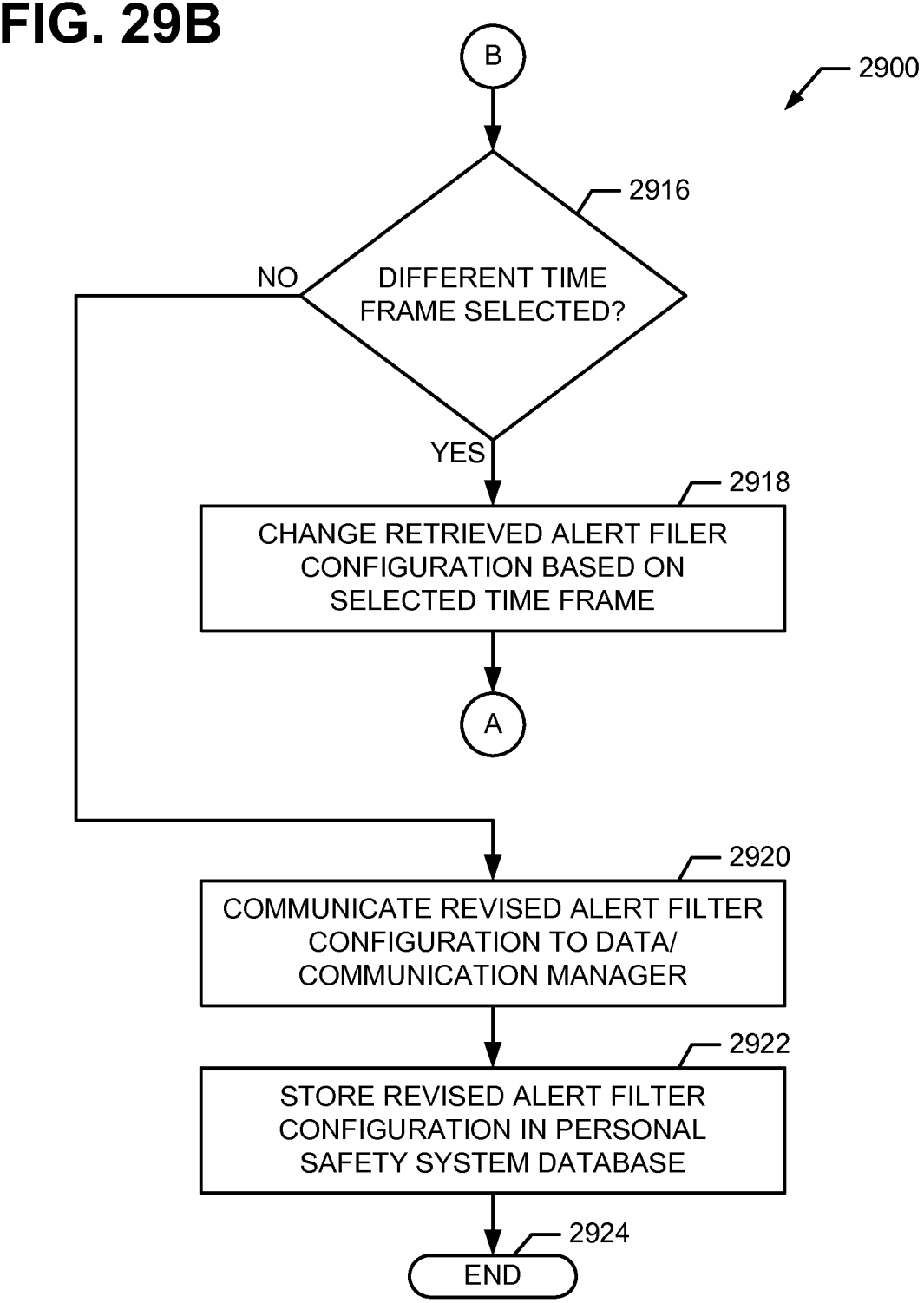

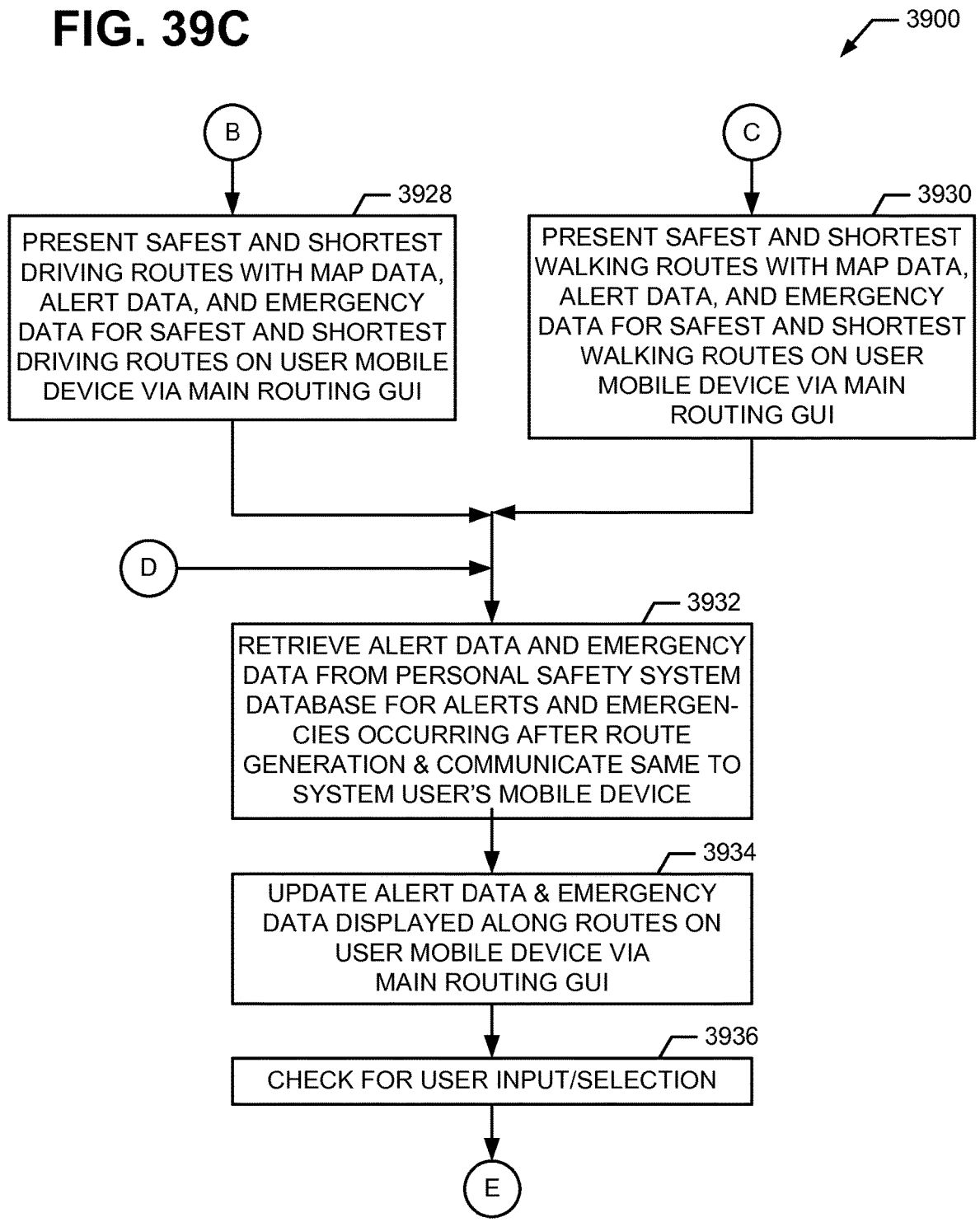

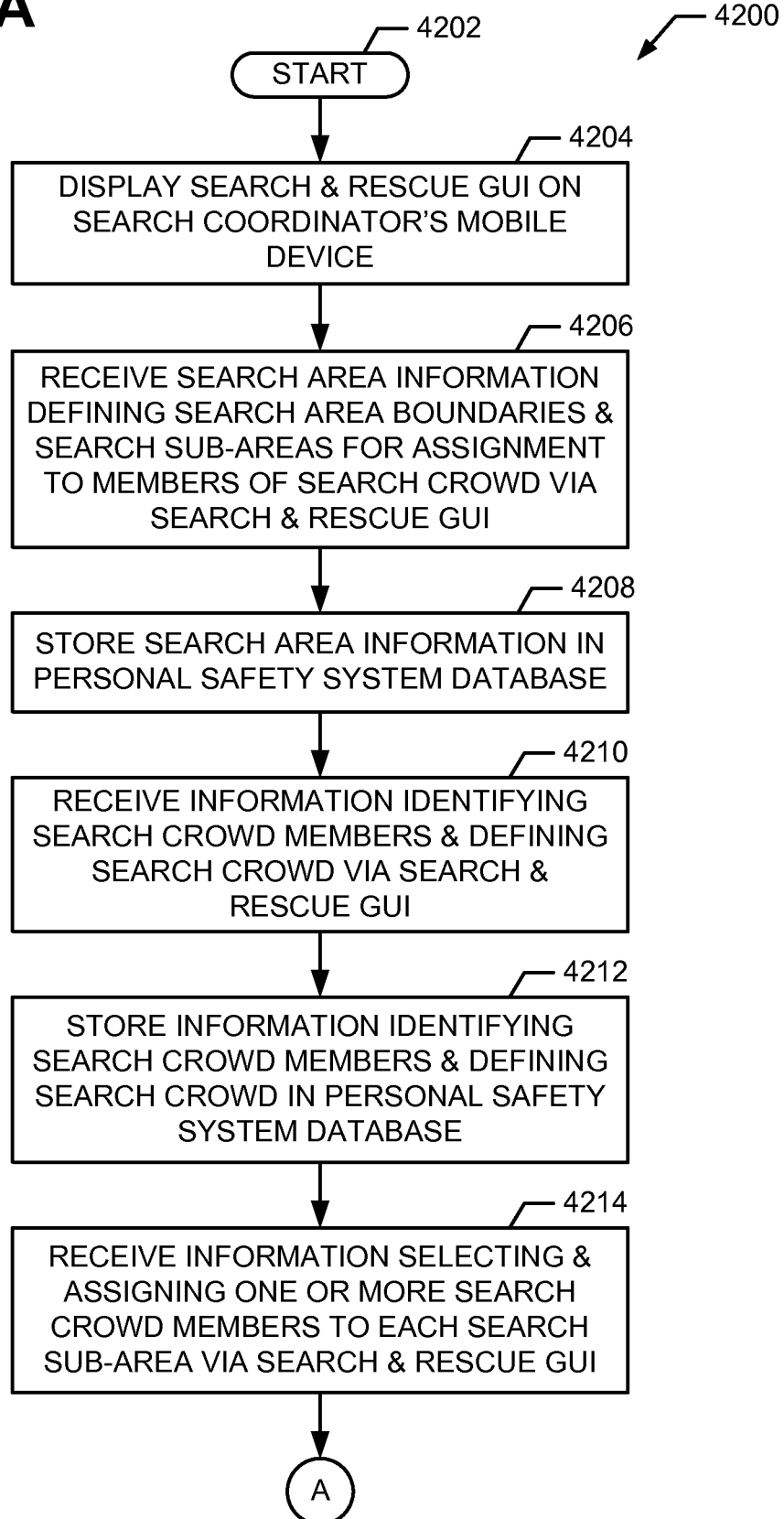

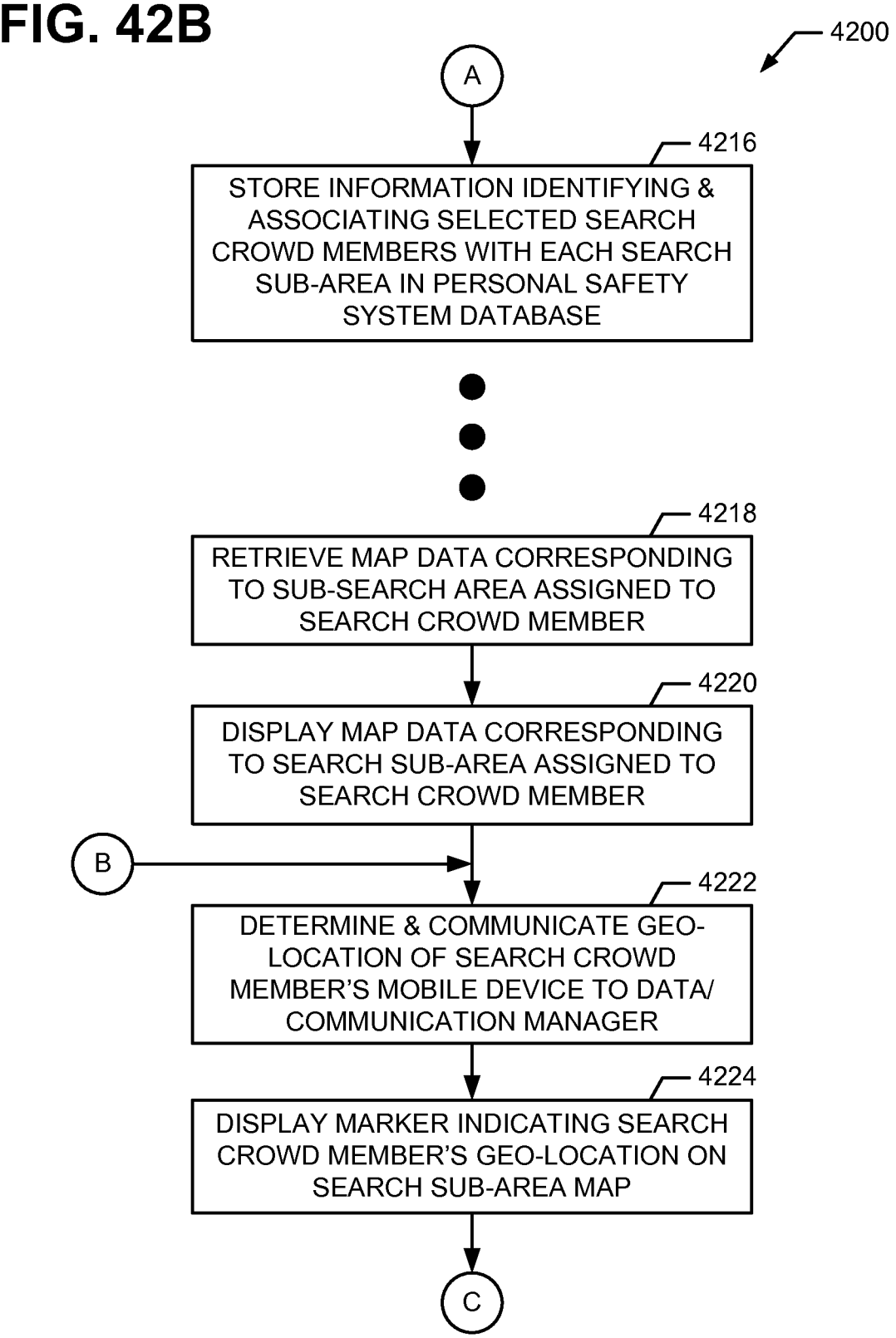

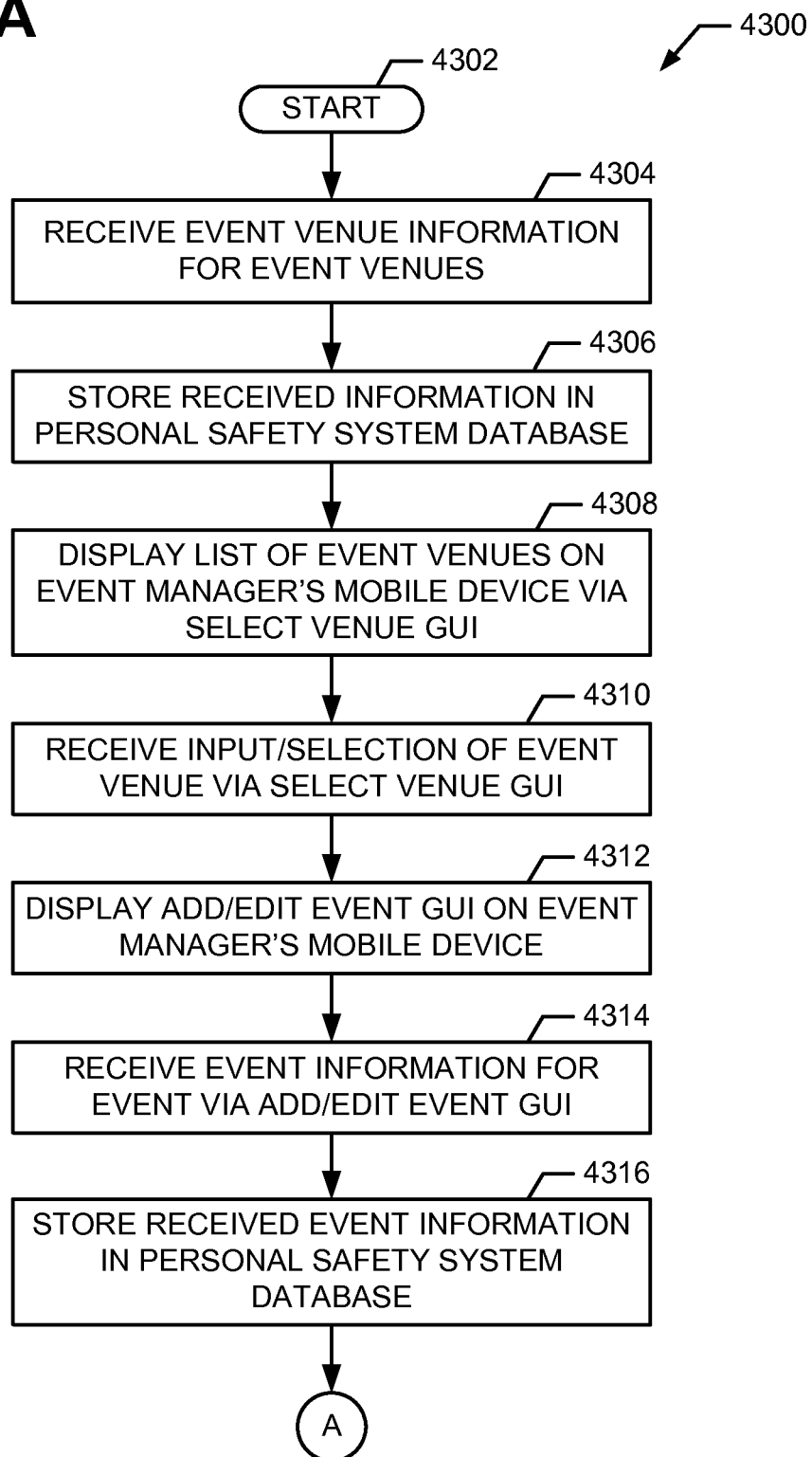

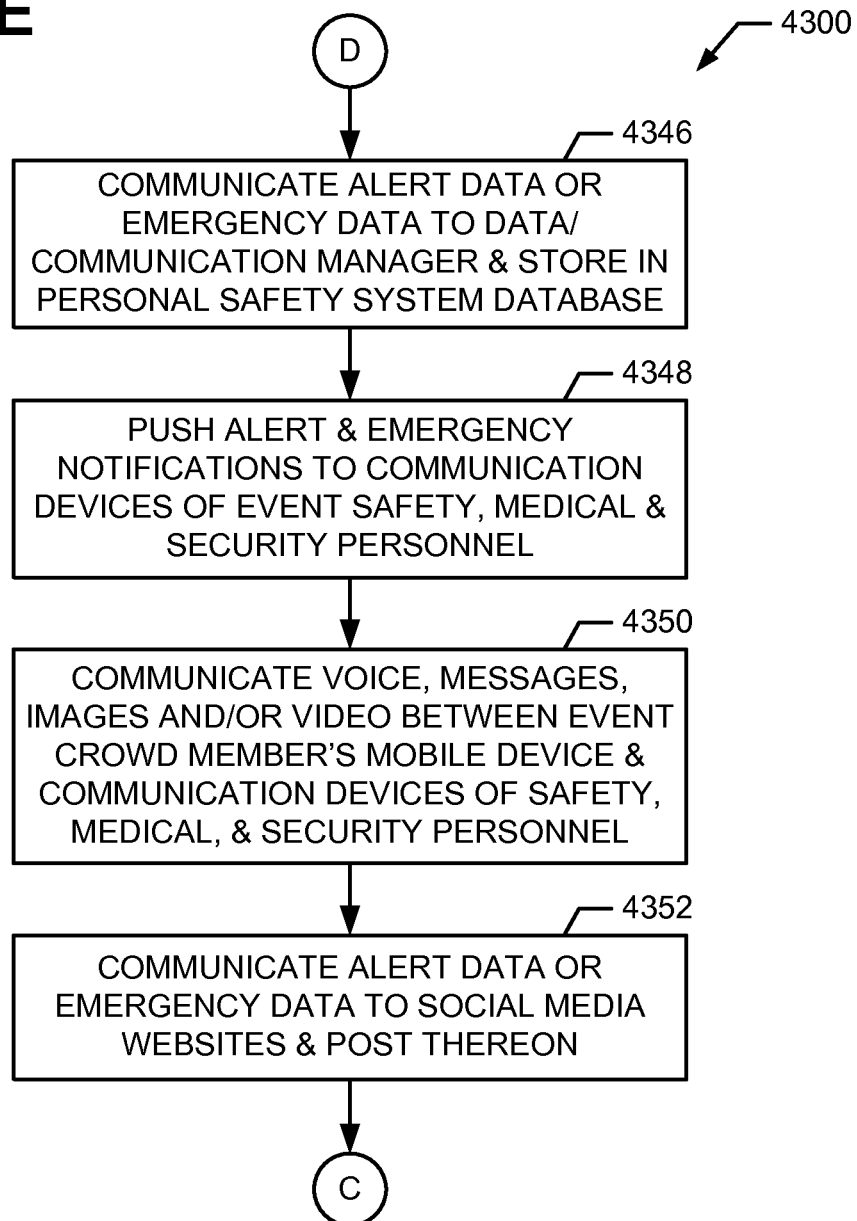

REAL-TIME, CROWD-SOURCED, GEO-LOCATION BASED SYSTEM FOR ENHANCING PERSONAL SAFETY

CROSS-REFERENCE TO RELATED APPLICATIONS

This application is a continuation of U.S. patent application Ser. No. 16/050,348, filed Jul. 31, 2018, and entitled "Real-Time, Crowd-Sourced, Geo-Location Based System for Enhancing Personal Safety," which is a continuation of U.S. patent application Ser. No. 15/349,152, filed Nov. 11, 2016, and entitled "Real-Time, Crowd-Sourced, Geo-Location Based System for Enhancing Personal Safety," which is a continuation of U.S. patent application Ser. No. 14/276,880, filed May 13, 2014, and entitled "Real-Time, Crowd-Sourced, Geo-Location Based System for Enhancing Personal Safety," now U.S. Pat. No. 9,503,873, which claims the benefit of U.S. provisional patent application No. 61/855,372, filed May 14, 2013, the disclosures of which are expressly incorporated herein by reference in their entireties. This application is a continuation of U.S. patent application Ser. No. 16/050,348, filed Jul. 31, 2018, and entitled "Real-Time, Crowd-Sourced, Geo-Location Based System for Enhancing Personal Safety," which is a continuation of U.S. patent application Ser. No. 15/349,152, filed Nov. 11, 2016, and entitled "Real-Time, Crowd-Sourced, Geo-Location Based System for Enhancing Personal Safety," which is a continuation of PCT/US2015/030671, filed May 13, 2015, and entitled "Real-Time, Crowd-Sourced, Geo-Location Based System for Enhancing Personal Safety," which claims the benefit of U.S. patent application Ser. No. 14/276,880, filed May 13, 2014, and entitled "Real-Time, Crowd-Sourced, Geo-Location Based System for Enhancing Personal Safety," now U.S. Pat. No. 9,503,873, the disclosures of which are expressly incorporated herein by reference in their entireties.

FIELD OF INVENTION

The present invention relates, generally, to the field of information technology, social network, and geo-location related systems, apparatuses, and methods for enhancing personal safety.

BACKGROUND

A person's level of safety at a particular instant in time is a function of numerous factors, some of which are within the control of the person and others which are outside the control of the person. Those factors within the control of the person include actions or inactions of the person that are often based on information available to or known by the person at the particular instant in time, an evaluation of such information and accompanying assessment of risk by the person using his/her personal knowledge and judgment, and decisions made by the person in light of such information, evaluation, and assessment of risk. Factors outside the control of the person include actions or inactions by other persons, and the occurrence of events that are man-made and non-man-made.

For example, a person desiring to get from one location to another may have a choice of walking or driving, each with its own risks. If the person chooses to walk, the person may be required to choose between a route along which there has been a number of attacks and/or robberies and a route along which there is substantial road and sidewalk construction and poor lighting conditions. If the person chooses to drive, the person may be required to choose between a route along which traffic accidents and gridlock are prevalent and a route that is substantially longer in distance and along which drenching rainstorms are prevalent with vehicles being often swept away by road flooding. In order to make a decision on whether to walk or drive and on which route minimizes risk and improves the person's level of safety while traveling, the person needs information related to each option at the particular instant in time that the person must make the decision. Thus, to make such a decision, the person needs real-time crime, road construction, lighting, traffic accident, weather, and other information that is geo-correlated relative to the routes that may be selected by the person. Unfortunately, such consolidated, geo-correlated information is not currently available or accessible through existing systems and methods in real-time based on the then current geographical location (or "geo-location") of the person.

Another factor determining a person's level of safety at a particular instant in time is the availability and accessibility of nearby assistance in the event of an emergency situation. A person's level of safety is higher when nearby assistance is readily available and accessible. Such assistance may be provided by governmental entities, by private businesses, or by other nearby persons. More particularly, such assistance may be provided by policemen, firemen, paramedics, roadside assistance personnel, vehicle towing businesses, vehicle repair businesses, home repair businesses, family members, close friends, good Samaritans, and others depending on the nature of the emergency. However, while assistance from governmental entities is sometimes available by phone via 911 or 511 services, obtaining such assistance often requires a person to interact with an emergency services operator and provide location information as to the person's whereabouts when the person may have no idea of exactly where they are. Also, while private businesses may be contacted by phone, a person requiring assistance may have to search for the phone numbers of such private businesses and does not generally know if they are nearby and, hence, able to provide immediate assistance. Similarly, while family members and close friends may be contacted by phone, a person needing assistance may not know if any of them are nearby. Additionally, a person requiring assistance may have no prior knowledge as to whether a private business or other assistance provider provides quality services.

Still another factor in determining a person's level of safety at a particular instant in time is the ability of family members and close friends to know the then current geo-location of the person. By knowing a person's geo-location, family members and close friends may be able to contact the person by phone and warn them of then-occurring events near their geo-location, thereby increasing their level of knowledge and, hence, of safety. Also, by knowing a person's location, family members and close friends may be able to adapt their own activities so as to be somewhat nearby in the event an emergency arises. Unfortunately, current systems and methods do not enable the real-time tracking and display of the then current geo-locations of a micro-crowd of family members and close friends on a portable device.

Therefore, there is a need in the personal safety industry for a system, apparatuses, and methods that enhance a person's safety by collecting and providing geo-correlated information related to man-made and natural events that may affect the person's safety, by making geo-correlated emergency assistance more readily available and accessible, by tracking and displaying the then current geo-locations of the members of a person's pre-defined micro-crowd, and, that resolves these and other difficulties, shortcomings, and problems with current systems, apparatuses, and methods.

SUMMARY

Broadly described, the present invention comprises a real-time, crowd-sourced, geo-location based system, including apparatuses and methods, for enhancing personal safety. In one aspect of the present invention found in an example embodiment, the system comprises a mobile device software application executed by the mobile devices of system users and a data/communication manager configured with manager software that together collect, use and distribute geo-correlated alert information pertaining to events such as, for example and not limitation, crimes, fires, weather, weather-related damage, traffic accidents, gridlocked traffic, construction, child disappearances, health infection occurrences, and other incidents. The "geo-correlated alert information" generally includes information identifying the event type, descriptive information about the event, and data defining the geographical location of the event. The data/communication manager receives and stores geo-correlated alert information for events input by system users via the mobile device software application and obtained from other sources including, but not limited to, governmental entities, private persons, websites, and social networking media such as Facebook® and Twitter®. Subsequently, the data/communication manager selects geo-correlated alert information proximate to and based on the then current respective geo-locations of system users in real-time and communicates the selected geo-correlated alert information to the users' mobile devices for display thereon via a map-like graphical user interface of the mobile device software application. Through such operation, the system provides system users with geo-correlated alert information that improves the users' knowledge of events transpiring in real-time near their then current geo-location and, hence, enhances the users' level of safety.

In another aspect of the present invention found in the example embodiment, the mobile device software application receives and communicates to the data/communication manager, information identifying persons who are grouped into "crowds" and "micro-crowds" of respective system users along with information enabling the system to communicate via phone, electronic mail, or message with members of such crowds and micro-crowds. The mobile device software application also provides a graphical user interface through which system users may declare the existence and type of an emergency at their respective geo-location and may upload related images, videos, and/or audio. In response to a user declaring an emergency, the data/communication manager automatically communicates an emergency notification with the user's then current geo-location to appropriate governmental assistance providers (generally via 911 or 511 service) to obtain appropriate police, fire, paramedic, or roadside assistance for the user. The data/communication manager also automatically communicates an emergency notification with the user's then current geo-location to members of the respective user's crowd and/or micro-crowd in accordance with directions previously specified by the user, and to non-members that the system determines are nearby so that such persons may provide assistance. When received by a crowd or micro-crowd member's mobile device, the mobile device software application displays the emergency notification, related information, and the geo-location thereof via a map-like, graphical user interface, thereby allowing the member to find and provide assistance to the user who declared the emergency. Additionally, the data/communication manager identifies non-governmental assistance providers near the location of the declared emergency that may be appropriate to provide assistance and communicates information about them (including, but not limited to, information received from other persons rating or ranking such assistance providers) to the user's mobile device for display via the system's mobile device software application based on their proximity to the user's then current geo-location. In addition, the data/communication manager communicates information about the emergency to the proximally geo-located assistance providers.

In still another aspect of the present invention found in the example embodiment, the system optionally requires that a system user's micro-crowd members check in with the system periodically or within a pre-established period of time. The system's mobile device software application provides a graphical user interface for use by micro-crowd members in doing so. If the data/communication manager does not receive a safety check-in from the mobile device software application on a micro-crowd member's mobile device as appropriate, the data/communication manager communicates a warning notification to the mobile device of the system user informing the user that a micro-crowd member has been tardy in checking in. By requiring micro-crowd members to check in with the system from time-to-time and communicating a warning notification if the micro-crowd members fail to check in, the system enhances the micro-crowd members' safety.

In still another aspect of the present invention found in the example embodiment, the system provides enhanced safety to system users attending an event at an event venue. The system associates such system users (for example, at the time of ticket purchase) in a group referred to as an "event crowd" with each system user being an "event crowd member". While event crowd members are at the event venue, the system tracks their geo-locations and provides geo-located information to them on a map of the event venue displayed, via the system's mobile device software, on the event crowd members' mobile devices. The geo-located information allows event crowd members to see their then current geo-location relative to event venue exits, emergency exits, security offices, medical/paramedic facilities, and other facilities and features of the event venue. The system also receives alerts and emergency notifications related to the event venue and causes display of the geo-locations of such alerts and emergencies, together with related alert and emergency information, to event crowd members via their mobile devices. Additionally, the system provides the geo-locations of and information related to possible assistance providers to event crowd members should an event crowd member require assistance.

In yet another aspect of the present invention found in the example embodiment, the system provides improved search and rescue capabilities that may be used to find a lost or missing person or article. The system associates system users in connection with a search for a lost or missing person or article in a "search crowd" and assigns each search crowd member to search a particular geographical sub-area of a larger geographical area of the search. The system tracks the geo-location of each search crowd member and causes display, via the search crowd member's mobile device, of such geo-location relative to a map of the member's assigned geographical sub-area and the boundaries thereof. The system alerts each search crowd member when he/she strays outside of his/her assigned geographical sub-area through audible and/or visual alerts provided by the member's mobile device. Also, the system causes the display, via the search crowd member's mobile device and relative to the map of the member's assigned geographical sub-area, of the portions of the geographical sub-area already searched by the member and not yet searched by the member. Additionally, the system provides information related to the progress of each search crowd member to the coordinator of the search.

Other uses, advantages and benefits of the present invention may become apparent upon reading and understanding the present specification when taken in conjunction with the appended drawings.

BRIEF DESCRIPTION OF THE DRAWINGS

FIGS. 2A-2D display a flowchart representation of a method of the personal safety system for displaying alert and emergency locations on a user's mobile device and for providing access to other system features via the user's mobile device.

FIGS. 4A-4E displays a flowchart representation of a method of the personal safety system for creating an alert for distribution or publication.

FIGS. 9A-9B display a flowchart representation of a method of the personal safety system for reviewing alert information.

FIGS. 22A-22C display a flowchart representation of a method of the personal safety system for adding/editing businesses to a system user's list of businesses.

FIGS. 25A-25B display a flowchart representation of a method of the personal safety system for providing lists of a system user's businesses, alerts, and emergencies.

FIGS. 29A-29B display a flowchart representation of a method of the personal safety system for setting/resetting an alert filter configuration.

FIGS. 39A-39E display a flowchart representation of a method of the personal safety system for generating and providing a safest route or shortest route between starting and ending locations.

FIGS. 42A-42D display a flowchart representation of a method of the personal safety system for searching for a missing person, animal, aircraft, vehicle, or item.

FIGS. 43A-43E display a flowchart representation of a method for enhancing the personal safety of persons attending or present at an event at an event venue.

DETAILED DESCRIPTION OF THE DRAWINGS AND EXAMPLE EMBODIMENT

Figure 1:
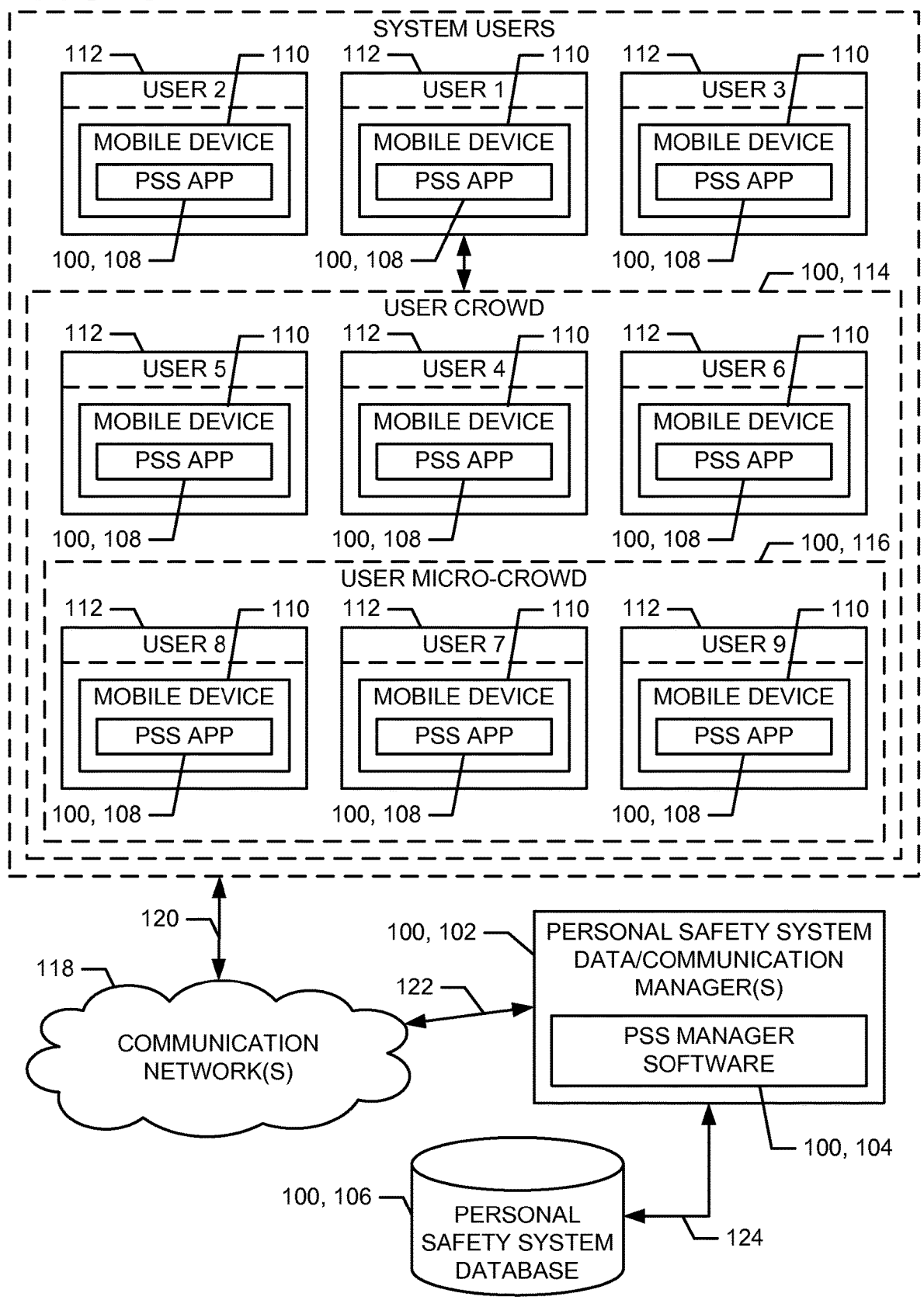
FIG. 1 displays a personal safety system for enhancing personal safety and an environment therefor in accordance with an example embodiment of the present invention.
Figure 2C:
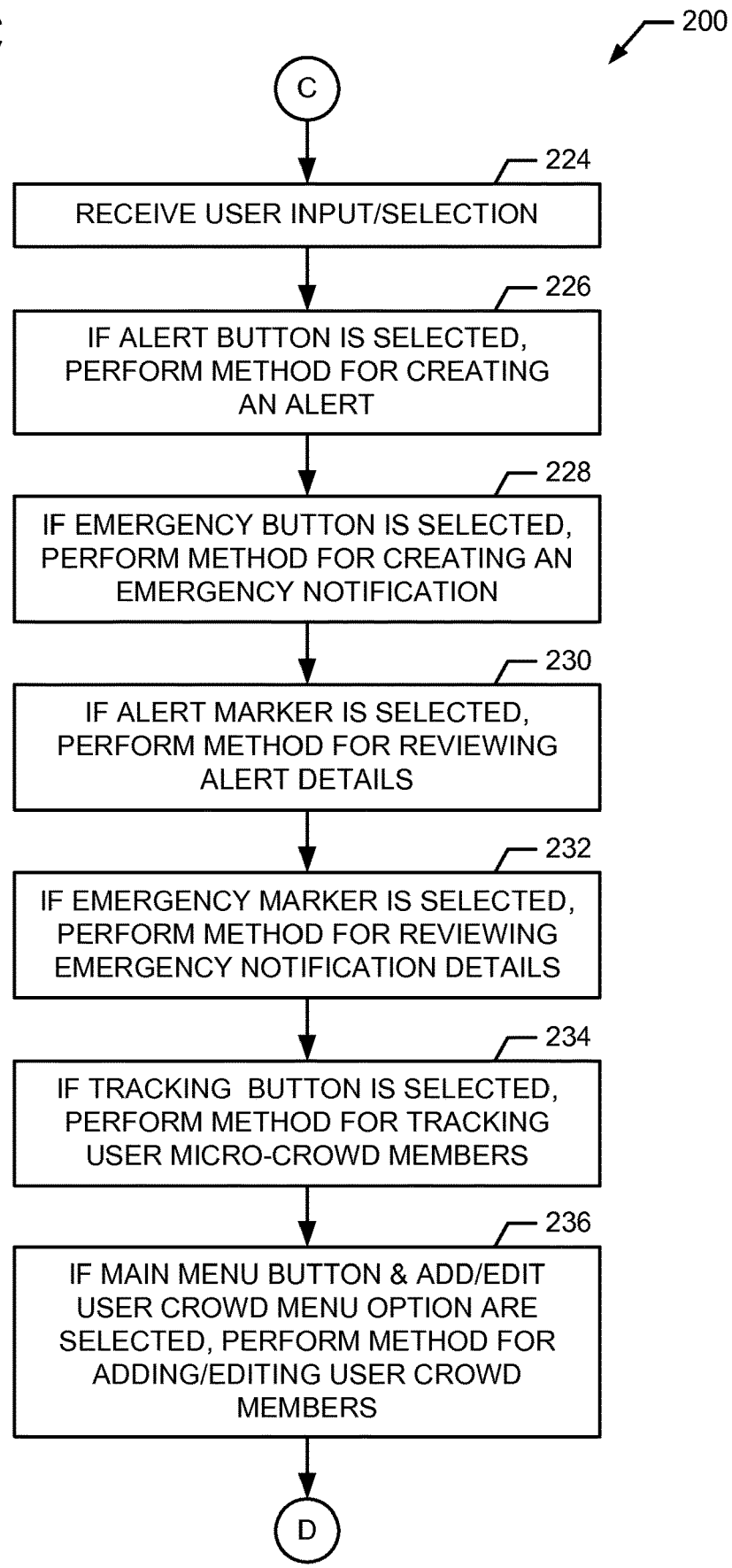

Referring now to the drawings in which like numeral represent like structures and steps throughout the several views, FIG. 1 displays a system for enhancing personal safety 100 and an environment therefor in accordance with an example embodiment. The system for enhancing personal safety 100 (also sometimes referred to herein as the "personal safety system 100" or "system 100") comprises one or more data/communication manager(s) 102, personal safety system manager software 104 that is executed by the one or more data/communication manager(s) 102, a personal safety system database 106 that stores personal safety system data (including, without limitation, information and/or data pertaining to system users 112 and their respective mobile devices 110, communication methods (such as phone, electronic mail, social networking, and messaging), alerts, emergencies, businesses and/or assistance providers, user crowds 114, user micro-crowds 116, map data, and other data), and a personal safety system application 108 (or "app 108") that is downloaded to and executed by mobile devices 110 of system users 112. Operating cooperatively together, the one or more data/communication manager(s) 102, personal safety system manager software 104, personal safety system database 106, and personal safety system application 108 provide the functionality described herein to enhance each system user's personal safety and, perhaps, the personal safety of other persons who may benefit from the system's operation and use by system users 112.

The personal safety system 100, upon receiving appropriate input, creates a "user crowd 114" (or "user group 114"). As used herein, the term "user crowd 114" (or "user group 114") refers to one or more system users 112 (sometimes referred to herein as "user crowd members" or "user group members") who are associated, within the system 100, with another system user 112 and, hence, with one another, and among which the personal safety system 100 distributes and shares "alerts" and informs of "emergencies" and with respect to which the system 100 shares other information and/or provides other functionality. Generally, the members of a user crowd 114 comprise system users 112 who are interested in receiving information shared by the system 100 and/or the functionality provided by the system 100, and may also be related as members of a family, neighborhood, community, social group, club, organization, event attendees, municipality, township, city, state, region, country, or other group having one or more common interests or characteristics. While not shown in FIG. 1, each system user 112 may be a member of a user crowd 114 of one or more other system users 112.

The number of persons in a user crowd 114 is not limited and may depend on how the personal safety system 100 is being used. For example, when the personal safety system 100 is used by a family, the members of a user crowd 114 may include only family members and close friends. In another example, if the personal safety system 100 is used in connection with a neighborhood watch program, the members of a user crowd 114 may include all or some of the neighbors in the neighborhood. In yet another example, if the personal safety system 100 is used in connection with patron safety for an entertainment event held at a facility, the members of the facility manager's user crowd 114 might include some or all ticket purchasers for the event, thereby causing the personal safety system 100 to push messages pertaining to alerts or emergency notifications, if any, to the mobile devices 110 of such ticket purchasers.

Similar to the system's creation of a user crowd 114 and upon receiving appropriate input, the personal safety system 100 creates a "micro-crowd 116" (or "micro-group 116"). As used herein, the term "micro-crowd 116" (or "micro-group 116") refers to one or more system users 112 (sometimes referred to herein as "micro-crowd members" or "micro-group members") who are selected by a system user 112 from the system user's user crowd 114 and who are invited, and accept such invitation, to become an associated member of the system user's micro-crowd 116. A system user's micro-crowd 116 may include a small to large number of persons selected from the system user's user crowd 114 with the number depending on how the personal safety system 100 is being used by the system user 112.

Because the members of a system user's micro-crowd 116 are also members of the system user's user crowd 114, the personal safety system 100 pushes messages related to alerts and emergency notifications to each member of the system user's micro-crowd 116. In addition, the personal safety system 100 may continuously or periodically track the geo-location of the micro-crowd member via his/her respective mobile device 110, and may generate and deliver a message to the system user 112 if the micro-crowd member has not arrived at a pre-identified location by a pre-established time or has not checked in with the personal safety system 100 or system user 112 prior to the passage of a pre-established period of time or by a pre-established time. By providing such functionality in connection with micro-crowds 116, the personal safety system 100 enables, for example, parents to monitor the whereabouts of their children and the timeliness of the children's travel to a particular location or event.

As used herein, the term "alert" refers to an informational notification pertaining to an event, occurrence, or situation that may be of interest such as, for example and not limitation, a crime, fire, weather, weather-related damage, traffic accident, gridlocked traffic, construction, child disappearance, health infection occurrence, and other incident. An alert provides others with "geo-correlated alert information" about an event, occurrence, or situation that generally includes, at least, information and/or data identifying the type of event, occurrence, or situation, information describing the event, occurrence, or situation, and information and/or data defining the date/time and geographical location of the event. The identity of the system user 112 posting an alert may be included or not included, with the alert source being anonymous in the latter event. Alerts may also be obtained and imported into the personal safety system 100 from other alert sources such as, but not limited to, governmental entities, private persons, websites, and social media including Facebook® and/or Twitter®. To obtain alerts from such other alert sources, the personal safety system 100 may receive data feeds including alert information and/or use web crawlers or other similar technology to discover alerts and collect information pertaining to the alerts.

Also, as used herein, the term "emergency" refers to a situation which has been encountered by a system user 112 and in connection with assistance is needed immediately or sooner rather than later. Correspondingly, the term "emergency notification" comprises an informational announcement related to an emergency situation which has been encountered by the system user 112, that informs others of the situation, and that implicitly requests assistance. An emergency notification is, like an alert, geo-correlated and includes information and/or data identifying the system user 112, describing the situation, providing the date/time of the notification, and correlating the situation to a geographical location. Data defining the geographical location of an alert or emergency notification typically includes x,y-coordinate data determined by or received from the satellite-based navigation system commonly referred to as the "Global Positioning System" ("GPS").

The personal safety system 100 facilitates the provision of assistance in connection with an alert or emergency from one or more "assistance providers". The term "assistance provider", as used herein, refers to governmental entities and/or non-governmental entities (including, but not limited to, private businesses, organizations, and persons) that provide or are capable of providing services to assist system users 112 and other persons in connection with an emergency or an alert. For example, governmental assistance providers generally include police, fire, paramedic, and roadside assistance (available in some areas) organizations and their personnel. Non-governmental assistance providers typically include, for example, roadside assistance businesses, vehicle towing businesses, vehicle repair businesses, home repair businesses, and other businesses, organizations, and their personnel. Non-governmental assistance providers may also include, for example, family members, close friends, good Samaritans, and others. The personal safety system 100 also facilitates the provision of feedback pertaining to and rating of assistance providers by system users 112 who have had experience with the assistance providers. Such feedback and ratings are shared and made available by the system 100 to system users 112 so that they may use such information as a factor in deciding whether to request or accept assistance or services from a particular assistance provider.

The one or more data/communication manager(s) 102 of the personal safety system 100 are configured to provide the capacity, speed, capabilities, and performance required for operation of the personal safety system 100. The data/communication manager(s) 102 generally operate twenty-four hours per day, three hundred sixty-five days per year executing the software instructions of the personal safety system manager software 104 and, perhaps, of other accompanying supplemental software (such as, but not limited to, database management software, electronic mail software, or messaging software) in order to enhance the personal safety of system users 112 around the clock. The data/communication manager(s) 102 communicatively connect to mobile devices 110 of system users 112 via one or more communication network(s) 118 and bi-directional communication links 120, 122 when respective personal safety system sessions are initiated by the personal safety system application 108 being invoked by system users 112 on their respective mobile devices 110. The communication network(s) 118 and bi-directional data links 120, 122 include wired and wireless infrastructure appropriate for providing voice and data communications and include infrastructure such as, but not limited to, the Internet, the public switched telephone network (PSTN), and cellular networks.

As used herein, the term "data/communication manager(s) 102" refers to a hardware and/or software implemented personal safety system component(s) that, under the control of the manager software 104, interacts with system user's mobile devices 110 and carries out backend and other tasks to perform the methods and provide the functionality described herein. Multiple data/communication manager(s) 102 may be located in different areas of the world and may be communicatively connected by one or more communication network(s) (including, but not limited to, the Internet) to form a personal safety system network using a client/server system architecture, peer-to-peer system architecture, or other architecture used now or in the future. Operating in such personal safety system network, a data/communication manager(s) 102 may share data and information with one or more other data/communication manager(s) 102. According to the example embodiment, the data/communication manager(s) 102 includes one or more appropriately configured server computer(s) with mobile devices 110 comprising clients in a client/server architecture. However, it should be understood and appreciated that in other embodiments, the data/communication manager(s) 102 may comprise other device(s) available now or in the future that may be portable and/or not portable and that communicate data bi-directionally via wired and/or wireless communications infrastructure and methods. Therefore, for example and without limitation, the data/communication manager(s) 102 may comprise a portable, handheld device such as an appropriately configured and equipped smartphone (or similar device), or may comprise multiple portable, handheld devices that are appropriately configured and networked together via one or more communication network(s). It should also be understood and appreciated that in still other embodiments, the data/communication manager(s) 102 may comprise, and be implemented as, one or more virtual component(s) via software that provides the functionality described herein.

In accordance with the example embodiment, the personal safety system database 106 may reside on one or more memory and/or data storage device(s), available now or in the future, that is/are communicatively connected, directly or indirectly, to the data/communication manager(s) 102 via bi-directional communication link 124 which may include wired and/or wireless communication paths and/or communication network(s). It should be understood and appreciated that the personal safety system database 106 may reside anywhere and be distributed, including, but not limited to, in an information technology virtual structure commonly referred to as "the cloud" with data being bi-directionally communicated to/from the personal safety system database 106 via one or more communication network(s) such as, for example and not limitation, the Internet.

System users 112 generally interact with the personal safety system 100, as alluded to above, via mobile devices 110 during respective personal safety sessions. As used herein, the term "mobile device 110" refers to any portable device capable of executing the software instructions of the personal safety system application 108 and interacting with a system user 112 via the application's graphical user interfaces ("GUIs"). Each mobile device 110 generally has a processing unit for executing the software instructions of the person safety system application 108, memory for storing the app 108 and information/data, a display capable of presenting information via graphical user interfaces, a keypad for textual data entry that is implemented either via hardware or software, wireless telecommunication hardware and software to enable wireless voice and data communications via a communication network 118, one or more accelerometer(s) adapted for detecting movement of the device 110, hardware/software appropriate to interact with the Global Positioning System (GPS) and determine the mobile device's then current geo-location, and possibly voice recognition hardware/software. Preferably, the display comprises a touch screen display configured to receive user input in the form of button/option selections and entered alphanumeric data through touching of the display by a user's finger or other implement. Mobile devices 110, acceptable according to the example embodiment, include devices commonly referred to as smartphones, tablets, tablet computers, personal digital assistants (PDAs), and other similar devices available now or in the future.

A system user 112 initiates a personal safety system session by starting execution of the personal safety system application 108 on his/her mobile device 110 in a manner similar to that used to start other apps. During a personal safety system session, the personal safety system 100 monitors the geographical location of the system user's mobile device 110 determined by the device's Global Positioning System capabilities and stores the device's past and then current geo-locations. The data/communication manager(s) 102 interact and exchange information and/or data with a mobile device 110 via the communication network(s) 118 and bi-directional data links 120, 122, process information and/or data according to the personal safety system manager software 104 and other accompanying software, and store and retrieve information and/or data in/from the personal safety system database 106 in order to provide the functionality described herein. The system user's mobile device 110 communicates personal safety system information/data with the data/communication manager(s) 102 and interacts with the system user 112 via the graphical user interfaces ("GUIs") of the personal safety system application 108 to present and receive information, selections, and other inputs. Additionally, operation of the personal safety system application 108 during a personal safety session causes the system user's mobile device 110 to, among other tasks: continuously or periodically determine the then current geo-location of the mobile device 110 and communicate data representative of the geo-location to the data/communication manager(s) 102; receive from the system user 112 and communicate new alert and emergency related information to the data/communication manager(s) 102; receive information and selections related to the user's crowd and/or user's micro-crowd; receive and display map data, alert data, emergency notification data, and tracker data; receive, display and edit information corresponding to the system user's preferred businesses or assistance providers; initiate a voice phone call to a government 911 assistance provider when an emergency is declared; and, initiate communications via voice, electronic mail, and/or messaging to aid a system user 112 in providing or receiving assistance in the event of an emergency or to discuss an alert with the system user 112 who posted the alert on the system 100. A personal safety system session ends when execution of the personal safety system application 108 is terminated by the system user 112. It should be understood and appreciated that by virtue of the round the clock operation of the data/communication manager(s) 102 and personal safety system manager software 104, the personal safety system 100 is generally always interacting with many system users 112 via personal safety system applications 108 on their respective mobile devices 110, and receives and communicates alerts, emergency notifications, and other information/data while other system users 112 are not connected in a personal safety system session with the personal safety system 100.

To provide the functionality described herein, the personal safety system 100 operates according to and implements a plurality of methods including steps that are, generally, performed by one or more data/communication manager(s) 102 via the personal safety system manager software 104 and/or by a system user's mobile device 110 via the personal safety system application 108. These methods are described below with reference to the accompanying drawings, including those drawings illustrating the various graphical user interfaces of the personal safety system 100.

FIGS. 2A-2D display a flowchart representation of a method 200 of the personal safety system 100 for displaying alert and emergency locations on a user's mobile device 110 and for providing access to other system features via the user's mobile device 110. The personal safety system 100 operates according to and implements the method 200 when a system user 112 initiates operation of the personal safety system application 108 on his/her mobile device 110, thereby initiating a personal safety system session between with the user's mobile device 110 and the system's data/communication manager(s) 102. After starting the method 200 at step 202, the personal safety system 100 obtains or receives data corresponding to the then current geo-location of the system user's mobile device 110 and stores the geo-location data for the user 112 in the personal safety system database 106 at step 204. More particularly, the personal safety system application 108 causes the mobile device 110 to determine its then current geo-location via the mobile device's Global Positioning System (GPS) capabilities (or other similar capabilities or methods) and to communicate data corresponding to the then current geo-location of the mobile device 110 to the data/communication manager(s) 102 and the personal safety system manager software 104. After receiving the geo-location data, the data/communication manager(s) 102 stores the newly received geo-location data in the personal safety system database 106 in association with information/data identifying the user's mobile device 110 (and, hence, the system user 112) as the then current and most recent geo-location of the mobile device 110, and with some prior geo-location data for the mobile device 110 being retained. By storing data identifying the then current geo-location of the mobile device 110, the personal safety system 100 is capable of retrieving and providing such data (for example, through features of the personal safety system manager software 104) in the event the mobile device's user disappears (for example, due to kidnapping, abduction, or just becoming lost) and must be located by police and/or other governmental authorities. The stored geo-location data is invaluable in determining the last known or current whereabouts of the system user's mobile device 110 and, presumably, the user's last known or current whereabouts in such a situation.

Next, at steps 206-212 of method 200, the personal safety system 100 performs a series of determinations in order to decide whether updating of any map, alert, and emergency data previously sent by the data/communication manager(s) 102 to the mobile device 110 is necessary. To make such determinations, the data/communication manager(s) 102 retrieves and uses appropriate data from the personal safety system database 106. Thus, at step 206, the data/communication manager(s) 102 compares the just received geo-location of the mobile device 110 with the immediately prior received geo-location of the mobile device 110 retrieved from the personal safety system database 106 and calculates the distance between the two geo-locations. If the calculated distance is greater than a threshold distance, the personal safety system 100 assumes that the system user 112 has changed his/her geographical location by more than an insubstantial distance and decides that an update of the user's mobile device 110 with new map, alert and emergency data is necessary. The data/communication manager(s) 102 then advances to step 214 to begin the update process.

If, at step 206, the data/communication manager(s) 102 determines that the system user 112 has not changed his/her geographical location by more than an insubstantial distance, the data/communication manager(s) 102 advances to step 208 of method 200 where the data/communication manager(s) 102 determines if an alert within a threshold distance of the user's then current geo-location has been created, edited or deleted since the last update of map, alert and emergency data made to the user's mobile device 110 as tracked in the personal safety system database 106. If an alert having a geo-location within a threshold distance of the system user's mobile device 110 has been created, edited or deleted, the data/communication manager(s) 102 decides that an update of the device's map, alert and emergency data is necessary and branches ahead to step 214 of the method 200 to perform such update. Alternatively, if the data/communication manager(s) 102 determines that no alert has been created, edited or deleted within such threshold distance, then no update is necessary and the data/communication manager(s) 102 moves ahead to step 210 of method 200.

At step 210, the data/communication manager(s) 102 determines whether a new emergency has been declared by the user 112 of the mobile device 110 or by a member of the user's user group 114 since the last update of map, alert and emergency data made to the user's mobile device 110 as tracked in the personal safety system database 106. If so, the data/communication manager(s) 102 moves forward to step 214 of method 200 to begin the process of updating the user's mobile device 110 with new map, alert and emergency data. If no new emergency has been declared by the system user 112 or by a member of the user's user group 114, then no update due to a new emergency is necessary and the data/communication manager(s) 102 advances to step 212 of method 200.

Continuing at step 212, the data/communication manager(s) 102 determines if a threshold period of time has passed since the last update of the map, alert and emergency data on the user's mobile device 110. To do so, the data/communication manager(s) 102 uses data stored in the personal safety system database 106 including a date/time stamp of the last update and compares such data with the then current date/time. If the amount of time passing since the last update is less than the threshold period of time, the data/communication manager(s) 102 decides that no update of map, alert and emergency data is necessary and loops back to step 204 of method 200 to obtain new geo-location data from the system user's mobile device 110. Conversely, if the amount of time passing since the last update is not less than the threshold period of time, an update of the mobile device's map, alert and emergency data is necessary and the data/communication manager(s) advances to step 214 of method 200 described below.

At step 214 of method 200, the personal safety system 100 selects map data from the personal safety system database 106 for delivery to the system user's mobile device 110 based on the current geo-location recently received by the data/communication manager(s) 102 from the mobile device 110 at step 204. The map data may be selected to be within a pre-established distance of the then current geo-location of the user's mobile device 110. It should be understood and appreciated, however, that other criteria may be used for selecting the map data. Subsequently, at steps 216 and 218 of method 200, the personal safety system 100 respectively selects alert data and emergency data from the personal safety system database 106. To do so, the data/communication manager(s) 102 selects data based on the respective geo-locations of the alerts and emergencies and the extent of the map data previously selected at step 214. For selecting the alert data, the data/communication manager(s) 102 also uses criteria from the alert filter configuration previously established by the system user 112 using method 2900 described below.

Figure 3:
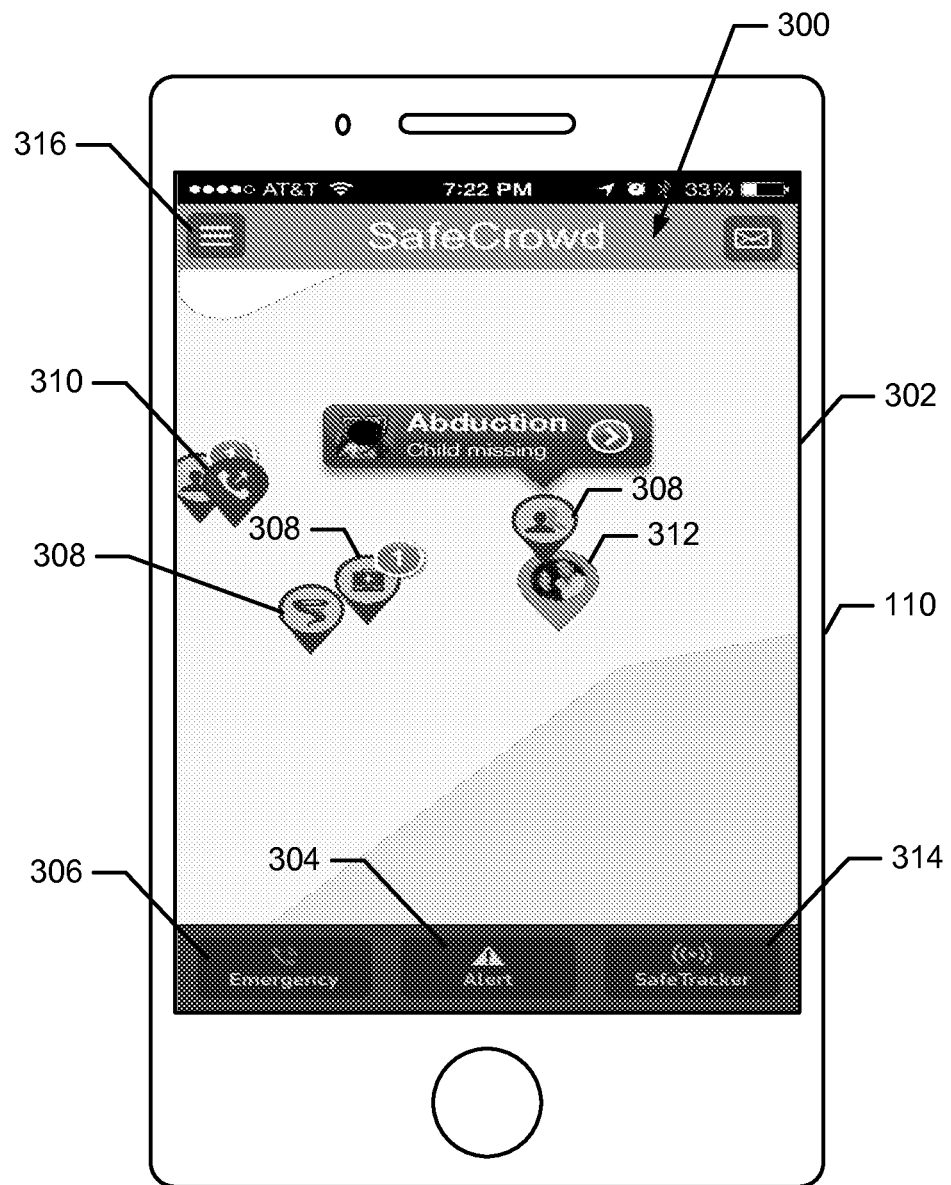
FIG. 3 displays a pictorial representation of a home page graphical user interface of a personal safety system application of the personal safety system.
Figure 4A:
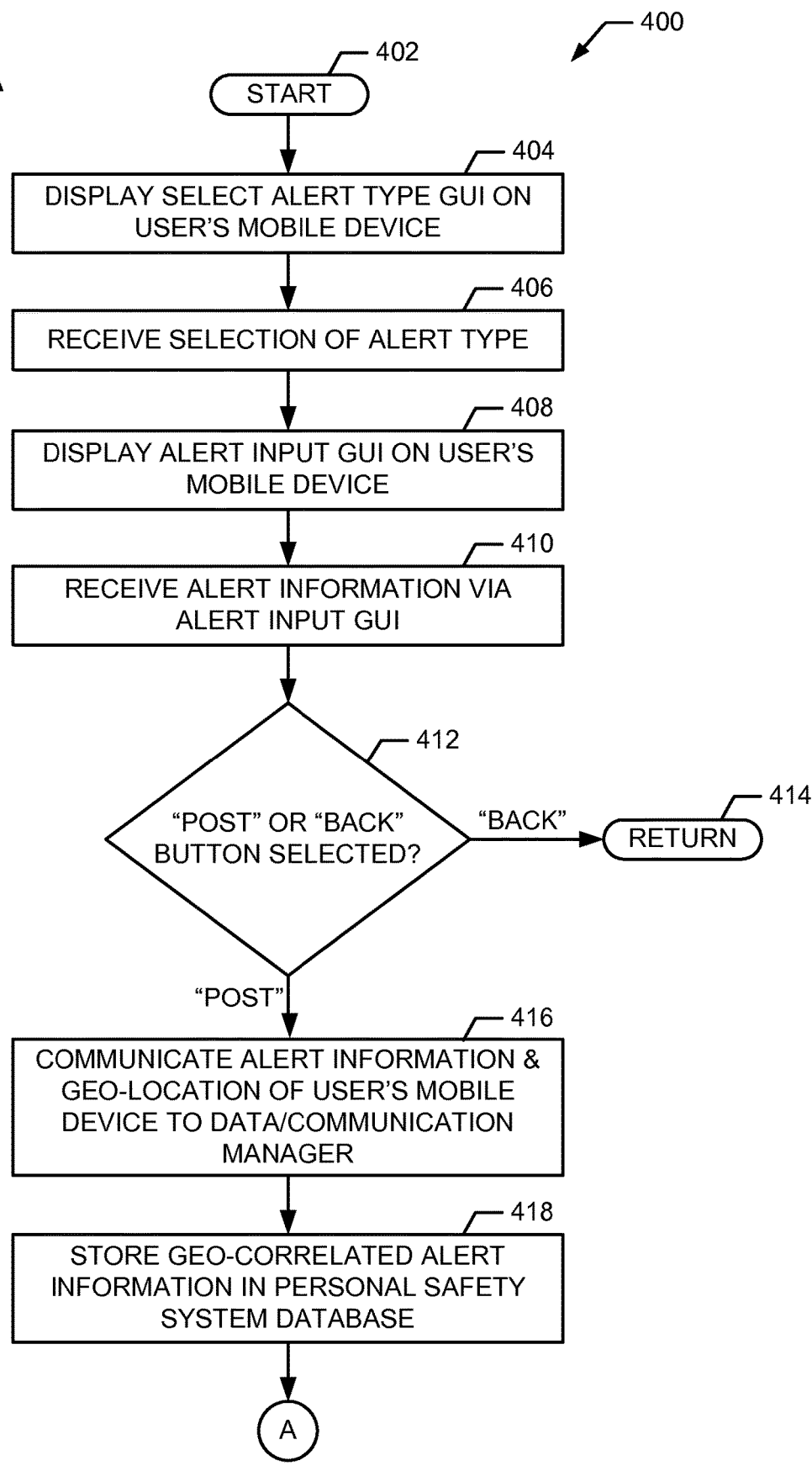
Figure 4B:
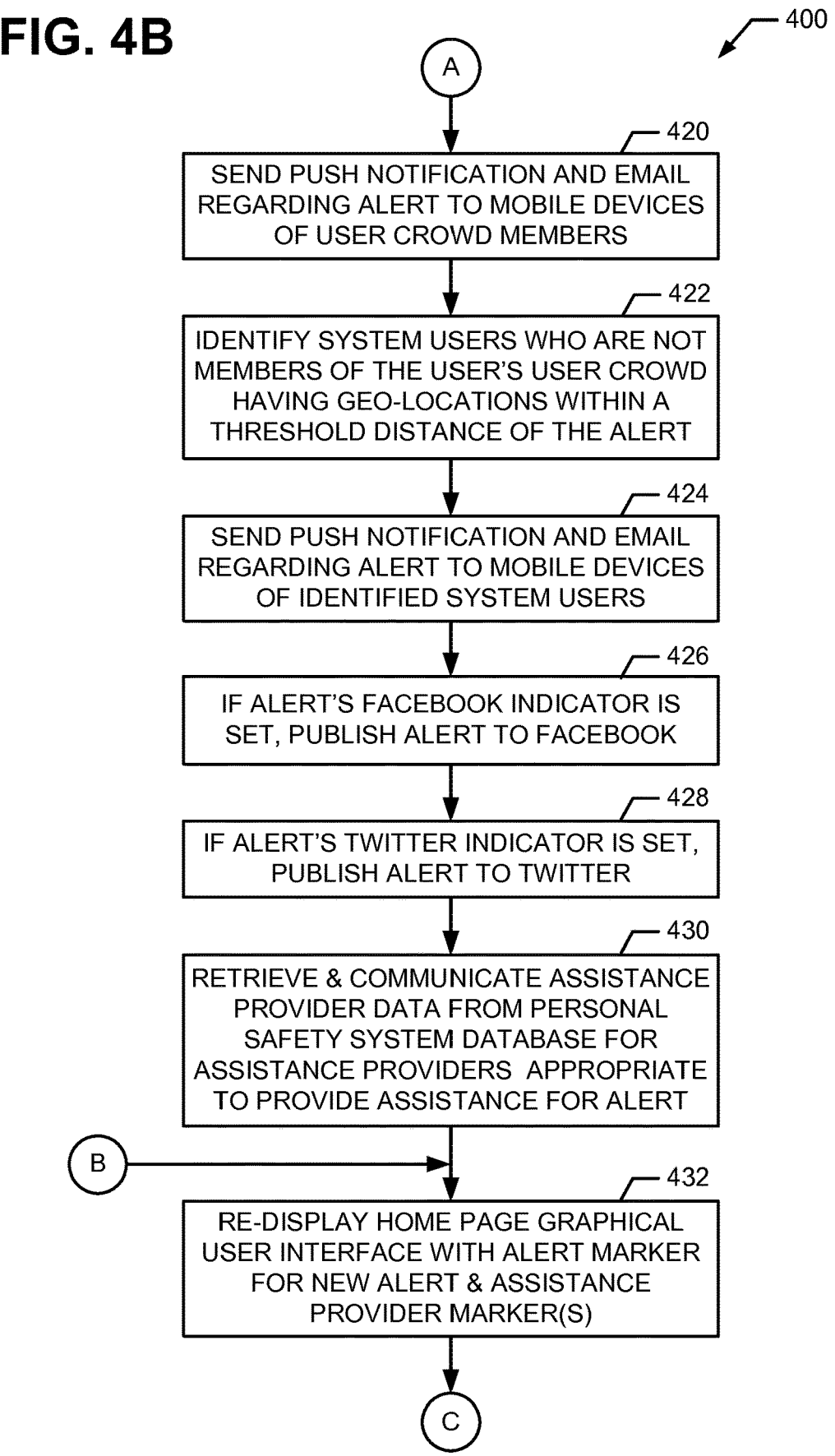
Figure 4C:
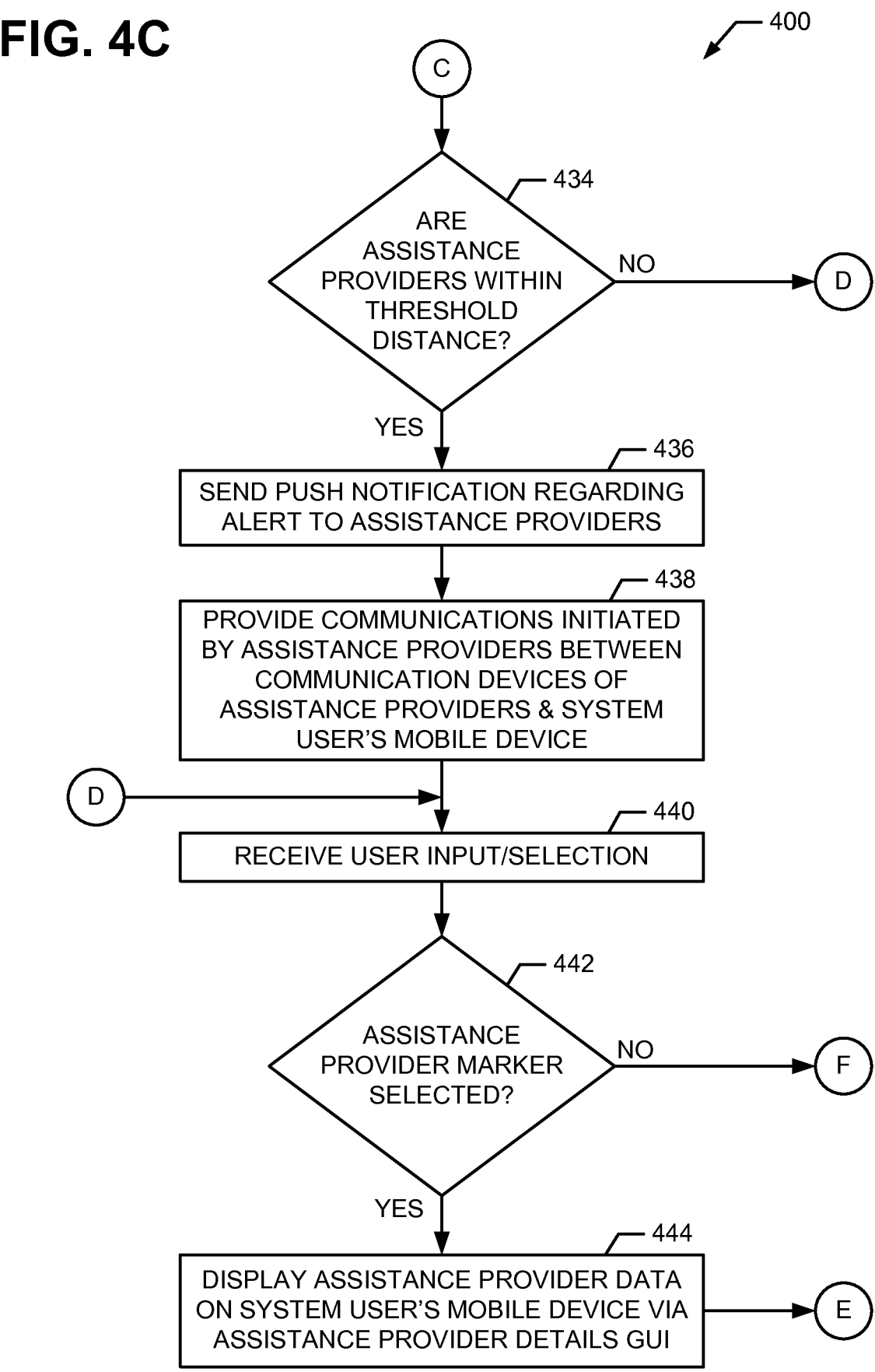
Figure 4D:
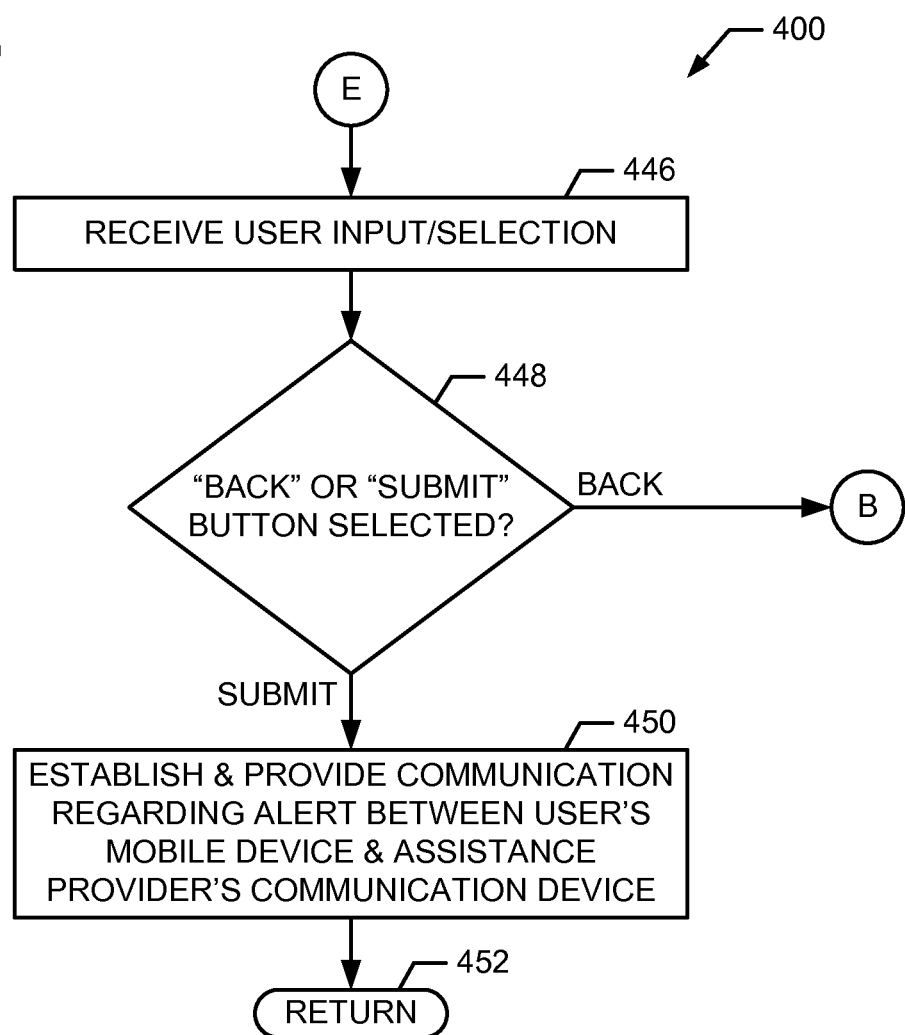

After the personal safety system 100 has selected and retrieved the map, alert and emergency data, the data/communication manager(s) 102 communicates the data to the system user's mobile device 110 and the personal safety system application 108 thereof at step 220. Then, at step 222, the user's mobile device 110 displays the received map, alert and emergency data via a "home page" graphical user interface 300 of the personal safety system application 108, thereby completing the update of the system user's mobile device 110. As seen in FIG. 3, the home page graphical user interface 300 displays the received map, alert and emergency data in a window 302 with alerts being displayed via alert markers 308 pointing to the respective geo-locations of the alerts, an emergency marker 310 pointing to the geo-location of an emergency, and a system user marker 312 pointing to the then current geo-location of the system user 112. It should be understood and appreciated that in FIG. 3, the system user 112 has zoomed-in on the map in window 302 to render the alert and emergency geo-locations more discernible and, hence, few streets, buildings, lakes, rivers, streams or other features are visible within the window 302. Typical map data is more visible in FIGS. 10, 13, and 16.

Referring back to FIG. 2C, method 200 continues at step 224 where the personal safety system 100 receives an input or selection from the system user 112 via the home page graphical user interface 300 and subsequent other graphical user interface(s) of the personal safety system application 108. More particularly, the mobile device 110 and, hence, the personal safety system application 108 receives a selection of an alert button 304, emergency button 306, alert marker 308, emergency marker 310, tracking button 314, main menu button 316 and an add/edit user crowd menu option 1902 from a main menu graphical user interface 1900; main menu button 316 and a manage business list menu option 1904 from the main menu graphical user interface 1900, a tap on the display of the user's mobile device 110 in an area of the home page graphical user interface 300 where no markers are present and selection of a list option 2602 from a toolbar popup menu 2600, and a tap on the display of the user's mobile device 110 in an area of the home page graphical user interface 300 where no markers are present and selection of an alert filter option 2604 from the toolbar popup menu 2600.

Based on the particular input received, operation of the personal safety system 100 continues in accordance with another method as set forth in steps 226-242 and as follows: if selection of the alert button 304 is received, the personal safety system 100 performs a method 400 for creating an alert; if selection of the emergency button 306 is received, the personal safety system 100 performs a method 700 for initiating an emergency notification; if a selection of an alert marker 308 is received, the personal safety system 100 performs a method 900 for reviewing alert information; if a selection of an emergency marker 310 is received, the personal safety system 100 performs a method 1200 for reviewing emergency notification details; if selection of the tracking button 312 is received, the personal safety system 100 performs a method 1500 for tracking user micro-crowd members; if selection of the main menu button 316 and the add/edit user crowd menu option 1902 from the main menu graphical user interface 1900 are received, the personal safety system 100 performs a method 1800 for adding/editing members to/of a system user's user crowd 114; if selection of the main menu button 316 and the manage business list menu option 1904 from the main menu graphical user interface 1900 are received, the personal safety system 100 performs a method 2200 for adding/editing businesses to a system user's list of businesses; if a tap on the display of the user's mobile device 110 in an area of the home page graphical user interface 300 where no markers are present and selection of a list option 2602 from a toolbar popup menu 2600 are received, the personal safety system 100 performs a method 2500 of providing lists of a system user's businesses, alerts, and emergencies; and, if a tap on the display of the user's mobile device 110 in an area of the home page graphical user interface 300 where no markers are present and selection of an alert filter option 2604 from the toolbar popup menu 2600 are received, the personal safety system 100 performs a method 2900 for setting/resetting an alert filter configuration. When the personal safety system 100 finishes operating according to these various methods, the personal safety system 100 generally returns to operating in accordance with method 200 and loops back to step 214 where the personal safety system 100 begins to update the map, alert and emergency data displayed on the system user's mobile device 110 via the home page graphical user interface 300.

Figure 6A:
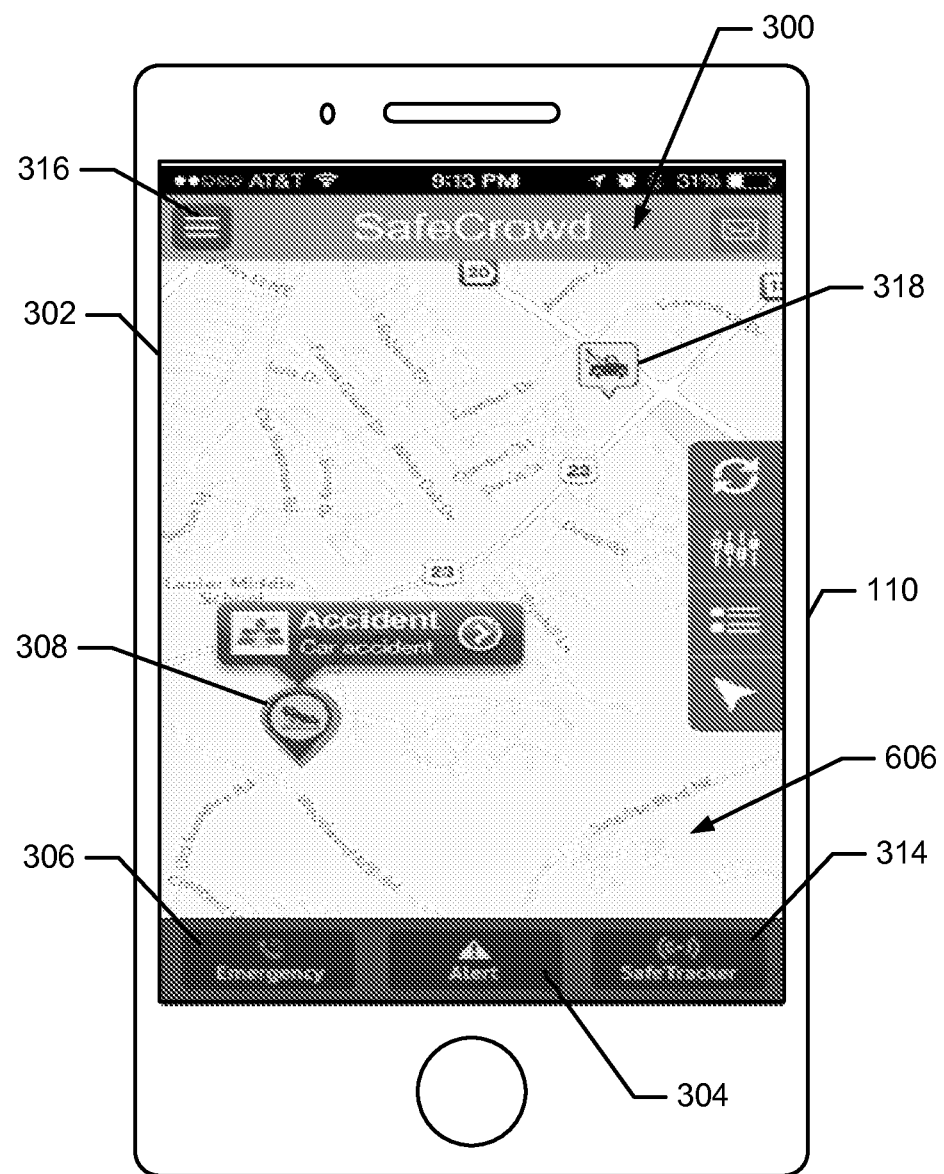
FIG. 6A displays a pictorial representation of the home page graphical user interface of the personal safety system application of the personal safety system with an assistance provider marker shown.

FIGS. 4A-4E display a flowchart representation of a method 400 of the personal safety system 100 for creating an alert that is implemented and followed by the personal safety system 100 when a system user 112 desires to create an alert for distribution or publication to other system users 112 and, possibly, to others via social media websites or services such as, but not limited to, Facebook® and Twitter®. According to the method 400, the personal safety system 100 identifies and notifies (including, without limitation, by voice phone call, pager, electronic mail, and/or messaging) assistance providers of the alert who are appropriate to provide assistance in connection with the alert at least because the assistance providers have geo-locations within a pre-determined threshold distance of the alert and who are identified as being capable of providing the type of assistance required in connection with the alert. The assistance providers may respond to and communicate with the system user 112 about the alert via the personal safety system 100. Additionally, the personal safety system 100 displays respective user-selectable assistance provider markers 318 and/or labels on the home page graphical user interface 300 (see FIG. 6A) corresponding to the geo-locations of the assistance providers who are capable of providing the type of assistance required in connection with the alert. Upon receiving selection of an assistance provider marker 318 and, hence, a corresponding assistance provider, the personal safety system 100 establishes and provides communications (including, without limitation, by voice phone call, pager, electronic mail, and/or messaging) between the system user's mobile device 110 and communication devices of the selected assistance provider to enable the system user 112 to arrange and obtain assistance from the assistance provider.

Figure 5A:
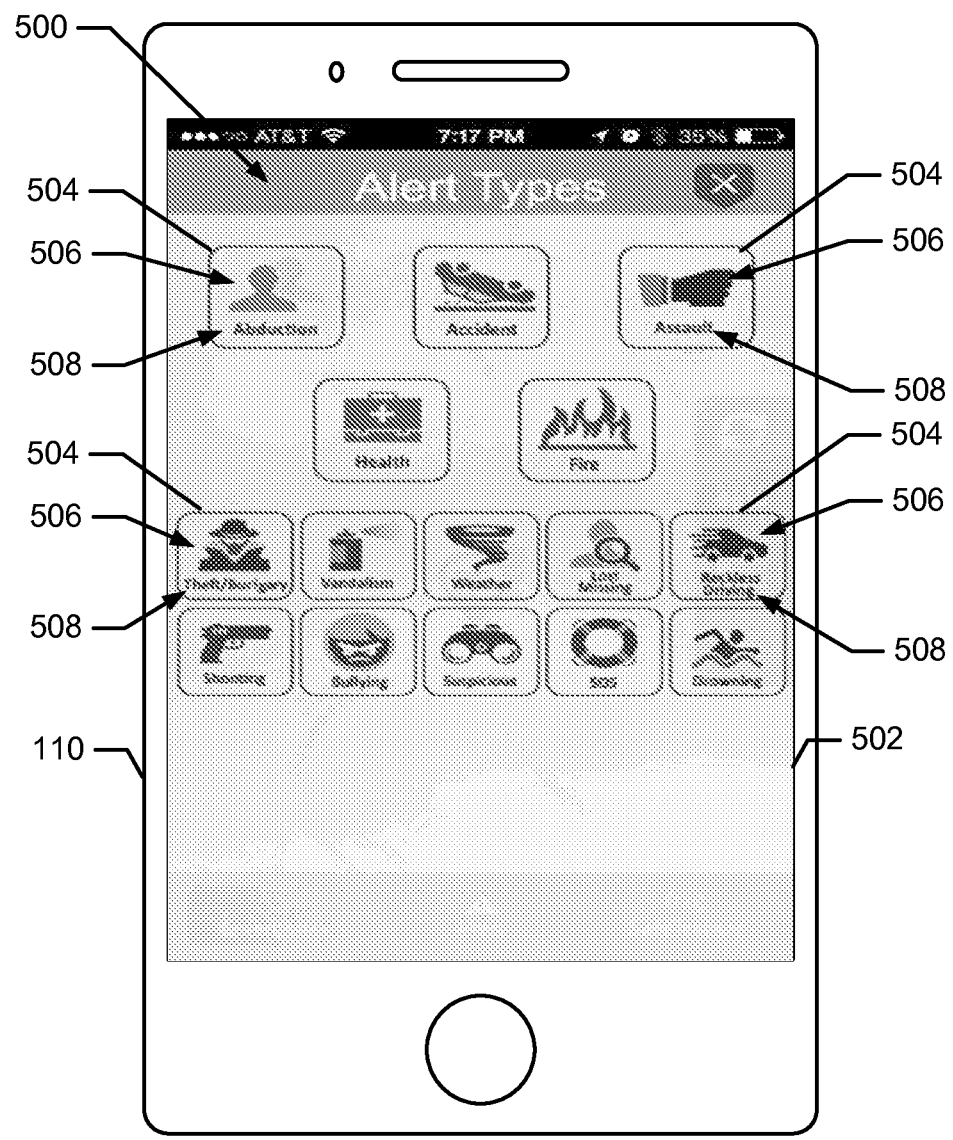
FIG. 5A displays a pictorial representation of a select alert type graphical user interface of the personal safety system application of the personal safety system.

Having received the system user's selection of the alert button 304 from the home page graphical user interface 300 indicating the user's desire to create an alert and after starting method 400 at step 402, the personal safety system application 108 causes the system user's mobile device 110 to display the select alert type graphical user interface 500 (see FIG. 5A) on the device's display at step 404. The select alert type graphical user interface 500 includes a window 502 in which a plurality of alert type buttons 504 are displayed for selection by the system user 112. Each alert type button 504 corresponds to a unique type of alert, or alert type, and includes an alert type symbol 506 and alert type text 508 that identify the alert type in a manner that is easy for system users 112 to remember. As illustrated in FIG. 5A, the alert types include, but are not limited to: abduction, accident, assault, health issue/problem, fire, theft/burglary, vandalism, weather, lost/missing person, reckless driving, shooting, bullying, suspicious person/event, SOS (save our ship), or drowning. The system user 112 selects an alert type by tapping on the corresponding alert type button 504 of the select alert type graphical user interface 500.

Figure 5B:
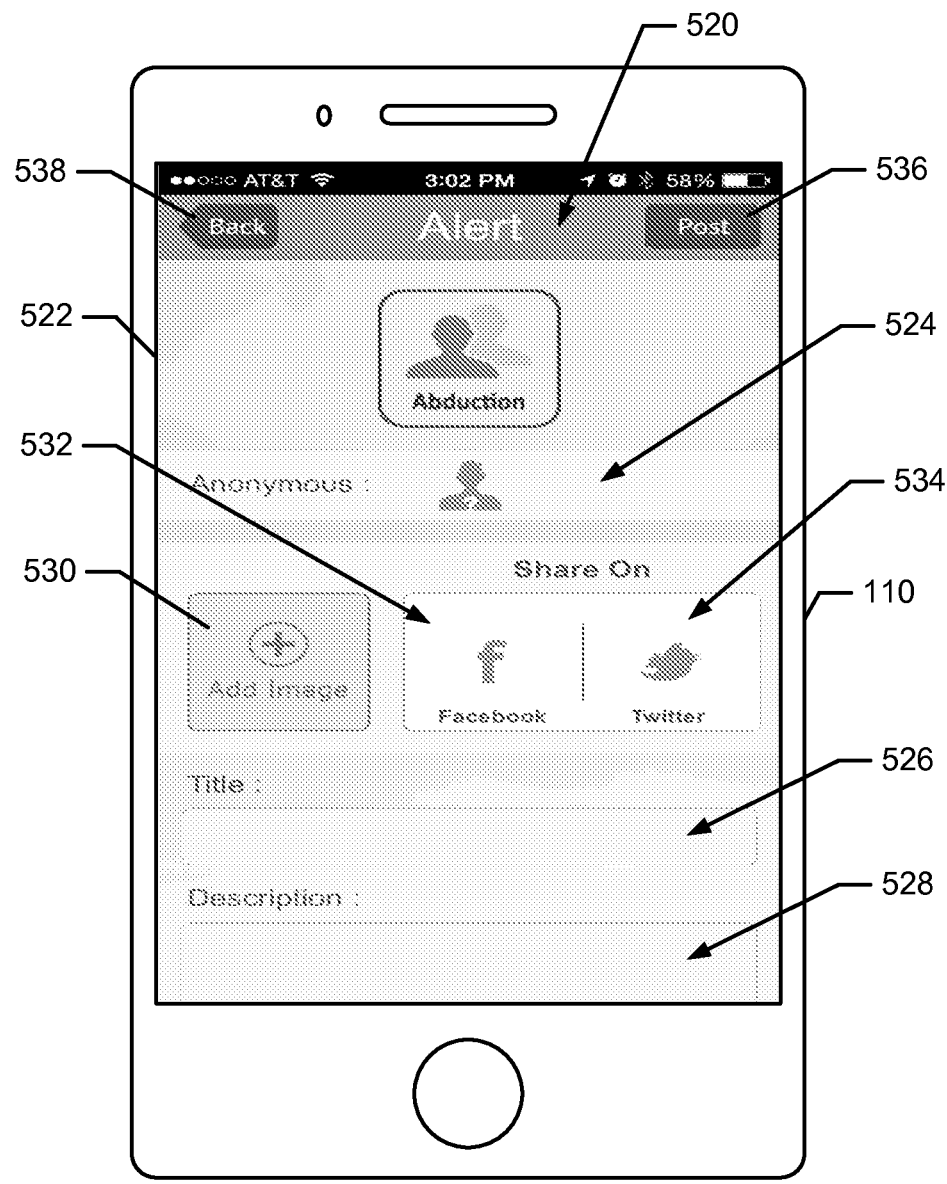
FIG. 5B displays a pictorial representation of an alert input graphical user interface of the personal safety system application of the personal safety system.

Continuing at step 406 of method 400, the mobile device 110 and personal safety system application 108 receive a selection of an alert type from the select alert type graphical user interface 500 by the system user 112. Next, at step 408, the personal safety system application 108 causes the user's mobile device 110 to display an alert input graphical user interface 520 (see FIG. 5B) on the device's display. The alert input graphical user interface 520 includes a window 522 having an alert type symbol 506 corresponding to the alert type selected by the system user 112 via the select alert type graphical user interface 500, a user identifier field 524 for receiving the alert creator's name, a title text field 526 for receiving a title/name/identifier for the alert, and a description text field 528 for receiving a textual description for the alert. Upon receiving a tap of the system user's finger within the user identifier field 524, title field 526, or description field 528, the personal safety system application 108 causes the mobile device 110 to display a keypad for use by the system user 112 in inputting his/her name, a textual alert title, and a textual alert description. If the system user 112 desires not to input his/her name and to remain anonymous, the personal safety system application 108 permits the user 112 to do so and will display "anonymous" to others as the alert's creator.

The alert input graphical user interface 520 also includes an add image button 530, Facebook® toggle button 532, Twitter® toggle button 534, post button 536, and back button 538. When selection of the add image button 530 is received from the system user 112, the personal safety system application 108 allows the system user 112 to attach and receives a photo, image, video, or audio as part of the alert. If selection of the Facebook® toggle button 532 or Twitter® toggle button 534 is received from the system user 112, the personal safety system application 108 causes the buttons 532, 534 to, respectively, toggle between being "selected" or "not selected". If the Facebook® toggle button 532 is selected, the personal safety system 100 sets a Facebook® indicator and subsequently causes publication of the alert via Facebook®. Similarly, if the Twitter® toggle button 534 is selected, the personal safety system 100 sets a Twitter® indicator and subsequently causes publication of the alert via Twitter®.

After receiving input of an alert title, alert description and, perhaps, an alert creator's name and photo, image, video, or audio via the alert input graphical user interface 520 at step 410, the personal safety system application 108 checks, at step 412, to see if the system user 112 has selected the post button 536 or the back button 538. If the back button 538 has been selected, then the personal safety system 100 returns, at step 414, to operating in accordance with method 200 and loops back to step 214 where the personal safety system 100 begins to update the map, alert and emergency data displayed on the system user's mobile device 110 via the home page graphical user interface 300.

If, at step 412, the personal safety system application 108 determines that the post button 536 was selected by the system user 112, the personal safety system application 108 obtains the then current geo-location of the user's mobile device 110 and causes the input alert information (including, but not limited to, the alert type, alert title, alert description, and possibly the creator's name, Facebook® publication indicator, Twitter® publication indicator, and a photo, image, video, or audio) and the then current geo-location of the user's mobile device 110 to be communicated to the data/communication manager(s) 102 and personal safety system manager software 104 at step 416. After receiving the geo-correlated alert information, the personal safety system manager software 104 causes the data/communication manager(s) 102, at step 418, to store the geo-correlated alert information for the alert in the personal safety system database 106.

Then, at step 420, the personal safety system manager software 104 causes the data/communication manager(s) 102 to send push notifications and electronic mail messages regarding the alert to the mobile devices 110 of the members of the system user's user crowd 114 informing the members of the event with respect to which the alert is associated. The personal safety system manager software 104 also causes the data/communication manager(s) 102, at step 422, to identify other system users 112 who are not members of the user's user crowd 114, but who have then current geo-locations that are within a pre-determined and pre-established threshold distance of the geo-location of the alert. Subsequently, at step 424, the personal safety system manager software 104 causes the data/communication manager(s) 102 to send similar push notifications and electronic mail messages to other identified system users 112 within the threshold distance.

Advancing to step 426 of method 400, the personal safety system manager software 104 causes the data/communication manager(s) 102 to publish the alert to Facebook® if the Facebook® indictor is set. Similarly, at step 428, the personal safety system manager software 104 causes the data/communication manager(s) 102 to publish the alert Twitter® if the Twitter® indicator is set.

Then, at step 430, the personal safety system manager software 104 causes the data/communication manager(s) 102 to retrieve assistance provider information stored in the personal safety system database 106 for assistance providers who are appropriate to provide assistance in connection with the alert, and communicate such information to the user's mobile device 110. For each assistance provider, such assistance provider information includes, but is not limited to: the name and street address of the assistance provider; an assistance provider type indicator corresponding to the type of assistance normally provided by the assistance provider (and, generally, corresponding to the business types described below with reference to FIG. 24 and including, for example and not limitation, towing, vehicle repair, transportation, medical clinic, food and/or shelter, security, detective and/or private investigator, lawyer, insurance, locksmith, window repair, and, veterinarian); and, contact information such as phone numbers, electronic mail addresses, and messaging handles. Such assistance provider information may also include, for each assistance provider, the assistance provider's geo-location in x,y coordinates. It should be understood and appreciated that other assistance provider types may be used in other example embodiments.

In determining whether a particular assistance provider is appropriate, the personal safety system manager software 104 considers those assistance providers (including, but not limited to, businesses, individuals, and other non-governmental assistance providers) who have previously input or provided their respective assistance provider information to the personal safety system 100 via a method and graphical user interfaces substantially similar to method 2200 and graphical user interfaces used therewith for adding/editing businesses to a system user's list of businesses as described below. The personal safety system manager software 104 additionally considers businesses from the system user's list of businesses (who are considered by the personal safety system 100 to also be assistance providers) and assistance providers for which assistance provider information is available from other sources. After retrieving information from the personal safety system database 106 or from other sources, the personal safety system manager software 104 determines if the type of assistance normally provided by and available from the particular assistance provider corresponds to the type of assistance required in connection with the type of alert.

While the personal safety system 100 uses the type of assistance available from assistance providers in order to select appropriate assistance providers in accordance with the example embodiment, it should be understood and appreciated that other criteria may be used by the personal safety system 100 in other example embodiments to determine which assistance providers are appropriate to provide assistance in connection with an alert. For example, in another example embodiment, the personal safety system 100 might also identify and select only assistance providers having a geo-location within a pre-established and pre-determined threshold distance relative to the geo-location of the alert. Thus, in such other example embodiment, the personal safety system 100 may identify and select assistance providers capable of providing the type of assistance required by the alert, but also assistance providers having a geo-location, say, within twenty (20) miles of the geo-location of the alert.

Proceeding to step 432 of method 400, the system user's mobile device 110 receives the assistance provider information from the data/communication manager(s) 102 and re-displays the home page graphical user interface 300 with an alert marker 308 at the geo-location of the new alert and an assistance provider marker 318 at the geo-location of each respective assistance provider for which the mobile device 110 received assistance provider information as illustrated in FIG. 6 A. Then, at step 434, the personal safety system application 108 determines whether any of the assistance providers has a geo-location within a pre-established and pre-determined threshold distance of the geo-location of the alert. If not, operation according to method 400 advances to step 440 described below. If the personal safety system application 108 determines that one or more of the assistance providers has a geo-location within the threshold distance relative to the geo-location of the alert, the personal safety system 100 sends push notifications to communication devices of the assistance providers at step 436. Such notifications may include, for example and not limitation, text messages and electronic mail. Next, at step 438, the personal safety system 100 provides communications through communication sessions initiated by the assistance providers who received such push notifications and between the communication devices of the assistance providers and the system user's mobile device 110. Information pertaining to the alert and the type of assistance needed may be communicated and exchanged, for example and not limitation, by voice, audio, electronic mail, images, video, and/or text message, depending on the type of established communication session.

At step 440, the personal safety system application 108 receives user input or a selection from the system user's mobile device 110 via the home page graphical user interface 300. Next, at step 442, the personal safety system application 108 determines if selection of an assistance provider marker 318 has been received. If not, the personal safety system application 108 moves forward to step 446 of method 400 described below. Alternatively, if the personal safety system application 108 determines that selection of an assistance provider marker 318 has been received, the personal safety system application 108 causes display of the assistance provider information for the assistance provider corresponding to the selected assistance provider marker 318 via the assistance provider details graphical user interface 600 at step 444.

Figure 6B:
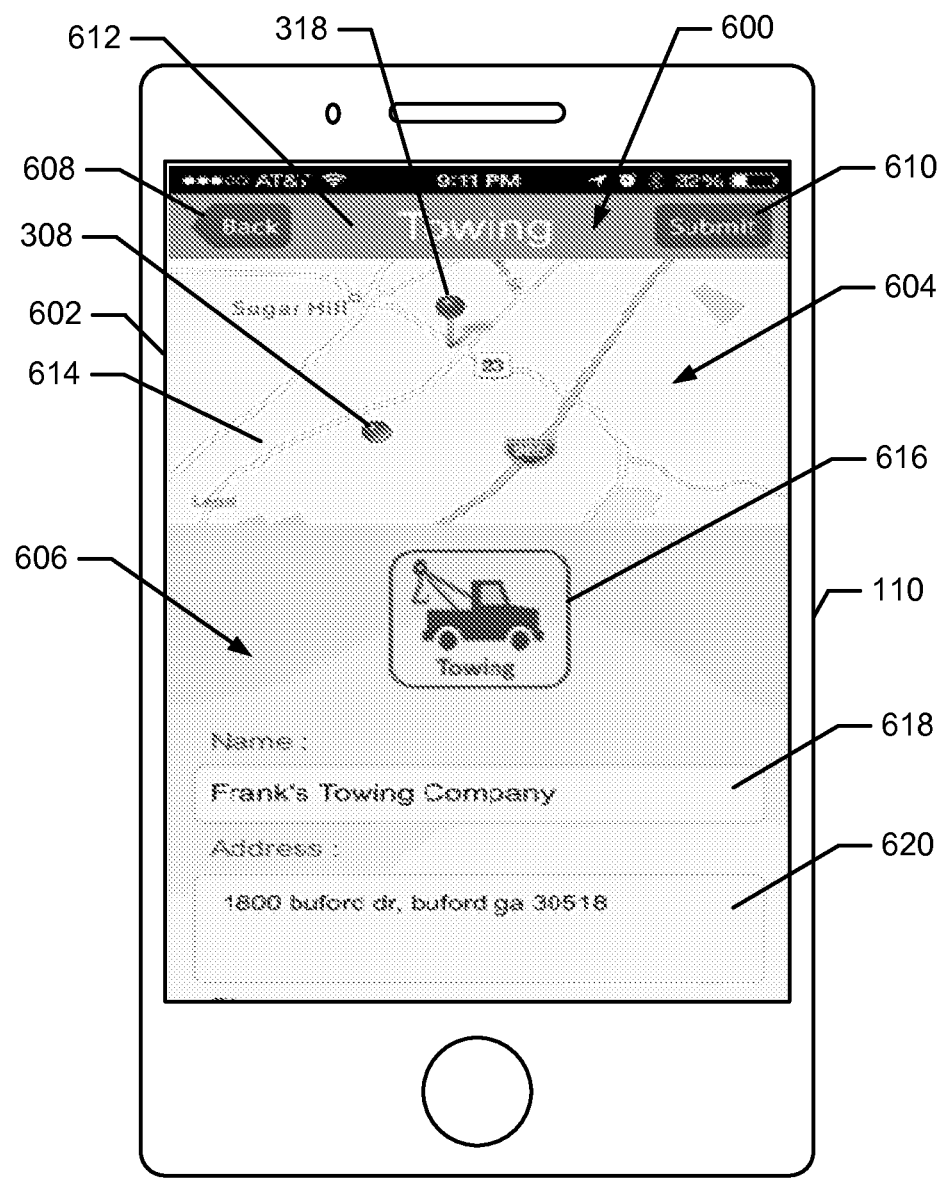
FIG. 6B displays a pictorial representation of an assistance provider details graphical user interface of the personal safety system application of the personal safety system.

As illustrated in FIG. 6B, the assistance provider details graphical user interface 600 includes a window 602 having a top portion 604, a bottom portion 606 below the top portion 604, and a back button 608 and submit button 610 located in a page header 612. The top portion 604 displays a map 614, an alert marker 308 indicating the geo-location of the alert on the map 614, and an assistance provider marker 318 indicating the geo-location of the assistance provider on the map 614. The bottom portion 606 displays an assistance provider type symbol 616 corresponding to the type of assistance normally provided by the assistance provider, a name field 618 including the name of the assistance provider, and an address field 620 including the address of the assistance provider.

Returning to FIGS. 4A-4E, the system user's mobile device 110 and personal safety system application 108 receive an input or selection from the system user 112 at step 446. Then, at step 448, the personal safety system application 108 causes the user's mobile device 110 to determine if selection of the back button 608 or submit button 610 has been received. If selection of the back button 608 has been received, the personal safety system application 108 causes operation according to method 400 to return to step 432 described above. If, to the contrary, selection of the submit button 610 has been received by the user's mobile device 112, the personal safety system application 108 causes the system user's mobile device 112 to establish a communication session with a communication device of the assistance provider regarding the alert at step 450 during which the system user 112 and assistance provider may communicate and exchange information about the alert via, for example and not limitation, voice, audio, electronic mail, images, video, and/or text message, depending on the type of established communication session. At step 452 and after the communication session has ended, the personal safety system 100 returns to operating in accordance with method 200 and loops back to step 214 thereof where the personal safety system 100 begins to update the map, alert and emergency data displayed on the system user's mobile device 110 via the home page graphical user interface 300.

Figure 6C:
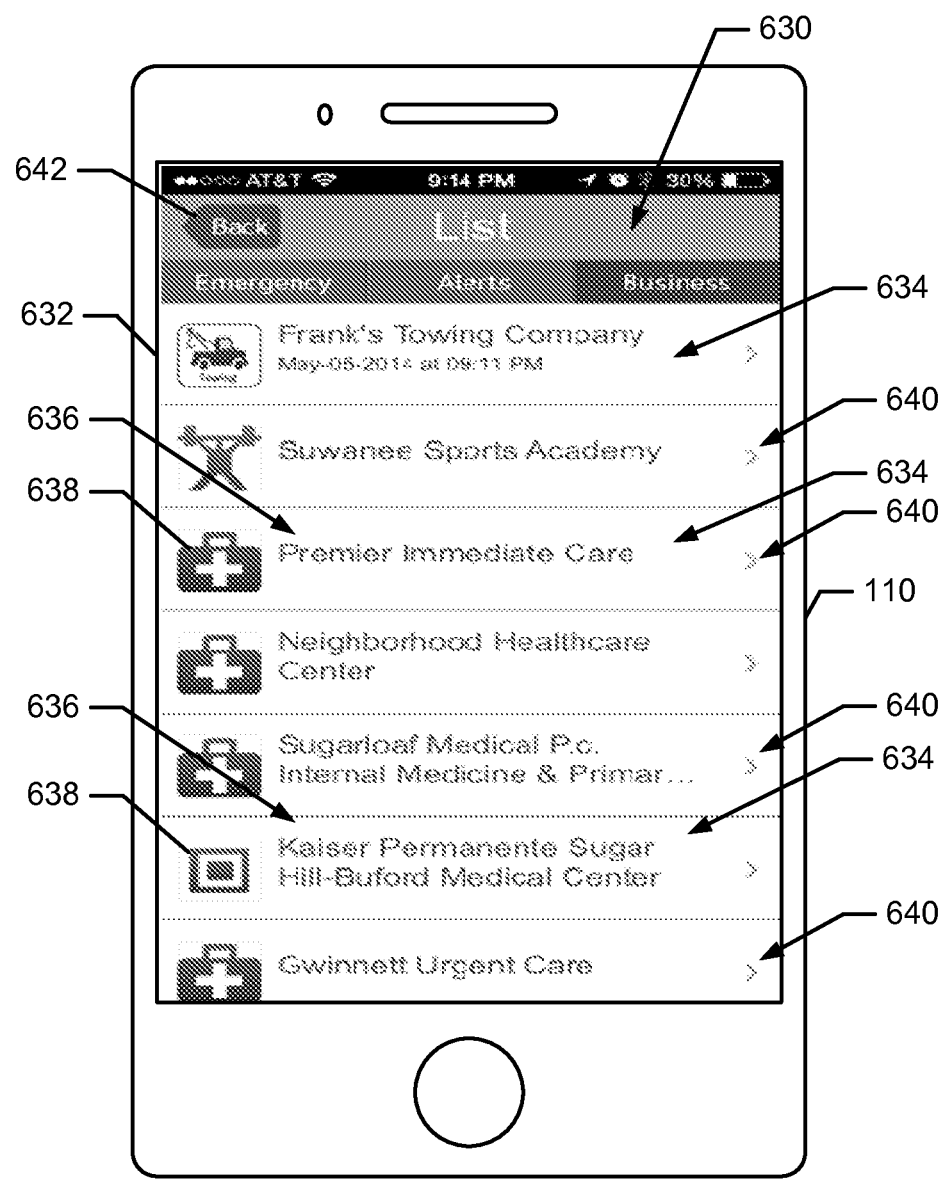
FIG. 6C displays a pictorial representation of an assistance provider list graphical user interface of the personal safety system application of the personal safety system.

If, at step 442, the personal safety system application 108 determines that a selection of an assistance provider marker 318 has not been received, the personal safety system application 108 causes the display of an assistance provider list graphical user interface 630 on the system user's mobile device 112 at step 454 of method 400 for selection of an assistance provider. As illustrated in FIG. 6C, the assistance provider list graphical user interface 630 has a window 632 where assistance providers 634 are displayed for selection with each assistance provider 634 including a name 636 and assistance provider type symbol 638 corresponding to the assistance provider type and, hence, the type of assistance generally provided by the assistance provider 634. The assistance provider types and associated assistance type symbols 638 include and generally correspond to the business types and associated business type symbols 2404 described below. The assistance provider list graphical user interface 630 also includes an arrow button 640 associated with each assistance provider 634, and a back button 642.

After displaying the assistance provider list graphical user interface 630, the personal safety system application 108 receives user input from the system user's mobile device 112 at step 456. Then, at step 458, the personal safety system application 108 determines whether the user input comprises a selection of an arrow button 640 (and, hence, a selection of an assistance provider 634) or selection of the back button 642. If no assistance provider 634 has been selected, then the back button 642 has been selected and the personal safety system application 108 advances to operate in accordance with step 462 described below. Alternatively, if an assistance provider 634 has been selected, then the personal safety system application 108 causes the system user's mobile device 112 to establish a communication session with a communication device of the selected assistance provider 634 regarding the alert at step 460 during which the system user 112 and assistance provider 634 may communicate and exchange information about the alert via, for example and not limitation, voice, audio, electronic mail, images, video, and/or text message, depending on the type of established communication session. Then, at step, 462, the personal safety system 100 returns to operating in accordance with method 200 and loops back to step 214 thereof where the personal safety system 100 begins to update the map, alert and emergency data displayed on the system user's mobile device 110 via the home page graphical user interface 300.

Figure 7A:
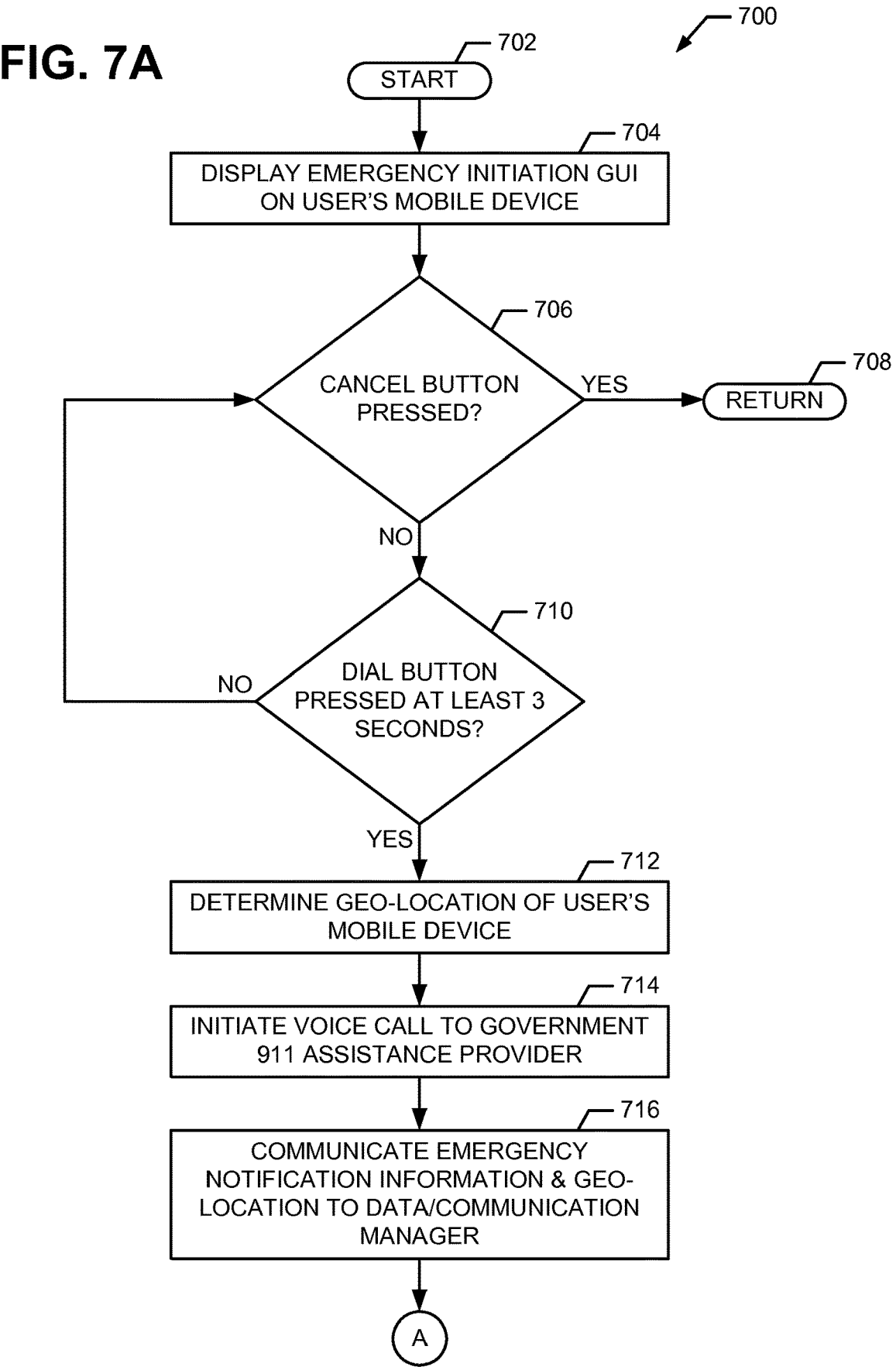
FIGS. 7A-7B display a flowchart representation of a method of the personal safety system for initiating an emergency notification.
Figure 7B:
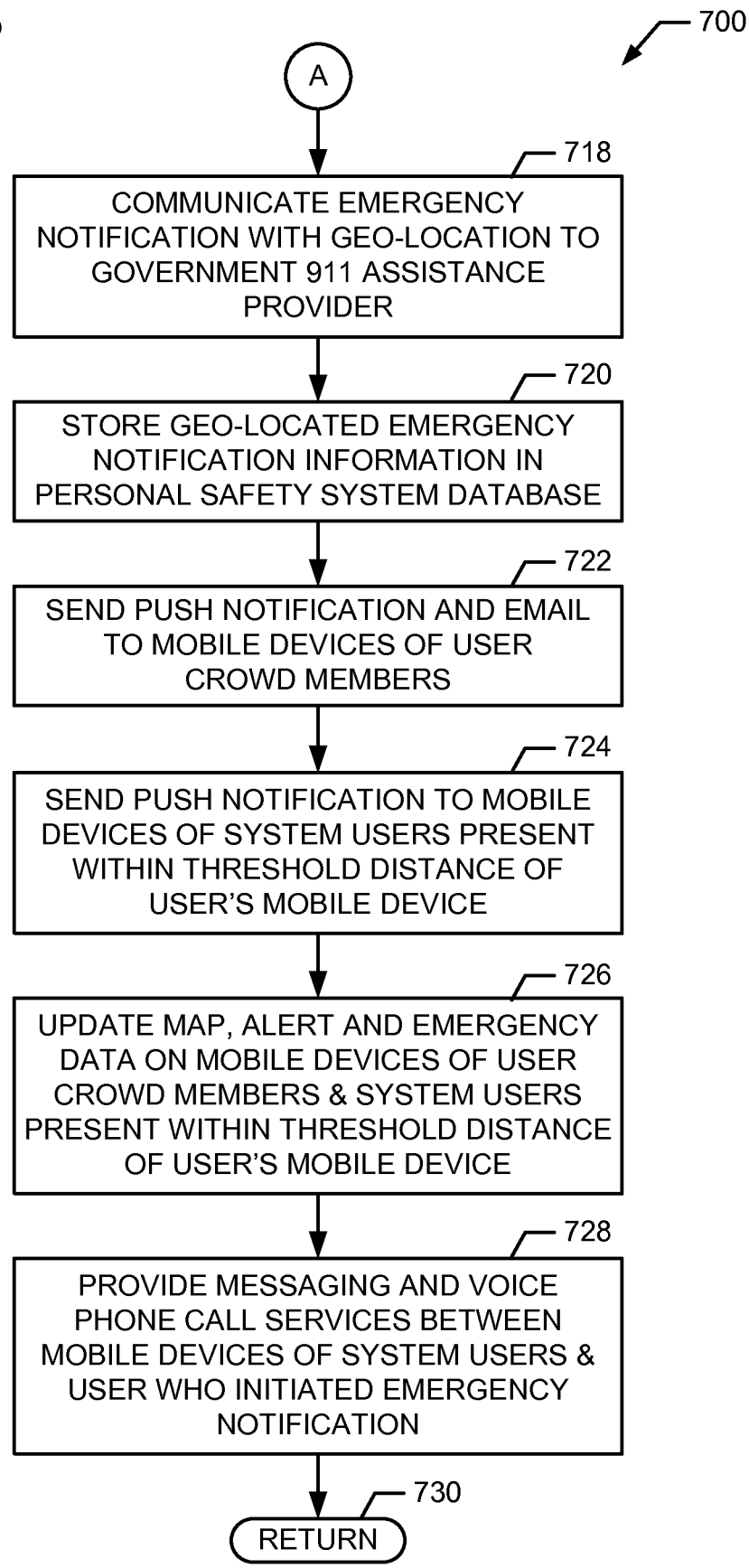
Figure 8:
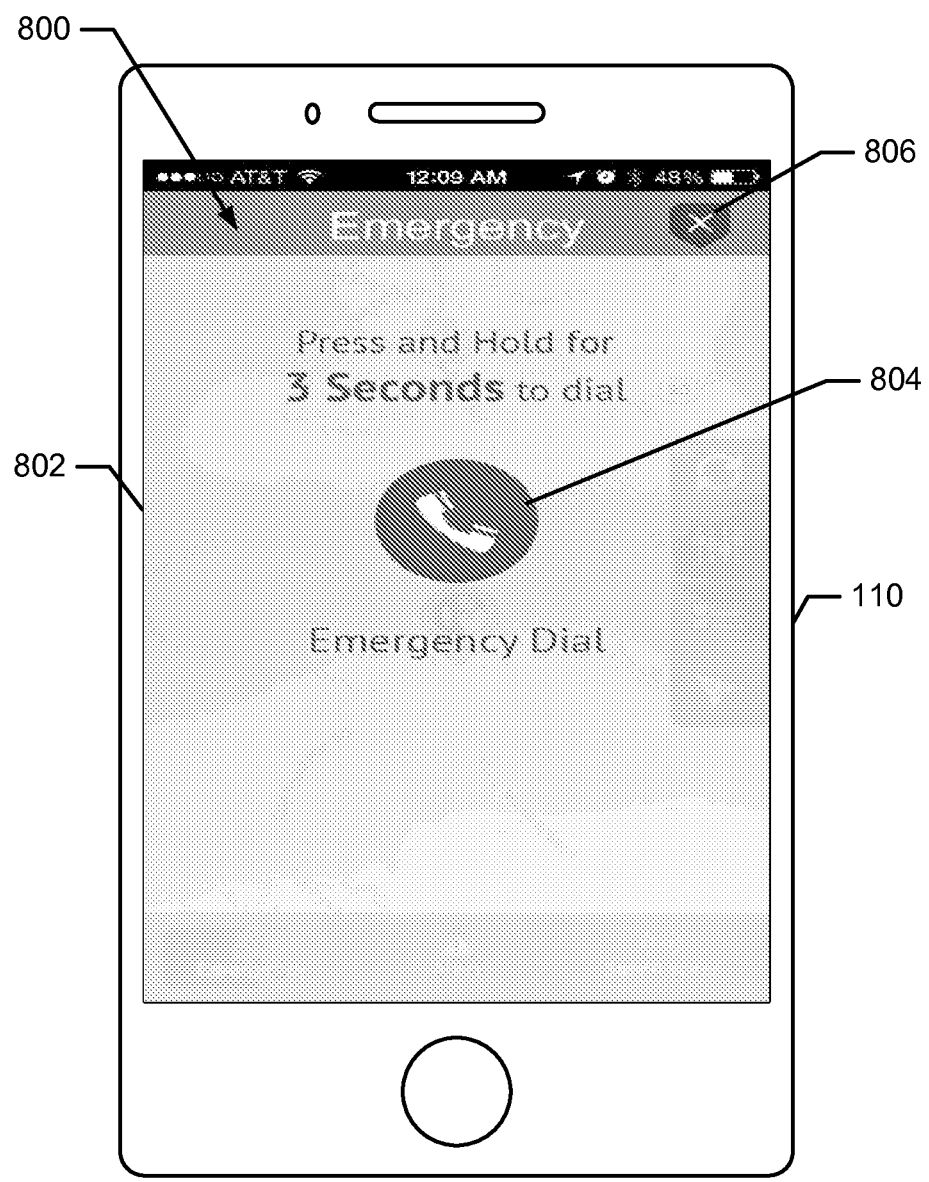
FIG. 8 displays a pictorial representation of an emergency initiation graphical user interface of the personal safety system application of the personal safety system.

FIGS. 7A-7B display a flowchart representation of a method 700 of the personal safety system 100 for initiating an emergency notification when a system user 112 requires emergency assistance. The personal safety system 100 implements and follows the method 700 in response to receiving selection of the emergency button 306 of the home page graphical user interface 300 by a system user 112. After starting operation according to method 700 at step 702, the personal safety system application 108 causes the mobile device 110 to display an emergency initiation graphical user interface 800 (see FIG. 8) at step 704. The emergency initiation graphical user interface 800 includes a window 802 having a dial button 804 and instructions directing the system user 112 to press and hold the dial button 804 for three seconds. The emergency initiation graphical user interface 800 also includes a cancel button 806 that enables a system user 112 to return to the home page graphical user interface 300.

Next, at step 706, the personal safety system application 108 determines if the cancel button 806 has been selected by the system user 112. If so, at step 708, the personal safety system 100 returns to operating according to method 200 and, more particularly, at step 214 where the personal safety system 100 starts updating the map, alert and emergency data displayed on the system user's mobile device 110 via the home page graphical user interface 300. Alternatively, if the personal safety system application 108 determines, at step 706, that the cancel button 806 has not been selected, the personal safety system application 108 advances to step 710 where the app 108 decides whether the dial button 804 has been pressed by the system user 112 for at least three seconds. If the dial button 804 has not been pressed for at least three seconds, the personal safety system application 108 loops back to step 706 to again determine if the cancel button 806 has been pressed by the system user 112.

If, at step 710, the personal safety system application 108 decides that the dial button 804 has been pressed by the system user 112 for at least three seconds, the personal safety system application 108 then determines the geo-location of the system user's mobile device 110 at step 712. Once the geo-location is known, the personal safety system application 108 causes the user's mobile device 110 to initiate a voice telephone call to the local governmental 911 assistance provider at step 714. Next, at step 716, the personal safety system application 108 communicates the emergency notification information and the mobile device's geo-location to the personal safety system manager software 104 and data/communication manager(s) 102. After receiving the emergency notification information and mobile device's geo-location, the personal safety system manager software 104 causes the data/communication manager(s) 102 to communicate the emergency notification information and mobile device's geo-location to the government 911 assistance provider at step 718. Then, at step 720, the data/communication manager(s) 102 store the emergency notification information and mobile device's geo-location in the personal safety system database 106.

Proceeding to step 722, the personal safety system manager software 104 causes the data/communication manager(s) 102 to send push notifications via text messaging and electronic mail messages to the mobile devices 110 of members of the system user's user crowd 114 informing the members of the emergency. Optionally, the personal safety system manager software 104 may cause the data/communication manager(s) 102 to communicate notifications via social media such as Facebook® and Twitter® to members of the system user's user crowd 114 informing the members of the emergency. Subsequently, at step 724, the personal safety system manager software 104 causes the data/communication manager(s) 102 to send push notifications concerning the emergency to system users 112 having a then current geo-location within a threshold distance of the system user 112 who initiated the emergency notification. After sending the push notifications, the personal safety system manager software 104 causes the data/communication manager(s) 102, at step 726, to update the map, alert and emergency data on the mobile devices 110 of members of the system user's user crowd 114 and of system users 112 within the threshold distance. Then, at step 728, the personal safety system manager software 104 causes the data/communication manager(s) 102 to provide messaging and voice phone call services between the mobile devices 110 of system users 112 and the user 112 who initiated the emergency notification. At step 730, the personal safety system 100 ceases operation according to method 700 and returns to operation according to method 200 at step 214 thereof.

Figure 9B:
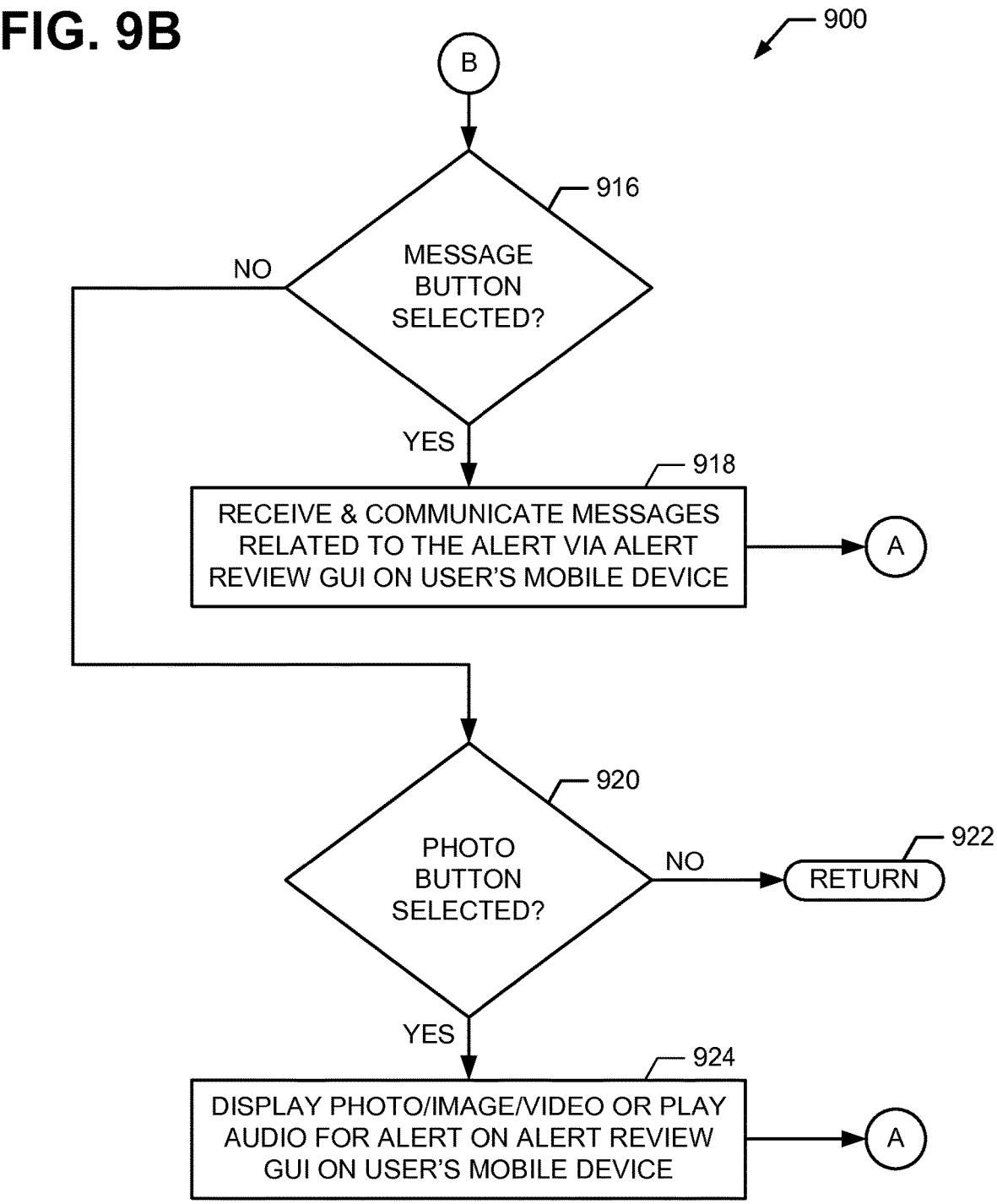

FIGS. 9A-9B display a flowchart representation of a method 900 of the personal safety system 100 for reviewing alert information that is performed by the personal safety system 100 when a system user 112 selects an alert marker 308 from the window 302 of the home page graphical user interface 300. The method 900 enables a system user 112 to review the detailed information for the alert corresponding to the selected alert marker 308. After beginning operation according to the method 900 at step 902, the personal safety system 100 and, more particularly, the personal safety system application 108 causes the user's mobile device 110 to display the alert review graphical user interface 1000 on the display thereof at step 904 including detailed information associated with the selected alert marker 308 and alert. To do so, the personal safety system manager software 104 retrieves alert information associated with the selected alert marker 308 and alert from the personal safety system database 106 and communicates the retrieved alert information to the system user's mobile device 110 and personal safety system application 108. The personal safety system application 108 then displays the retrieved alert information via the alert review graphical user interface 1000 (see FIGS. 10 and 11). It should be noted that if the alert corresponding to the selected alert marker 308 comprises an abduction, kidnapping, or missing person alert type, the displayed alert information includes the last known geo-location for the abducted, kidnapped, or missing person based on the last known geo-location of the person's mobile device 110 if such person is a system user 112.

Figure 10:
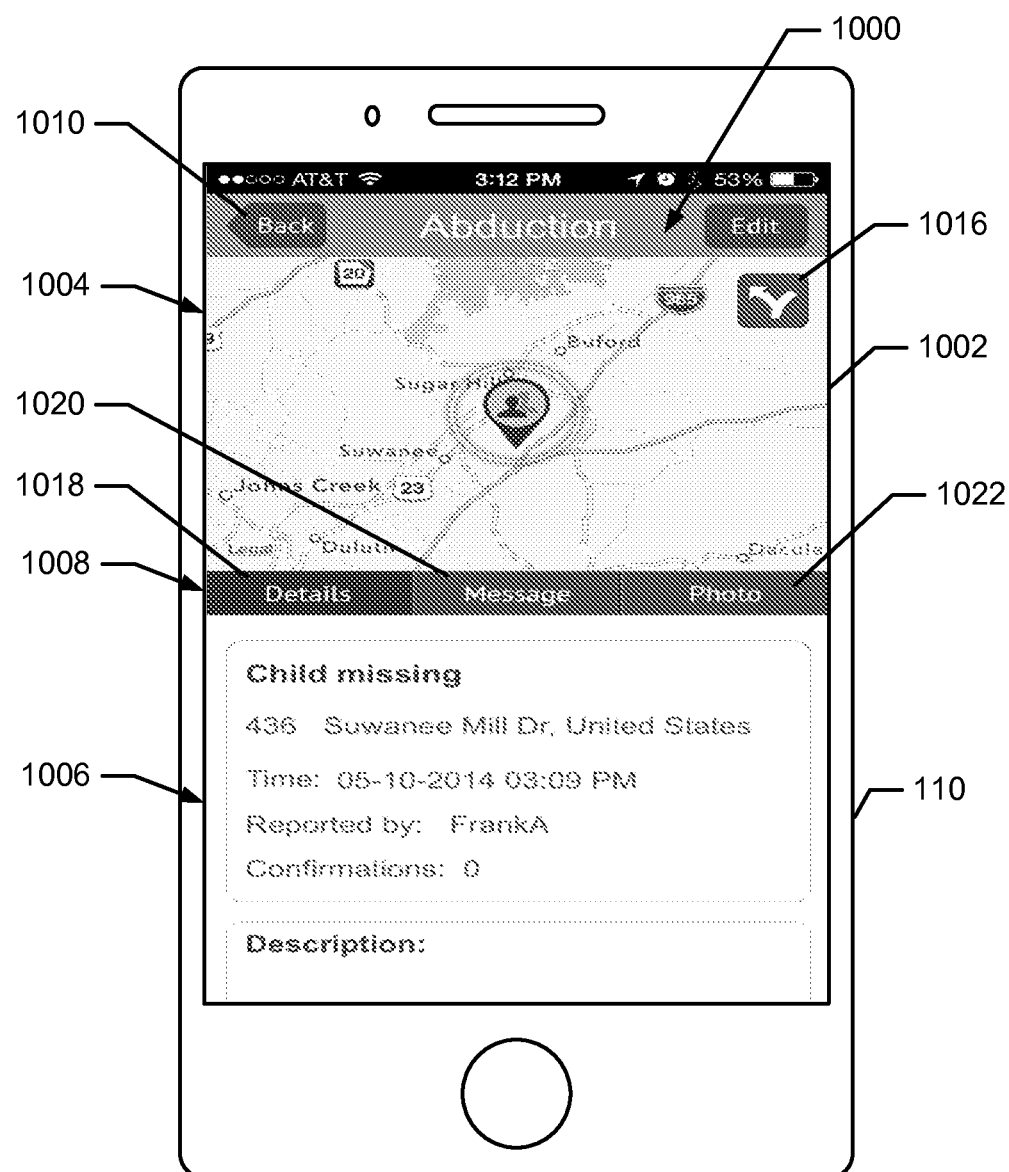
FIG. 10 displays a pictorial representation of an alert review graphical user interface of the personal safety system application of the personal safety system showing alert detailed information associated with an alert.
Figure 11:
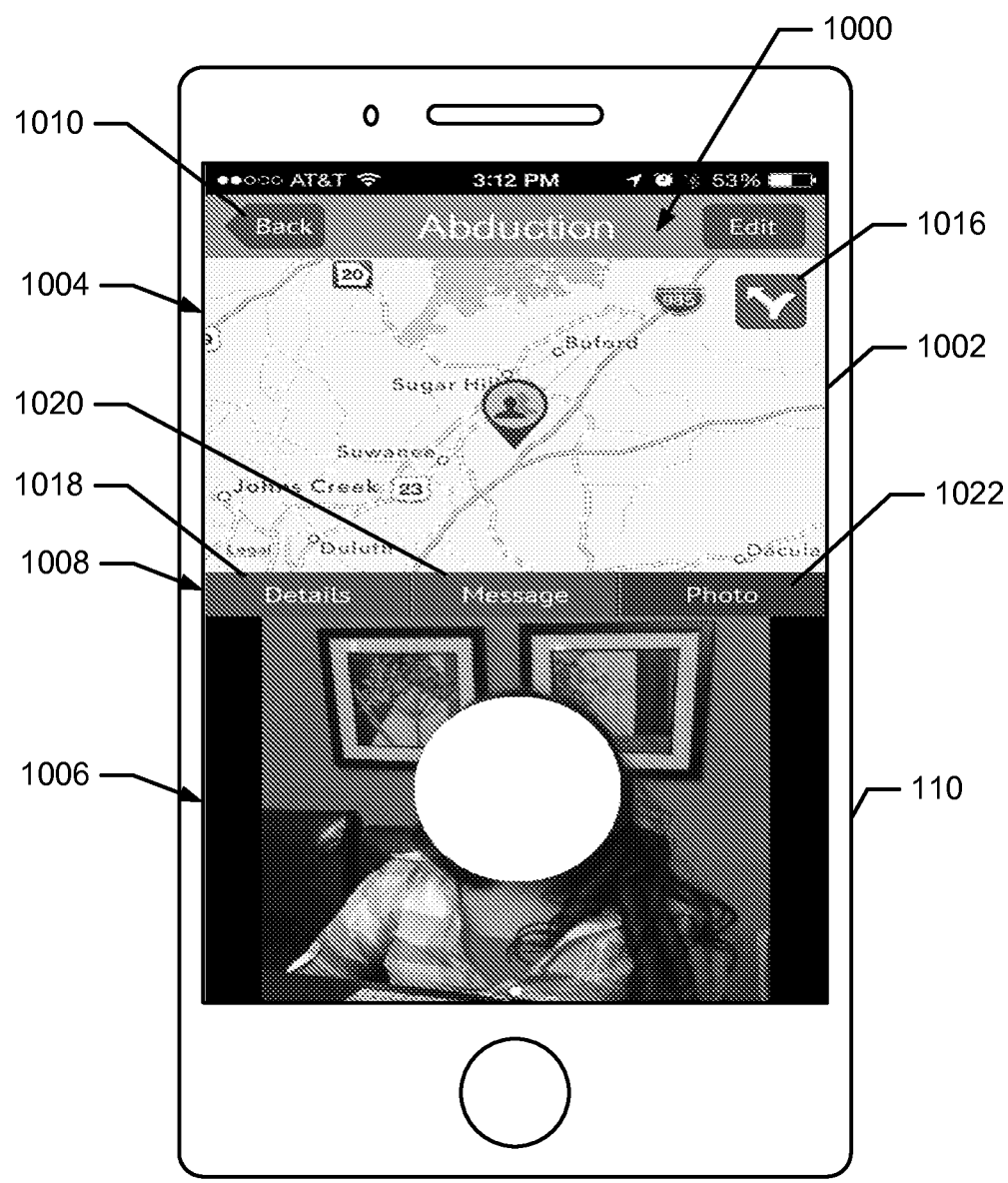
FIG. 11 displays a pictorial representation of the alert review graphical user interface of the personal safety system application of the personal safety system showing a photo associated with an alert.

As illustrated in FIGS. 10 and 11, the alert review graphical user interface 1000 includes a window 1002 having a top portion 1004, bottom portion 1006, a button bar 1008 between the top and bottom portions 1004, 1006, and a back button 1010 located in a page header 1012. The top portion 1004 displays a map 1014, an alert marker 308 indicating the geo-location of the corresponding alert on the map 1014 and the alert type, and a user-selectable route button 1016. The button bar 1008 includes a user-selectable details button 1018, message button 1020, and a photo button 1022. When first displayed, the alert review graphical user interface 1000 displays detail information associated with the selected alert marker 308 and alert. The detail information comprises the alert type, the geo-location of the alert in textual form, the date and time when the alert was created, the name of the person who created the alert, and an alert description. The detail information further comprises a number of confirmations which indicates how many others have confirmed the existence of the event that spawned the alert.

Returning to FIGS. 9A-9B, the user's mobile device 110 and personal safety system application 108 receive an input or selection from the system user 112 at step 906. Then, at step 908, the personal safety system application 108 causes the user's mobile device 110 to determine if selection of the route button 1016 has been received. If not, the personal safety system application 108 branches to step 912 of method 900 described below. If the user's mobile device 110 determines that selection of the route button 1016 has been received, the personal safety system application 108 causes the system user's mobile device 110 to display, at step 910, driving directions to the geo-location of the event to which the selected alert pertains in the bottom portion 1006 of window 1002. To do so, the personal safety system application 108 causes the user's mobile device 110 to determine its then current geo-location, communicate such geo-location to the data/communication manager(s) 102 and the personal safety system manager software 104, and request driving directions from the user's then current geo-location to the geo-location of the alert. Upon receiving the request, the personal safety system backend application 104 produces the driving directions and causes the data/communication manager(s) 102 to communicate the driving directions to the system user's mobile device 112 and the personal safety system application 108. After receiving the driving directions, the personal safety system application 108 causes the user's mobile device 112 to display the driving directions on the display of the user's mobile device 110. The personal safety system 100 then loops back to step 906 of method 900 to receive further user input.

If, at step 908, a determination is made that the route button 1016 has not been selected, the personal safety system application 108 advances to step 912 of method 900 where the app 108 causes the user's mobile device 110 to determine if the details button 1018 has been selected from the button bar 1008. If the details button 1018 has not been selected, the personal safety system application 108 branches ahead to step 916 described below. Conversely, if the details button 1018 has been selected, the personal safety system application 108 causes the mobile device 110 to again display detail information associated with the selected alert on the mobile device's display at step 914. Then, the personal safety system application 108 returns to step 906 of method 900 to receive further user input.

At step 916, the personal safety system application 108 causes the system user's mobile device 110 to determine if the message button 1020 of the button bar 1008 has been selected by the system user 112. If the message button 1020 has not been selected, the personal safety system application 108 advances to step 920 of method 900 described below. Alternatively, if the message button 1020 has been selected, the personal safety system 100 receives and communicates messages related to the selected alert, at step 918, between system users 112 similar to that seen in FIG. 14. After enabling messaging between system users 112, the personal safety system application 108 returns to step 906 to receive further user input.

Continuing at step 920 of method 900, the personal safety system application 108 determines if selection of the photo button 1022 of the button bar 1008 has been received from the system user 112. If not, then the selection comprises a selection of the back button 1010 of the alert review graphical user interface 1000 and, at step 922, the personal safety system 100 returns to operating in accordance with method 200 and loops back to step 214 where the personal safety system 100 begins to update the map, alert and emergency data displayed on the system user's mobile device 110 via the home page graphical user interface 300. If the photo button 1022 has been selected, the personal safety system application 108 causes the user's mobile device 110 to playback audio and/or display a photo/image/video, if any, of the alert information for the alert in the bottom portion 1006 of the alert review graphical user interface 1000 at step 924. To do so, the personal safety system application 108 communicates a request for the photo/image/video/audio to the personal safety system manager software 104 and after retrieving the photo/image/video/audio, if any, from the alert information stored for the alert in the personal safety system database 106, the personal safety system manager software 104 causes the data/communication manager(s) 102 to communicate the retrieved photo/image/video/audio to the user's mobile device 110 and the personal safety system application 108. After receiving the photo/image/video/audio, the personal safety system application 108 causes display of the received photo/image/video in the bottom portion 1006 of the alert review graphical user interface 1000 and/or plays back the audio. After displaying/playing the photo/image/video/audio, if any, the personal safety system application 108 returns to step 906 of method 900 to receive further user input.

Figure 12A:
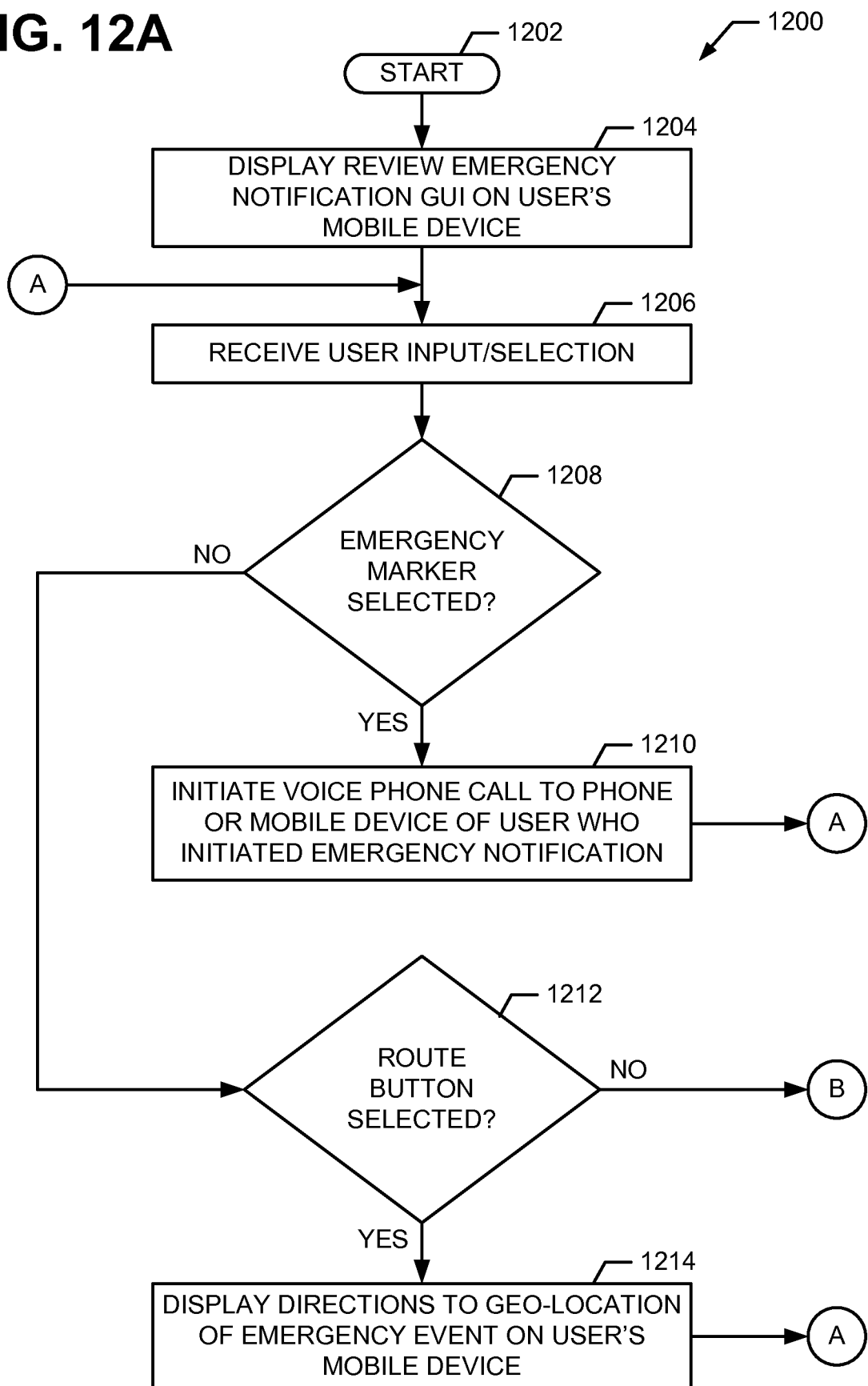
FIGS. 12A-12B display a flowchart representation of a method of the personal safety system for reviewing emergency notification details.
Figure 12B:
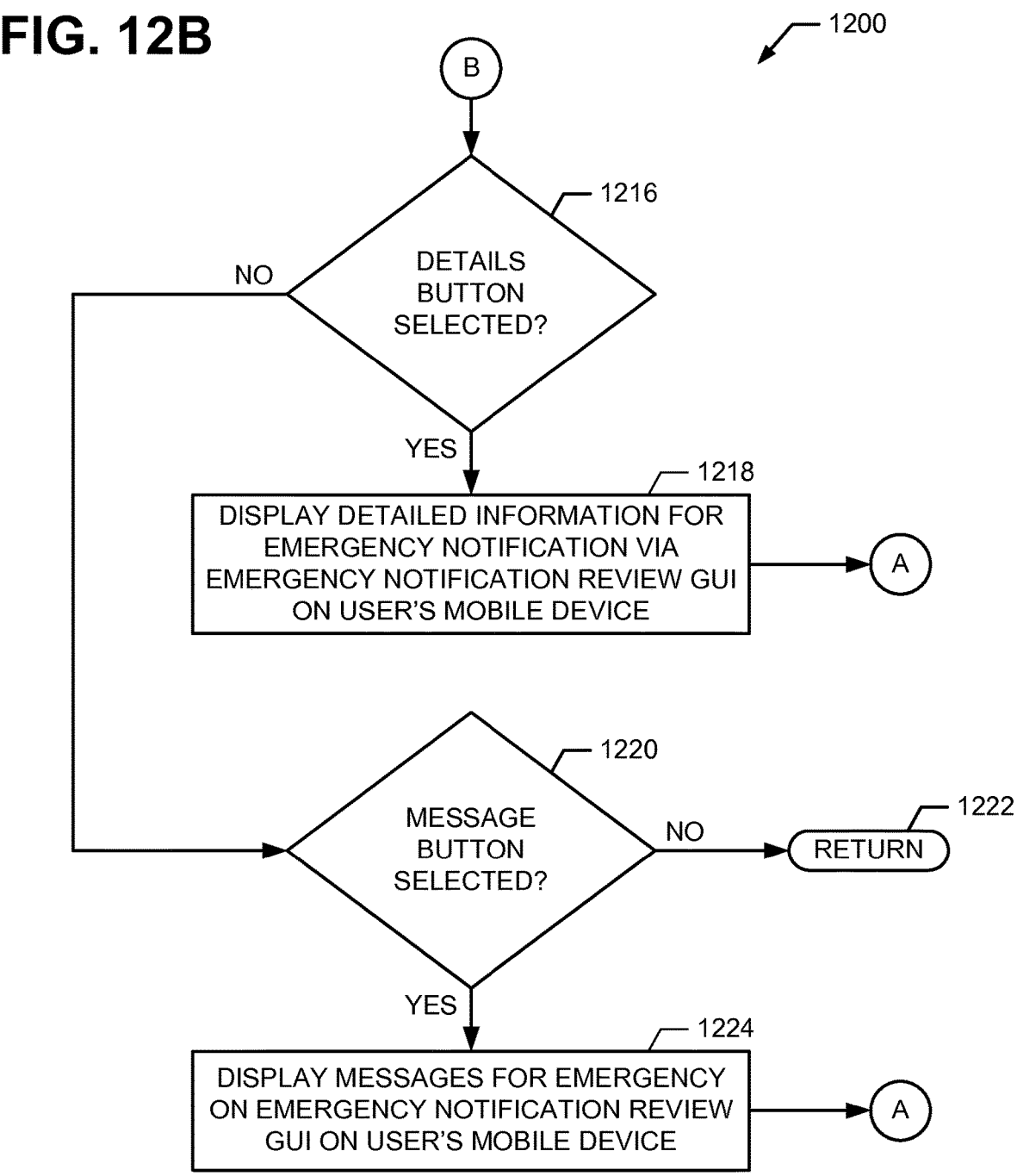

FIGS. 12A-12B display a flowchart representation of a method 1200 of the personal safety system 100 for reviewing emergency notification details that is followed and implemented by the personal safety system 100 in response to receiving selection by a system user 112 of an emergency marker 310 then displayed in the window 302 of the home page graphical user interface 300. Selection of the emergency marker 310 causes the personal safety system 100 to provide detailed information concerning the emergency notification corresponding to the emergency marker 310. After starting operation according to method 1200 at step 1202 when the personal safety system application 108 receives selection of an emergency marker 310, the personal safety system 100 causes the user's mobile device 110 to display the emergency notification review graphical user interface 1300 on the display thereof at step 1204. To do so, the personal safety system manager software 104 retrieves emergency notification information associated with the selected emergency marker 310 and emergency notification from the personal safety system database 106 and communicates the retrieved emergency notification information to the system user's mobile device 110 and personal safety system application 108. The personal safety system application 108 causes the user's mobile device 110 to display the emergency notification information via the emergency notification review graphical user interface 1300 (see FIGS. 13 and 14).

Figure 13:
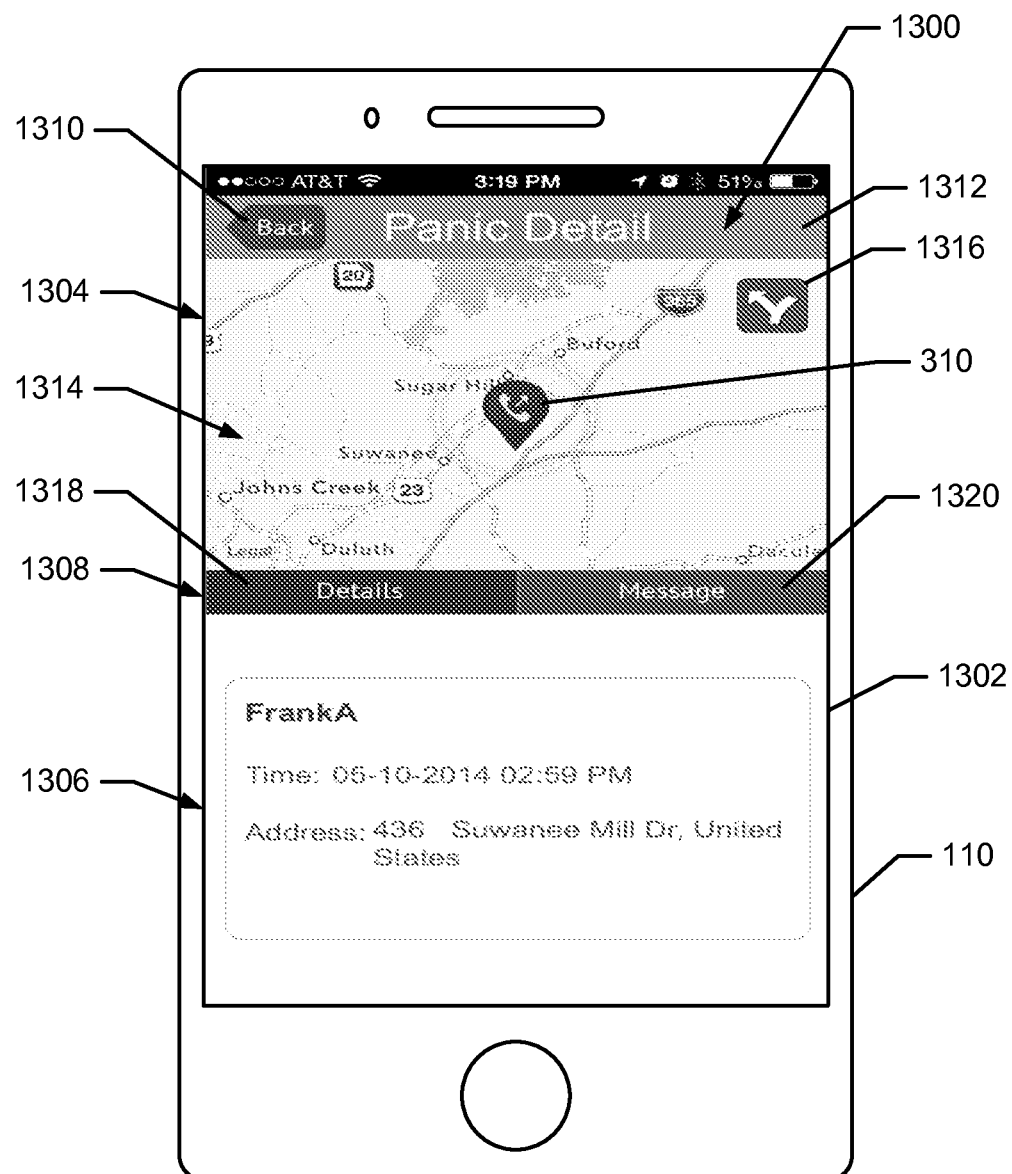
FIG. 13 displays a pictorial representation of an emergency notification review graphical user interface of the personal safety system application of the personal safety system showing emergency notification detailed information.
Figure 14:
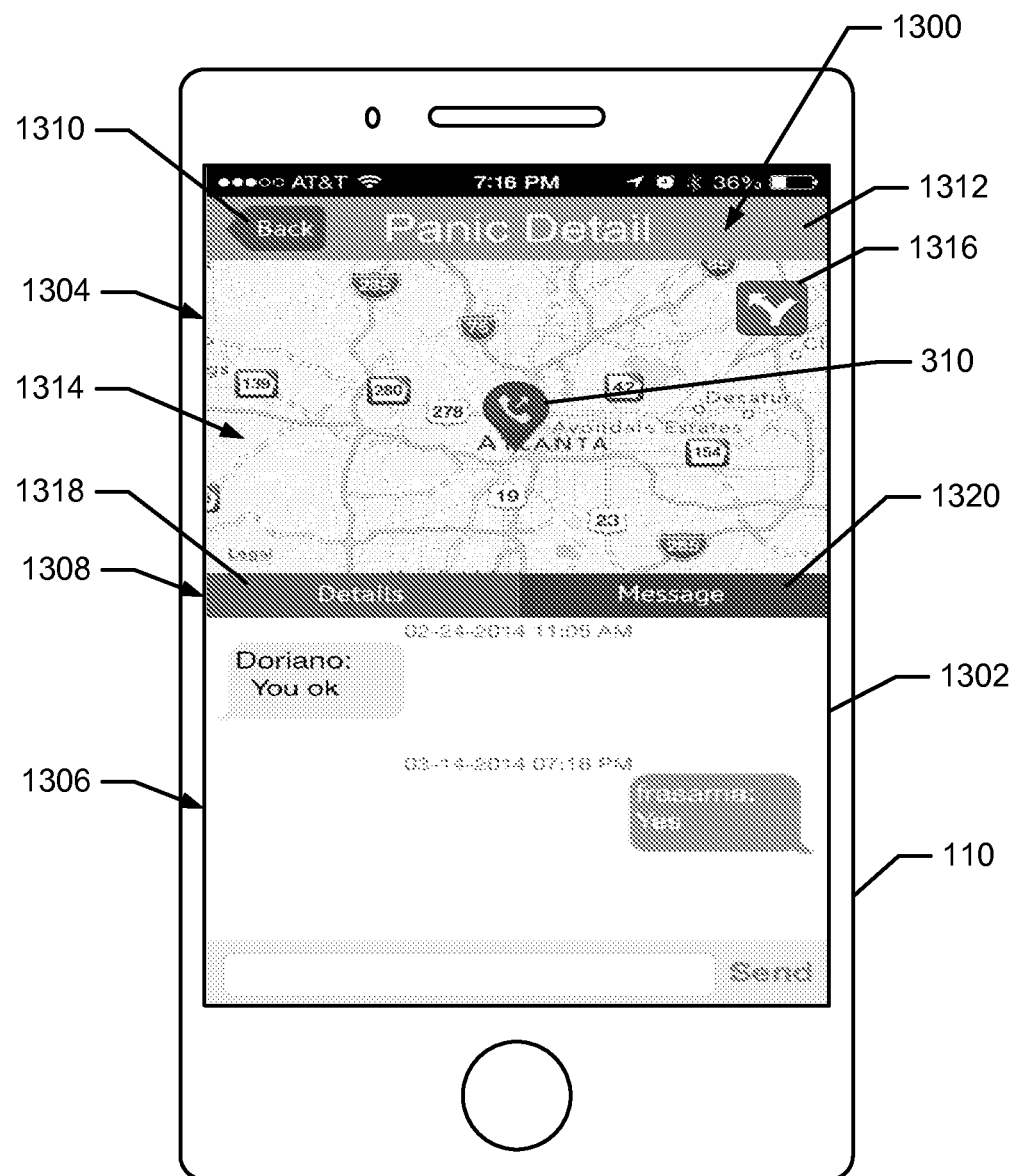
FIG. 14 displays a pictorial representation of the emergency notification review graphical user interface of the personal safety system application of the personal safety system showing an exchange of messages related to an emergency notification.

As seen in FIGS. 13 and 14, the emergency notification review graphical user interface 1300 has a window 1302 with a top portion 1304, a bottom portion 1306, a button bar 1308 located between the top and bottom portions 1304, 1306, and a back button 1310 located in a page header 1312. The top portion 1304 displays a map 1314, an emergency marker 310 indicating the geo-location of the corresponding emergency event on the map 1314, and a user-selectable route button 1316. The button bar 1308 includes a user-selectable details button 1318 and a message button 1320. When first displayed, the emergency notification review graphical user interface 1300 displays detailed information associated with the selected emergency marker 310 and associated emergency notification in the bottom portion 1306. The detailed information comprises the name of the system user 112 who initiated the emergency notification, the date and time when the emergency notification was initiated, and the geo-location of the emergency event in textual form.

Returning to FIGS. 12A-12B and after the detailed information for the emergency notification has been displayed, the system user's mobile device 110 and personal safety system application 108 receive an input or selection from the system user 112 at step 1206. Then, at step 1208, the personal safety system application 108 causes the user's mobile device 110 to determine if selection of the emergency marker 310 has been received. If not, the personal safety system application 108 branches to step 1212 of method 1200 described below. Alternatively, if selection of the emergency marker 310 has been received, the personal safety system application 108 initiates a voice phone call to the phone or mobile device 110 of the system user 112 who initiated the emergency notification. Then, the personal safety system application 108 loops back to step 1206 to receive further user input.

At step 1212 of method 1200, the personal safety system application 108 determines whether the route button 1316 has been selected by the system user 112. If not, the personal safety system application 108 advances to step 1216 described below. If the route button 1316 has been selected, the personal safety system application 108 causes the system user's mobile device 110 to display, at step 1214, driving directions to the geo-location of the emergency event to which the selected emergency notification pertains in the bottom portion 1306 of window 1302. To do so, the personal safety system application 108 causes the user's mobile device 110 to determine its then current geo-location, communicate such geo-location to the data/communication manager(s) 102 and the personal safety system manager software 104, and request driving directions from the user's then current geo-location to the geo-location of the emergency event. Upon receiving the request, the personal safety system backend application 104 generates the driving directions and causes the data/communication manager(s) 102 to communicate the driving directions to the system user's mobile device 112 and the personal safety system application 108. After receiving the driving directions, the personal safety system application 108 causes the user's mobile device 112 to display the driving directions on the display of the user's mobile device 110. The personal safety system 100 then loops back to step 1206 of method 1200 to receive further user input.

Continuing at step 1216 of method 1200, the personal safety system application 108 determines if the details button 1318 of the button bar 1308 has been selected by the system user 112. If not, the personal safety system application 108 advances to step 1220 described below. Conversely, if the system user 112 has selected the details button 1318, the personal safety system application 108 causes the mobile device 110 to again display detailed information associated with the selected emergency event on the mobile device's display at step 1218. Then, the personal safety system application 108 returns to step 1206 of method 1200 to receive further user input.

If, at step 1216, the personal safety system application 108 determines that the details button 1318 has not been selected, the personal safety system application 108 then determines if the message button 1320 of the button bar 1308 has been selected by the system user 112. If the message button 1320 has not been selected, then the user's selection comprises a selection of the back button 1310 of the emergency notification review graphical user interface 1300 and, at step 1322, the personal safety system 100 returns to operating in accordance with method 200 and loops back to step 214 where the personal safety system 100 begins to update the map, alert and emergency data displayed on the system user's mobile device 110 via the home page graphical user interface 300. Alternatively, if the message button 1320 has been selected, the personal safety system 100 receives and communicates messages related to the selected emergency notification, at step 1224, between system users 112 using the bottom portion 1306 of window 1302 as illustrated in FIG. 14. After enabling messaging and displaying messages between system users 112, the personal safety system application 108 returns to step 1206 to receive further user input.

Figure 15A:
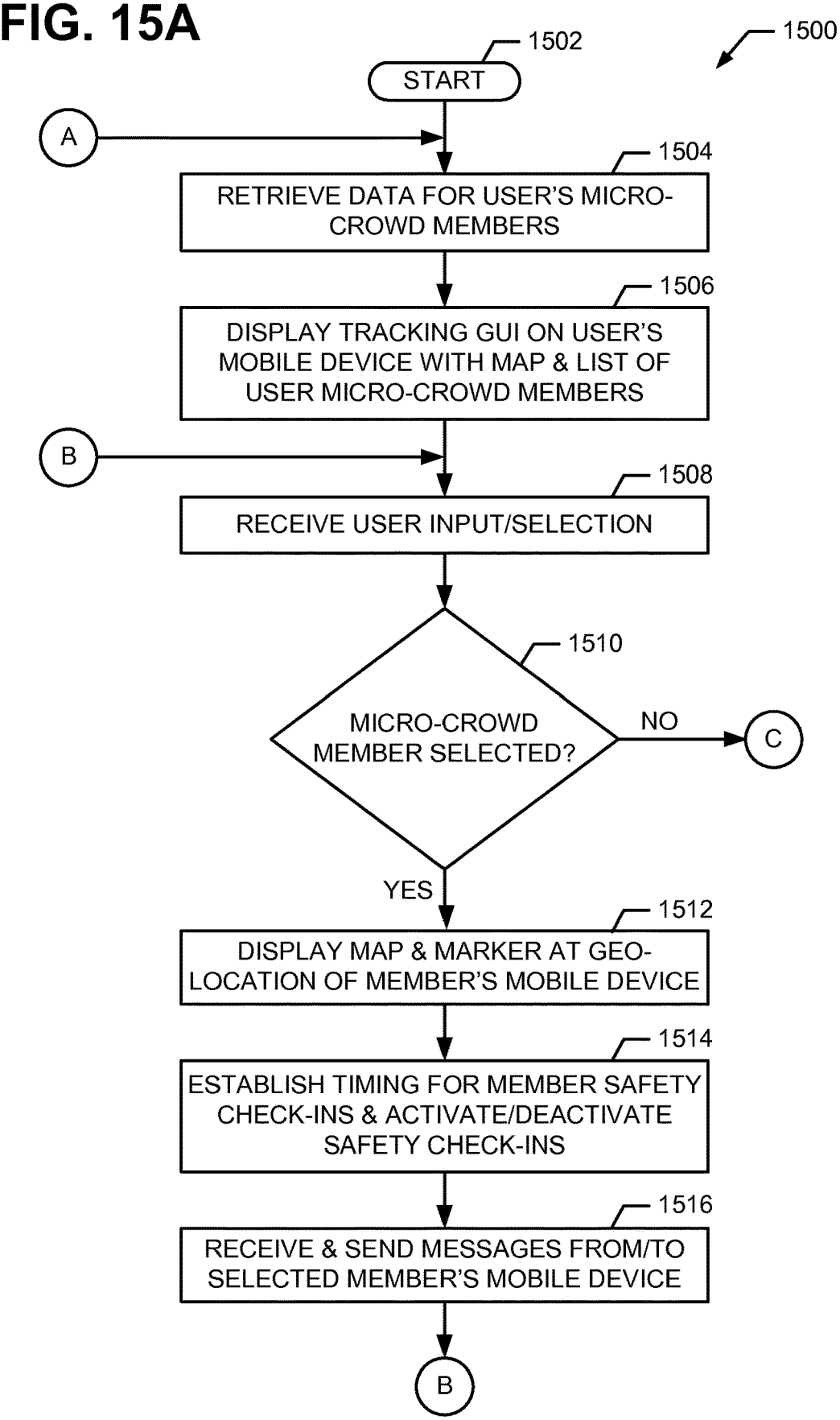
FIGS. 15A-15C display a flowchart representation of a method of the personal safety system for tracking user micro-crowd members.
Figure 15B:
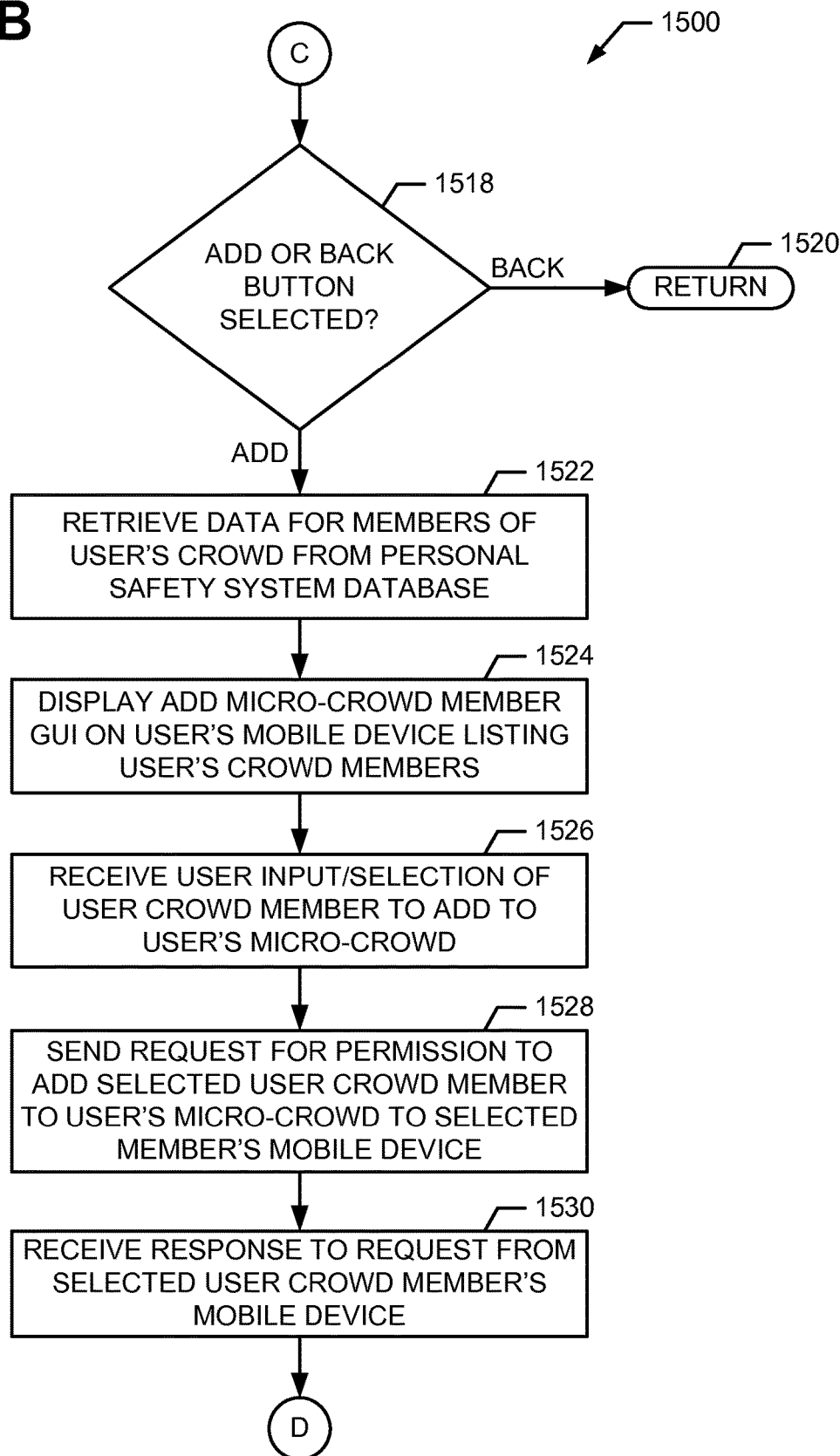
Figure 15C:
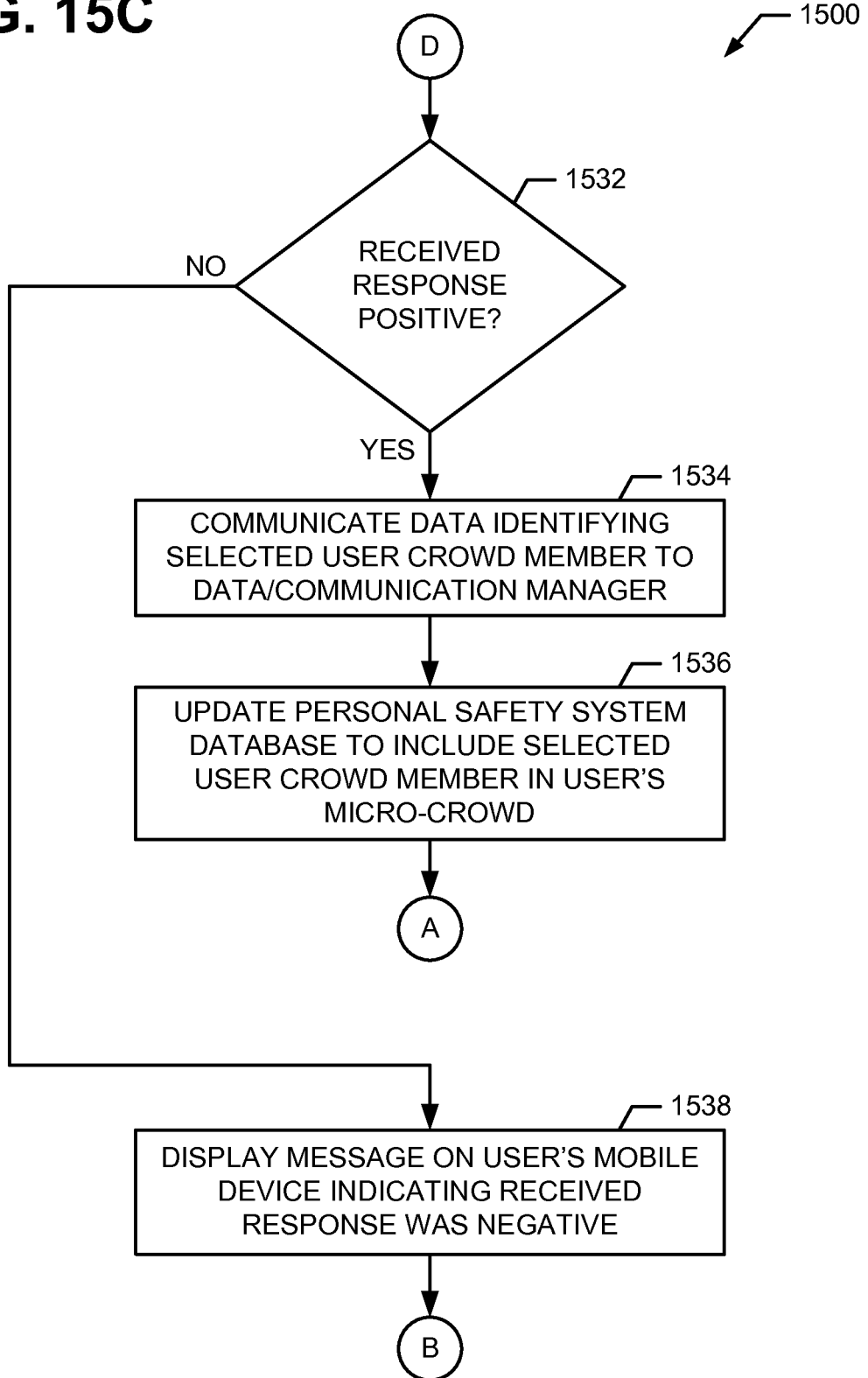

FIGS. 15A-15C display a flowchart representation of a method 1500 of the personal safety system 100 for tracking user micro-crowd members. The personal safety system 100 operates according to and implements the method 1500 when a system user 112 selects the tracking button 312 from the home page graphical user interface 300 of the personal safety system application 108. Through use of the method 1500, a system user 112 adds selected members of the user's user crowd 114 to the user's micro-crowd 114 for tracking of the selected members' geo-locations and safety check-ins, may display the then current geo-location of a selected micro-crowd member, and may establish the timing for automatically tracking safety check-in notifications to be generated by the personal safety system 100.

Figure 16:
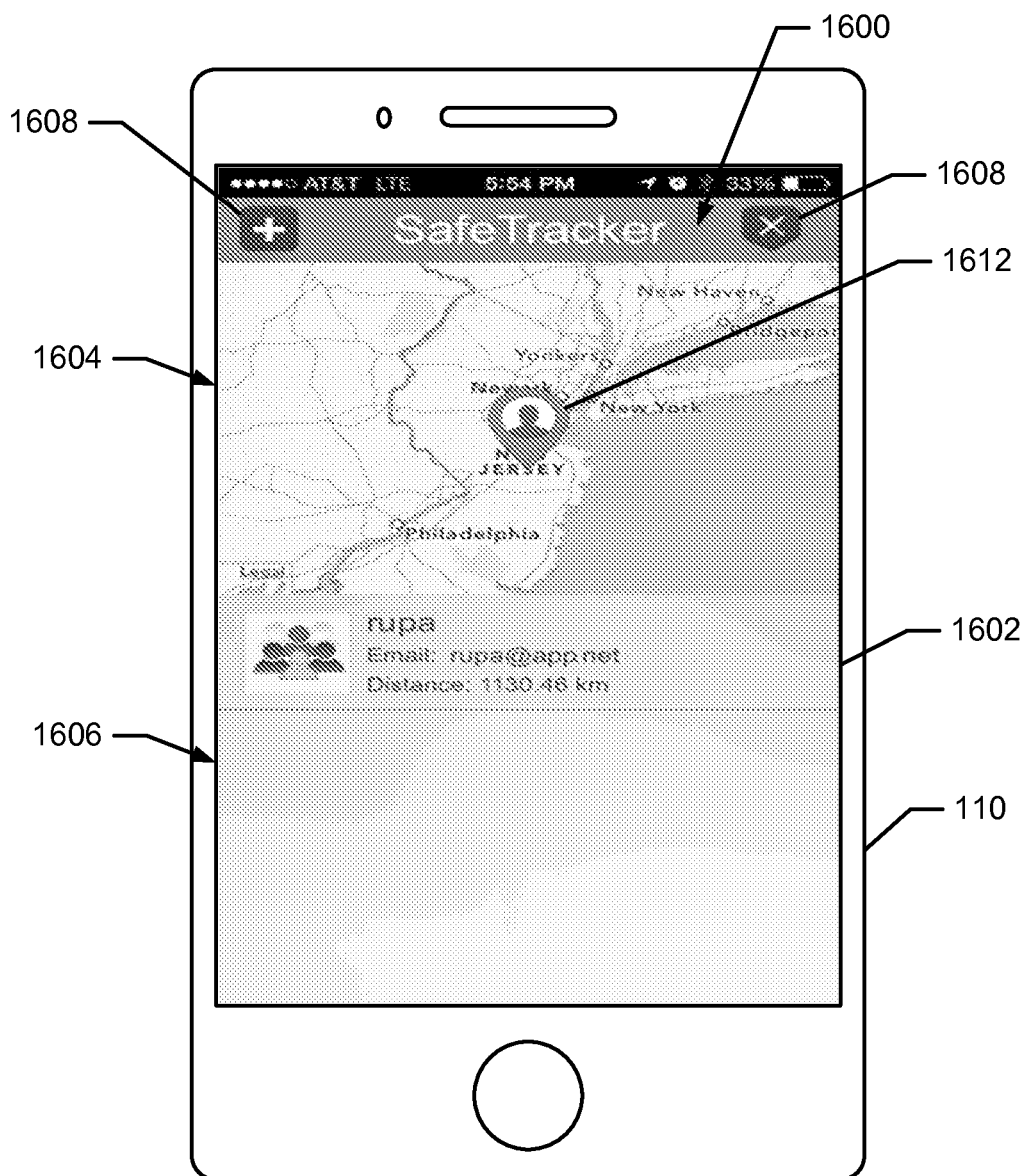
FIG. 16 displays a pictorial representation of a tracking graphical user interface of the personal safety system application of the personal safety system showing a list of members of a system user's micro-crowd.

After starting operation according to method 1500 at step 1502, the personal safety system 100 retrieves data from the personal safety system database 106 identifying and associated with the then current members of the system user's micro-crowd 116 at step 1504. Then, at step 1506, the personal safety system application 108 causes display of the tracking graphical user interface 1600 (see FIG. 16) on the display of the user's mobile device 110 together with a list of the members of the user's micro-crowd 116. As illustrated in FIG. 16, the tracking graphical user interface 1600 includes a window 1602 having a top portion 1604 and a bottom portion 1606. The tracking graphical user interface 1600 also includes an add button 1608 and a back button 1610. The top portion 1604 of the window 1602 generally displays map data and a micro-crowd member marker 1612 identifying the then current geo-location of a selected member of the user's micro-crowd 116. The bottom portion 1606 of the window 1602 typically displays the list of the then current members of the user's micro-crowd 116 retrieved from the personal safety system database 106.

Returning to FIG. 15A and continuing at step 1508 of method 1500, the personal safety system application 108 receives user input corresponding to the selection of a member of the user's micro-crowd 116 from the list displayed in the bottom portion 1606 of window 1602, selection of the add button 1608, or selection of the back button 1610. The personal safety system application 108 then determines, at step 1510, whether the user selected a member of the micro-crowd 116 from the list. If not, the personal safety system application 108 advances to step 1518 of method 1500 described below. If a member of the users' micro-crowd 116 was selected, the personal safety system 100 causes display, at step 1512, of a micro-crowd member marker 1612 superimposed on a map in the top portion 1604 of window 1602 at the then current geo-location of the member's mobile device 110 and, hence, of the member. To cause such display, the personal safety system 100 obtains the then current geo-location of the member's mobile device 110 by the personal safety system manager software 104 sending a request for the geo-location to the member's mobile device 110 and receiving back the geo-location. Then, the personal safety system manager software 104 retrieves map data from the personal safety system database 106 corresponding to the geographical area around the then current geo-location of the member's mobile device 110, and communicates the map data and geo-location of the member's mobile device 110 to the personal safety system application 108. Subsequently, the personal safety system application 108 causes display of a map derived from the received map data and a micro-crowd member marker 1612 at the member's then current geo-location in the top portion 1604 of the tracking graphical user interface 1600.

Next, at step 1514, the personal safety system 100 activates/deactivates safety check-ins by the selected member of the user's micro-crowd 116 and establishes the timing for one or more such safety check-ins by the selected member. By requiring the selected member of the user's micro-crowd 116 to check-in at a particular time or to periodically check-in with the system user 112, the system user 112 knows that the selected member is safe. This system capability is particularly useful, for example, to a system user 112 attempting to make sure that his/her children are safe, or to a married system user 112 attempting to make sure that their spouse has reached a destination safely.

The optional activation/deactivation of safety check-ins for the selected member enables the system user 112 to require/not require such safety check-ins depending on current circumstances. The timing may be established by the system user 112 providing input to the personal safety system application 108 identifying a particular time or series of times by which the selected member must check-in with the system user 112, or identifying a time period offset used by the personal safety system 100 to calculate periodic times by which the selected member must check-in with the system user 112. The personal safety system 100 receives activation/deactivation and timing input from the system user 112 through display of a graphical user interface in the bottom portion 1606 of window 1602 with appropriate options and input fields for receiving system user 112 input. After receiving activation/deactivation and timing information for safety check-ins by the selected member, the personal safety system application 108 communicates the activation/deactivation and timing information to the data/communication manager(s) 102 and personal safety system manager software 104. The personal safety system manager software 104 then stores the activation/deactivation and timing information in association with the system user 112 and the selected member of the user's micro-crowd 116 in the personal safety system database 106. The personal safety system manager software 104 also operates with respect to safety check-ins as described below with respect to FIG. 17.

Continuing at step 1516 of method 1500, the personal safety system 100 optionally receives and sends messages from/to the system user 112 and selected member of the user's micro-crowd 116. This feature may be used by the system user 112 and selected member for safety check-ins or to communicate other information or thoughts. To provide such messaging, the personal safety system application 108 displays a graphical user interface similar to that illustrated in FIG. 14 in the bottom portion 1606 of window 1602. After enabling and performing messaging between the system user 112 and selected member, the personal safety system 100 loops back to step 1508 to receive further user input.

At step 1518, the personal safety system application 108 determines if the system user 112 has selected the add button 1608 or back button 1610. If the system user 112 has selected the back button 1610, the personal safety system 100 ceases operation according to method 1500 and returns to operation in accordance with method 200 at step 1520. Alternatively, if the system user 112 has selected the add button 1608, the personal safety system application 108 causes the names and associated information of the members of the user's user crowd 114 to be retrieved from the personal safety system database 106 by the personal safety system manager software 104 and communicated to the personal safety system application 108 at step 1522.

Advancing to step 1524 of method 1500, the personal safety system application 108 causes display of an add micro-crowd member graphical user interface on the user's mobile device 110. The add micro-crowd member graphical user interface includes the names of then current members of the user's user-crowd 114 retrieved from the personal safety system database 106 at step 1522 and permits the system user 112 to select a member of his/her user-crowd 114 to be a member of his/her micro-crowd 116. Next, the personal safety system application 108 receives input from the system user 112 at step 1526 selecting one of the displayed members of his/her user-crowd 114 for addition to his/her micro-crowd 116. After receiving the selection of displayed member of the user's user-crowd 114, the personal safety system 100 sends a request, at step 1528, to the selected member via the selected member's mobile device 110 requesting permission to add the selected member to the user's micro-crowd 116. Then, at step 1530, the personal safety system 100 receives a response to the request from the selected member. Typically, such request and response are communicated via text message or electronic mail.

At step 1532, the personal safety system application 108 determines if the response is a positive response granting permission by the selected member of the user's user-crowd 114 to be added as a member of the user's micro-crowd 116. If so, at step 1534, the personal safety system application 108 causes the user's mobile device 110 to communicate data to the data/communication manager(s) 102 and personal safety system manager software 104 identifying the member of the user's user-crowd 114 to be added to the user's micro-crowd 116. Then, at step 1536, the personal safety system manager software 104 updates the personal safety system database 106 to include the selected member as a member of the system user's micro-crowd 116. After the update is complete, operation of the personal safety system 100 returns to step 1504 of method 1500 to update the tracking graphical user interface 1600 to list the newly added member of the user's micro-crowd 116.

If, at step 1532, the personal safety system application 108 determines that the response is a negative response with permission not being granted by the selected member of the users user-crowd 114, the personal safety system application 108 displays a message on the system user's mobile device 110 indicating that the response was negative. Then, the personal safety system 100 returns to step 1508 of method 1500 to receive further user input.

Figure 17:
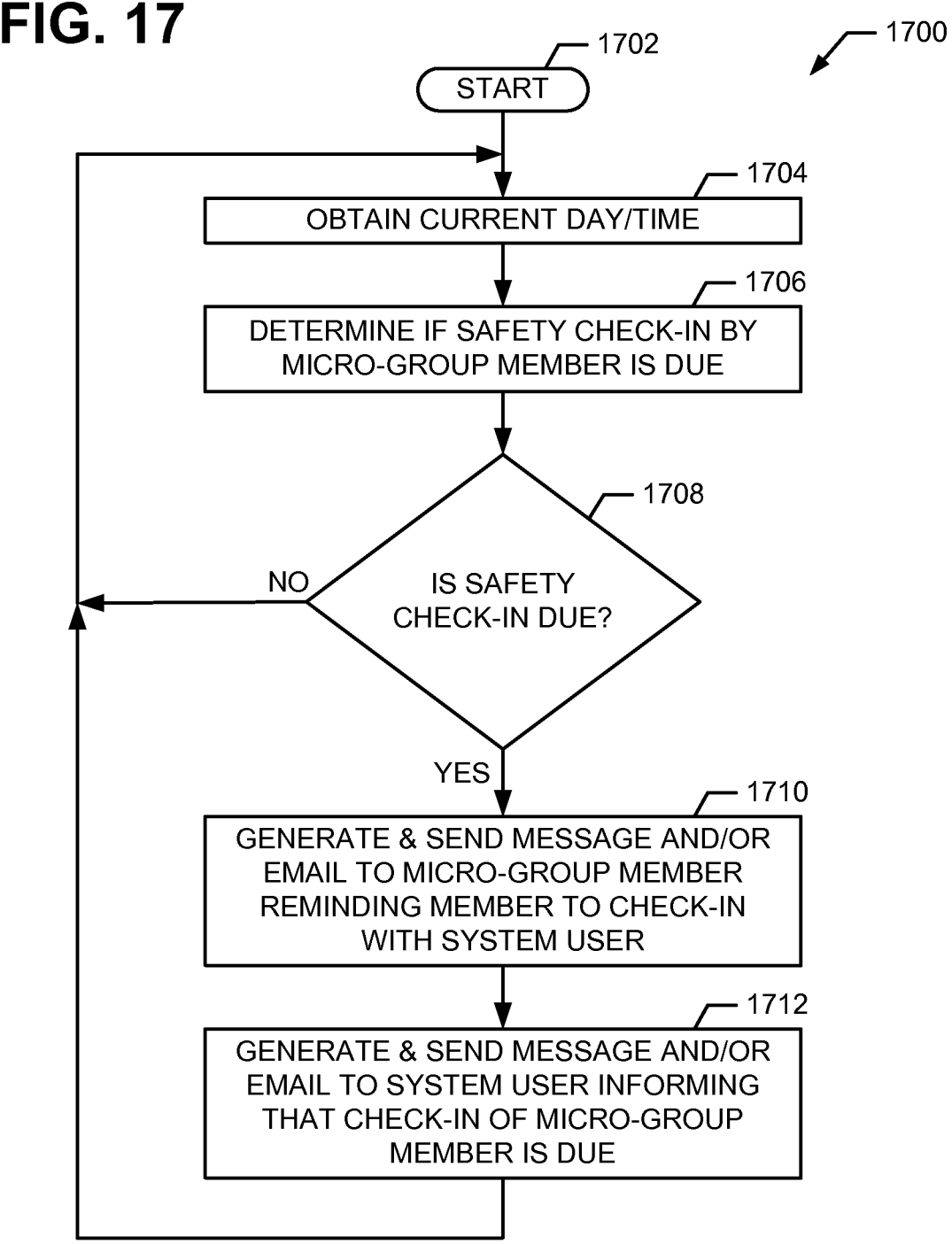
FIG. 17 displays a flowchart representation of a method of the personal safety system for producing safety check-in notifications.

FIG. 17 displays a flowchart representation of a method 1700 of the personal safety system 100 for producing safety check-in notifications in response to the personal safety system 100 receiving input from a system user 112 activating safety check-ins for a member of the user's micro-crowd 116. The method 1700 is implemented and followed by the personal safety system manager software 104 and data/communication manager(s) 102. While the method 1700 is described herein with regard to a single system user 112, it should be understood and appreciated that the method 1700 is followed in connection with all system users 112 and all members of such system users' micro-crowds 116.

After starting operation according to method 1700 at step 1702, the personal safety system manager software 104 obtains the current date and time from a system clock or other reliable source at step 1704. Then, at step 1706, the personal safety system manager software 104 determines if a safety check-in by a member of a system user's micro-crowd 116 is due. To make this determination, the personal safety system manager software 104 retrieves the activation/deactivation and timing data for the member of the system user's micro-crowd 116. If the data indicates that safety check-ins are activated for and, hence, required by the member, the personal safety system manager software 104 then determines if generation of a safety check-in notification is necessary based on the then current day/time and timing data previously established by the system user 112 for such safety check-ins. If the personal safety system manager software 104 determines that no safety check-in is due by the member, then at step 1708, the personal safety system manager software 104 branches back to step 1704 to again obtain the then current date and time.

Alternatively, if the personal safety system manager software 104 determines that a safety check-in is due by the member, then at step 1708, the personal safety system manager software 104 advances to step 1710 of method 1700. At step 1710, the personal safety system manager software 104 causes generation of a safety check-in notification comprising a message or electronic mail reminding the member of the user's micro-crowd 116 that a safety check-in is due and communication of the safety check-in notification to the member's mobile device 110. Next, at step 1712, the personal safety system manager software 104 causes generation of a safety check-in notification comprising a message or electronic mail informing the system user 112 that a safety check-in by the member is due and communication of the safety check-in notification to the system user's mobile device 112. After communicating the message or electronic mail, the personal safety system manager software 104 loops back to step 1704 of method 1700 and continually operates in this manner whenever the data/communication manager(s) 102 are operating.

Figure 18A:
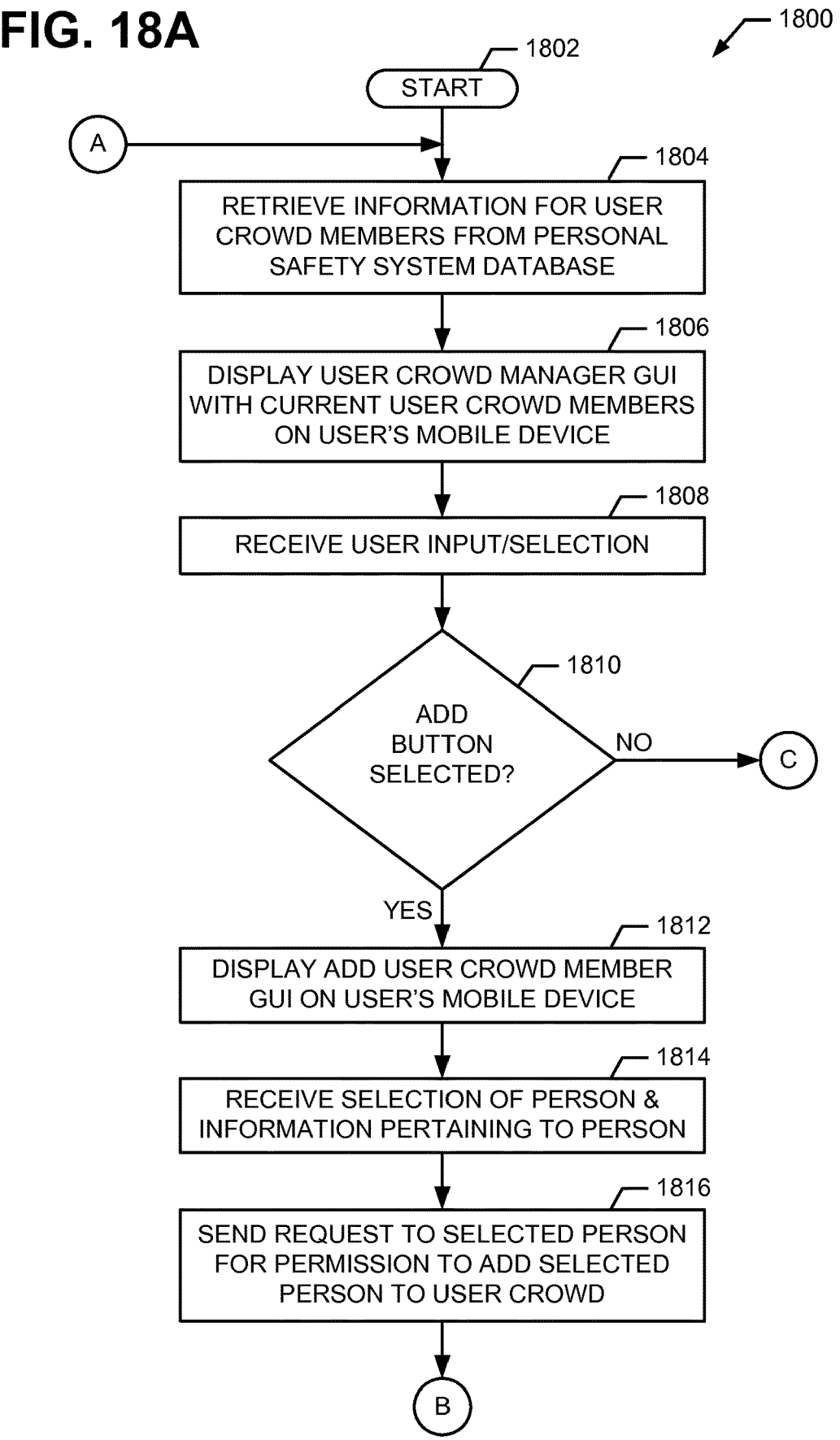
FIGS. 18A-18C display a flowchart representation of a method of the personal safety system for adding/editing members to/of a system user's user crowd.
Figure 18B:
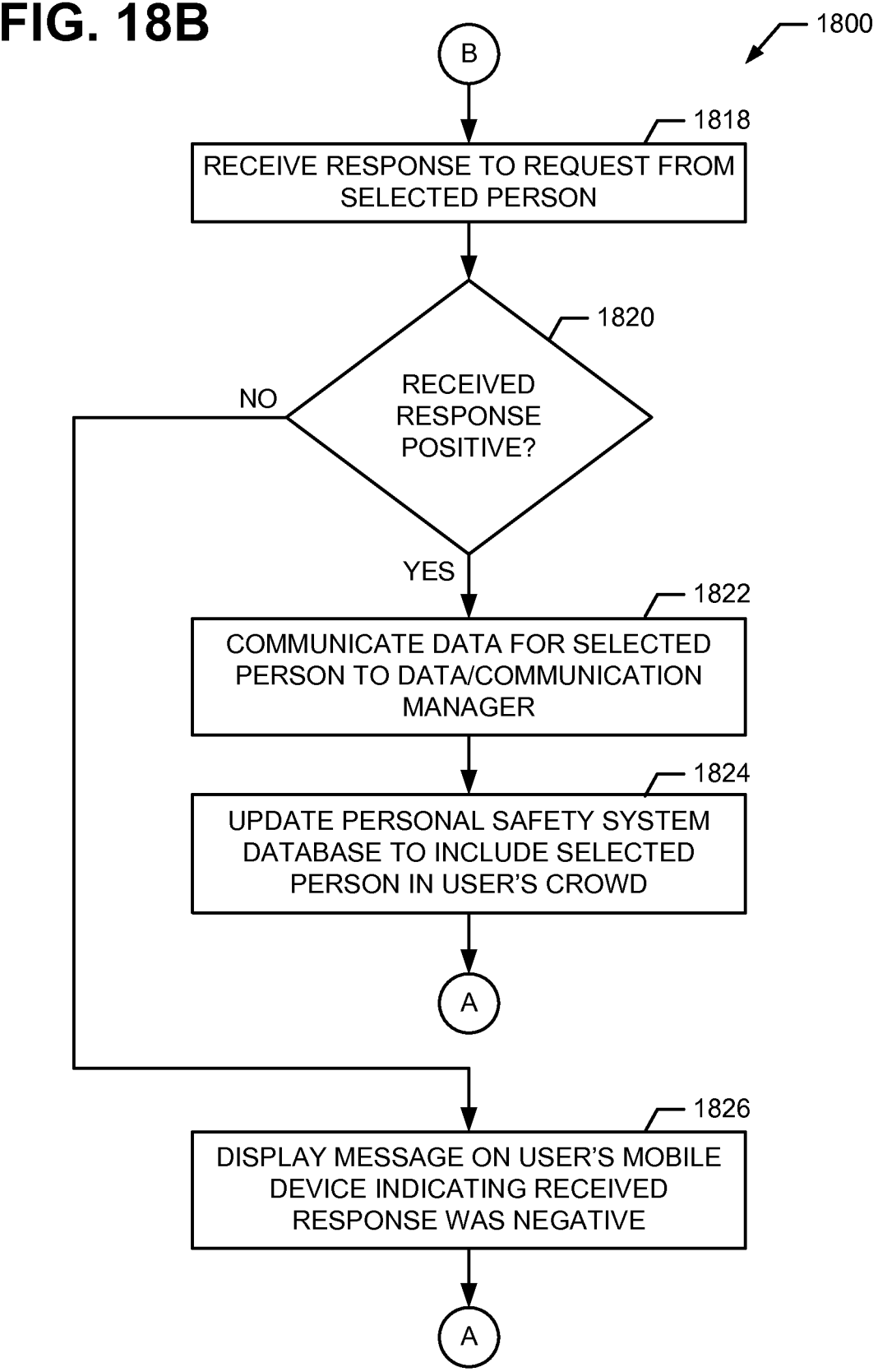
Figure 18C:
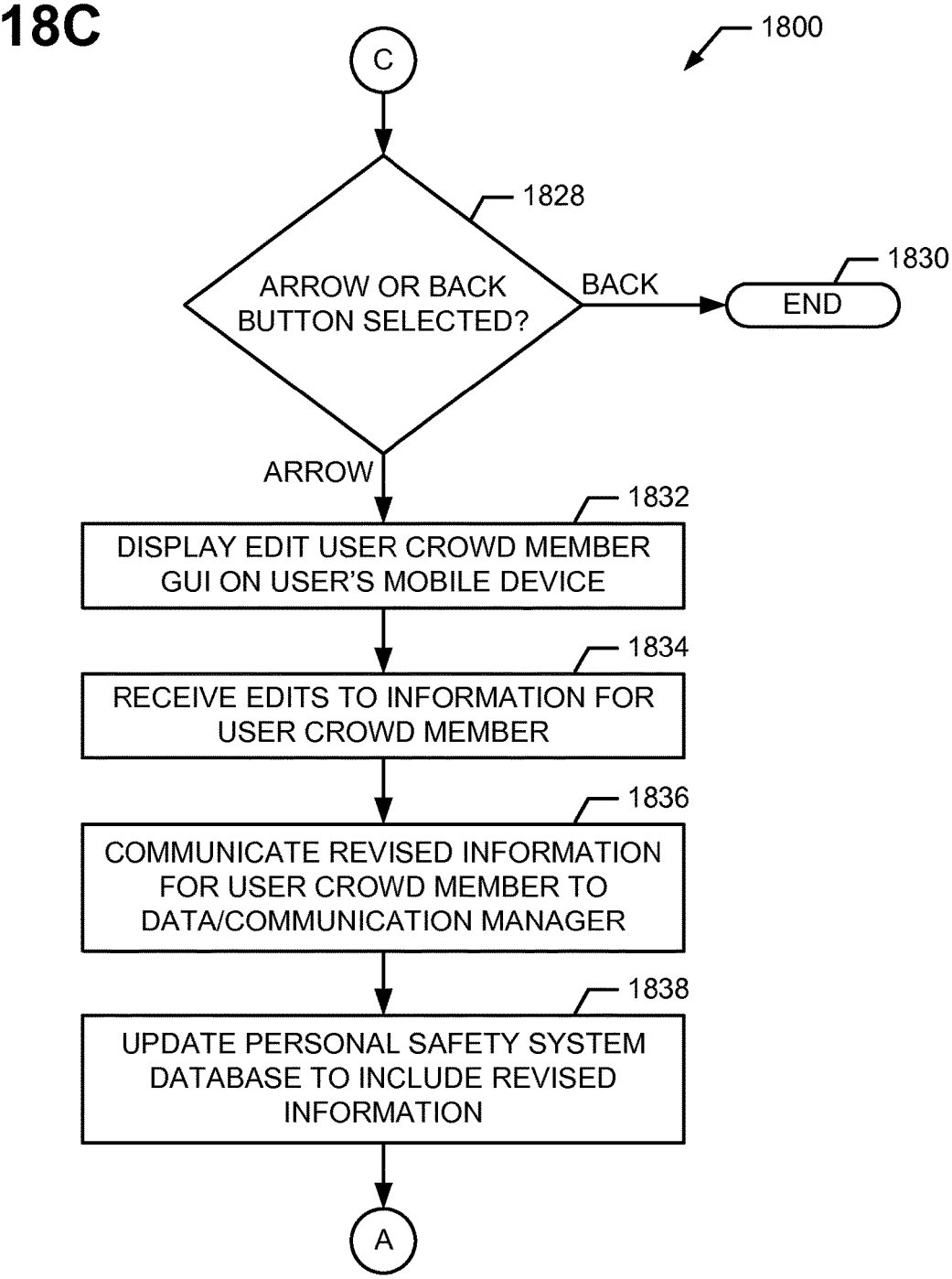
Figure 19:
FIG. 19 displays a pictorial representation of a main menu graphical user interface of the personal safety system application of the personal safety system showing an add/edit user crowd menu option.

FIGS. 18A-18C display a flowchart representation of a method 1800 of the personal safety system 100 for adding/editing members to/of a system user's user crowd 114. The method 1800 is implemented and followed by the personal safety system 100 whenever a system user 112 desires to add a new member to his/her user crowd 114 or to edit information previously input for the member. Operation according to the method 1800 is initiated when the personal safety system application 108 receives selection of the main menu button 316 from the system's home page graphical user interface 300 and subsequent selection of an add/edit user crowd menu option 1902 from a main menu graphical user interface 1900 (see FIG. 19).

Figure 20:
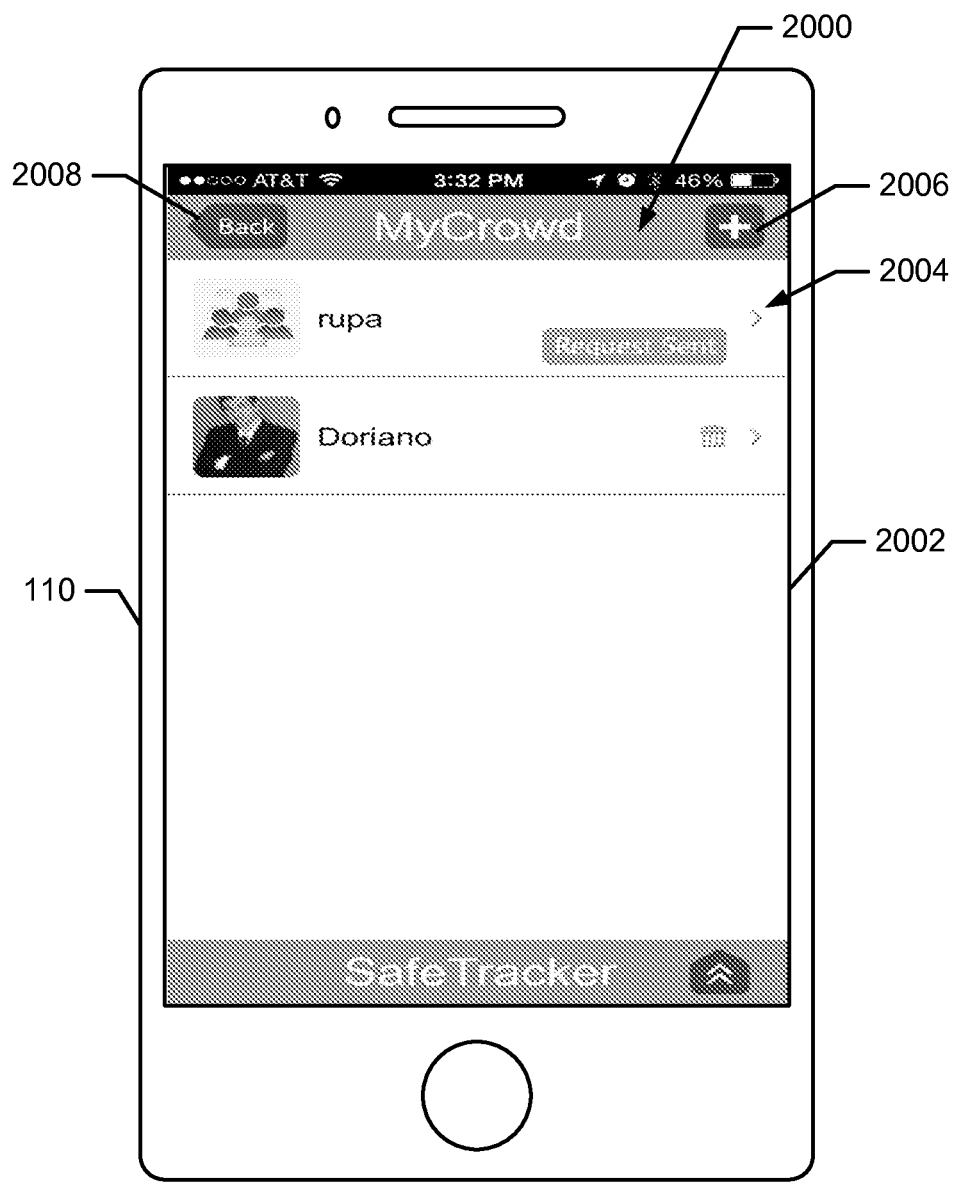
FIG. 20 displays a pictorial representation of a user crowd manager graphical user interface of the personal safety system application of the personal safety system.

After starting to operate in accordance with method 1800 at step 1802, the personal safety system manager software 104 retrieves the names and associated information for the then current members of a system user's user crowd 114 from the personal safety system database 106 and communicates the retrieved data to the personal safety system application 108 at step 1804. Then, at step 1806, the personal safety system application 108 causes display of a user crowd manager graphical user interface 2000 on the system user's mobile device 100 and including the names and, possibly, images of the then current members of the user crowd 114. As illustrated in FIG. 20, the user crowd manager graphical user interface 2000 has a window 2002 where the names and images, if any, of the user crowd members are displayed for subsequent selection. The user crowd manager graphical user interface 2000 also includes an arrow button 2004 associated with each member name, an add button 2006, and a back button 2008.

Figure 21:
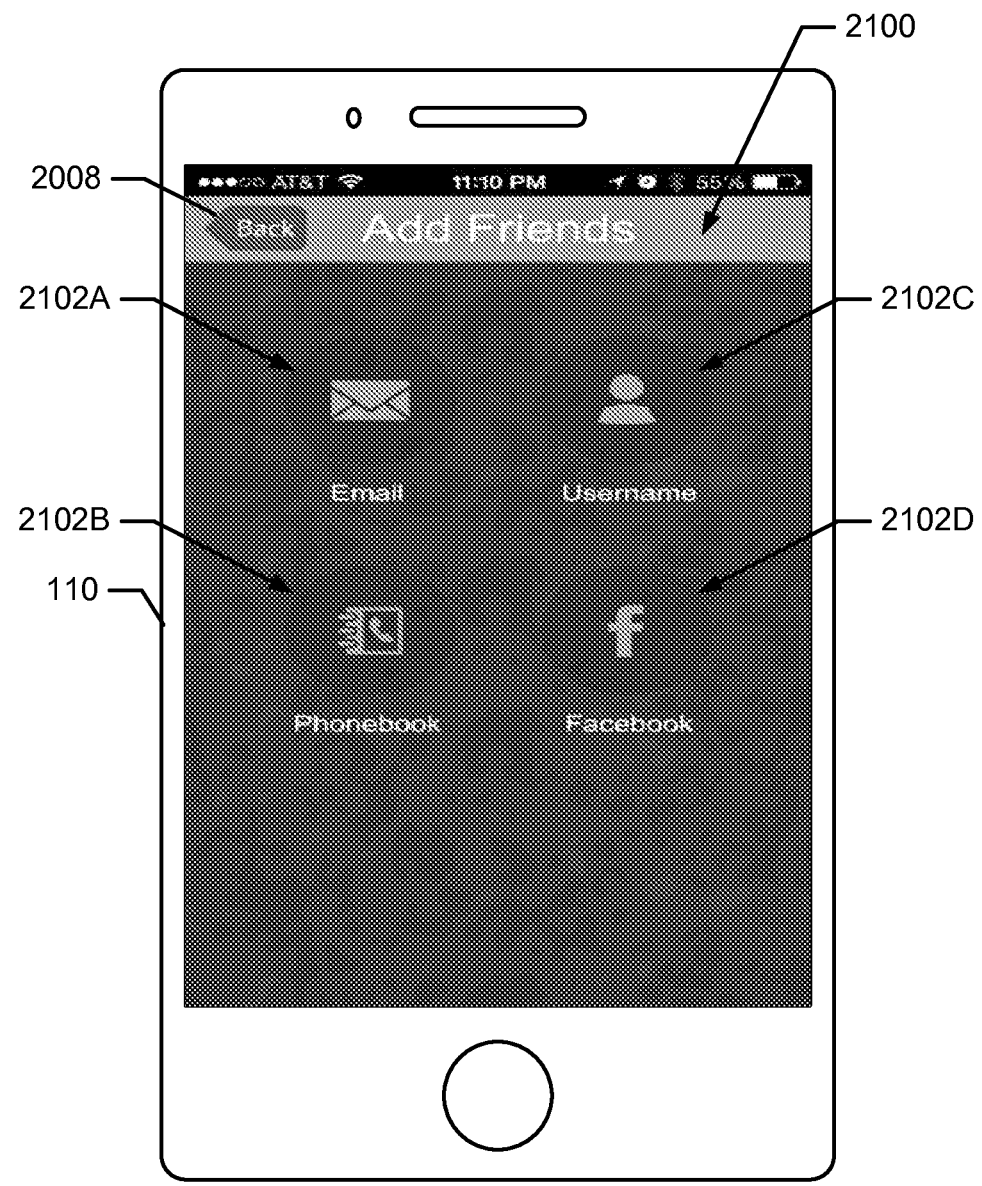
FIG. 21 displays a pictorial representation of an add user crowd member graphical user interface of the personal safety system application of the personal safety system.

Continuing at step 1808 of method 1800, the personal safety system application 108 receives a selection of an arrow button 2004, an add button 2006, or the back button 2008. Then, at step 1810, the personal safety system application 108 determines if the add button 2006 has been selected. If not, operation advances to step 1828 described below. However, if the add button 2006 has been selected, the personal safety system application 108 causes display of an add user crowd member graphical user interface 2100 on the system user's mobile device 110 at step 1812. The add user crowd member graphical user interface 2100 is illustrated in FIG. 21 and provides source option icons 2102 corresponding to respective sources for identifying persons to add as members of the system user's user crowd 114. For example and not limitation, the source option icons 2102 include: an electronic mail source option icon 2102A for selecting persons from electronic mail senders; a phone book source option icon 2102B for selecting persons from the system user's contacts; a username source option icon 2102C for manually identifying or inputting a person's name; and, a Facebook® source option icon 2102D for selecting persons from Facebook®. Upon receiving selection of a source option icon 2102 from the system user 112, the personal safety system application 108 enables the system user 112 to drill down and select a person from the respective source.

At step 1814, the personal safety system application 108 receives the selection of a person to be added to the system user's user crowd 114 and information pertaining to the person. Then, at step 1816, the personal safety system 100 produces and sends a request to the selected person, via electronic mail or text message, for permission to be added by the system user 112 as a member of the system user's user crowd 114. Subsequently, at step 1818, the personal safety system 100 receives a response, via electronic mail or text message, to the request sent to the selected person.

Next, at step 1820, the personal safety system application 108 determines if the response is positive, indicating that the selected person desires to be added as a member of the system user's user crowd 114. If the response is positive, the personal safety system application 108 communicates the name and associated information for the person to the personal safety system manager software 104 and data/communication manager(s) 102 at step 1822. Then, the personal safety system manager software 104 causes the personal safety system database 106 to be updated with the name and associated information for the new member of the system user's user crowd 114. After updating of the personal safety system database 106, operation of the personal safety system 100 loops back to step 1804 to cause refreshing of the user crowd manager graphical user interface 1900 to include the newly added member of the system user's user crowd 114.

If, at step 1820, the personal safety system application 108 determines that the response is not positive, then the personal safety system 100 produces and sends a message to the system user's mobile device 110 informing the system user 112 that the selected person does not desire to be added as a member of the system user's user crowd 114. After sending the message, operation of the personal safety system 100 returns to step 1804 described above.

At step 1828, the personal safety system application 108 determines whether an arrow button 2004 or the back button 2008 has been selected by the system user 112. If the back button 2008 has been selected, the personal safety system 100 ceases operation according to method 1800 at 1830. If an arrow button 2004 has been selected by the system user 112, the personal safety system application 108 advances to step 1832 of method 1800 and causes display of an edit user crowd member graphical user interface on the system user's mobile device 110. The edit user crowd member graphical user interface is populated with information for the member associated with the arrow button 2004. Then, at step 1834, the personal safety system application 108 receives edits to the information for the member. When edits are complete, the personal safety system application 108 communicates the revised information for the member of the user crowd 114 to the personal safety system manager software 104 and data/communication manager(s) 102 at step 1836. Then, at step 1838, the personal safety system manager software 104 updates the personal safety system database 106 with the revised information for the user crowd member. Subsequently, operation of the personal safety system 100 loops back to step 1804 of method 1800 to cause refreshing of the user crowd manager graphical user interface 1900 on the system user's mobile device 110.

Figure 22B:
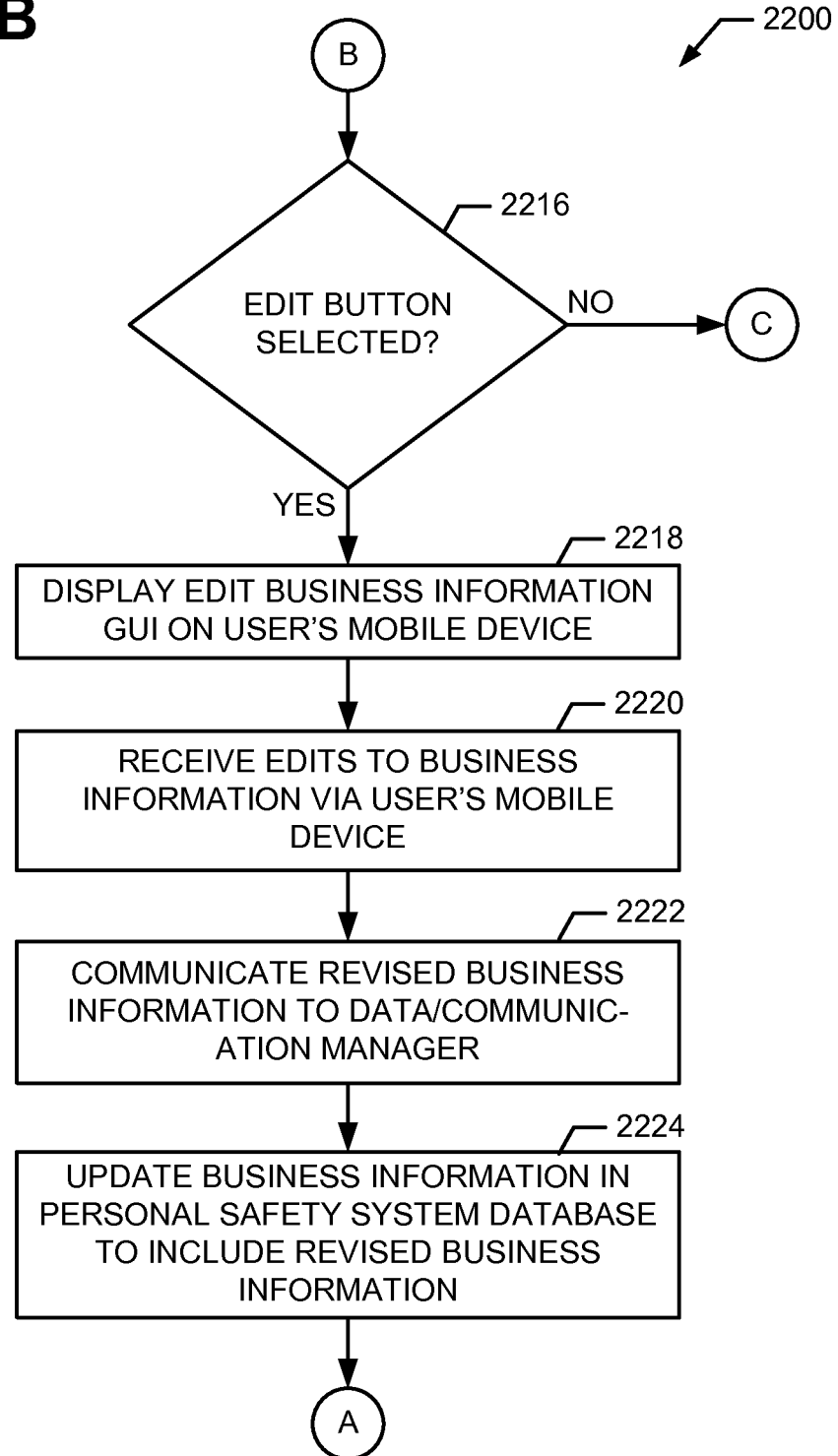
Figure 22C:
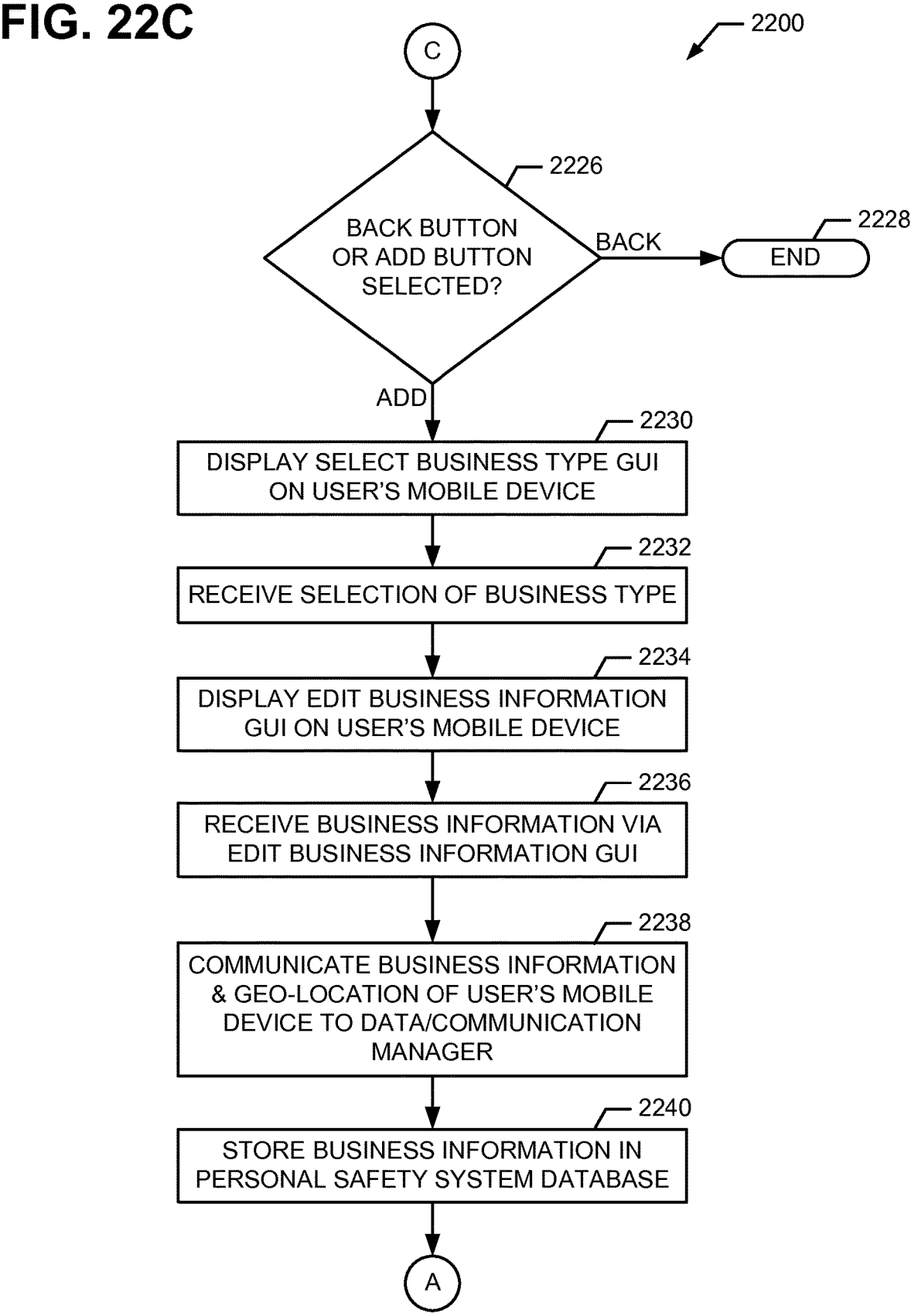

FIGS. 22A-22C display a flowchart representation of a method 2200 of the personal safety system 100 for adding/editing businesses to a system user's list of businesses whose assistance is, or may be, used by a system user 112, including when an alert or emergency situation exists. The method 2200 is implemented and followed by the personal safety system 100 whenever a system user 112 desires to add a new business to his/her business list or to edit information previously input for a business. Operation according to the method 2200 is initiated when the personal safety system application 108 receives selection of the main menu button 316 from the system's home page graphical user interface 300 and subsequent selection of a manage business list menu option 1904 from a main menu graphical user interface 1900 (see FIG. 19).

Figure 23:
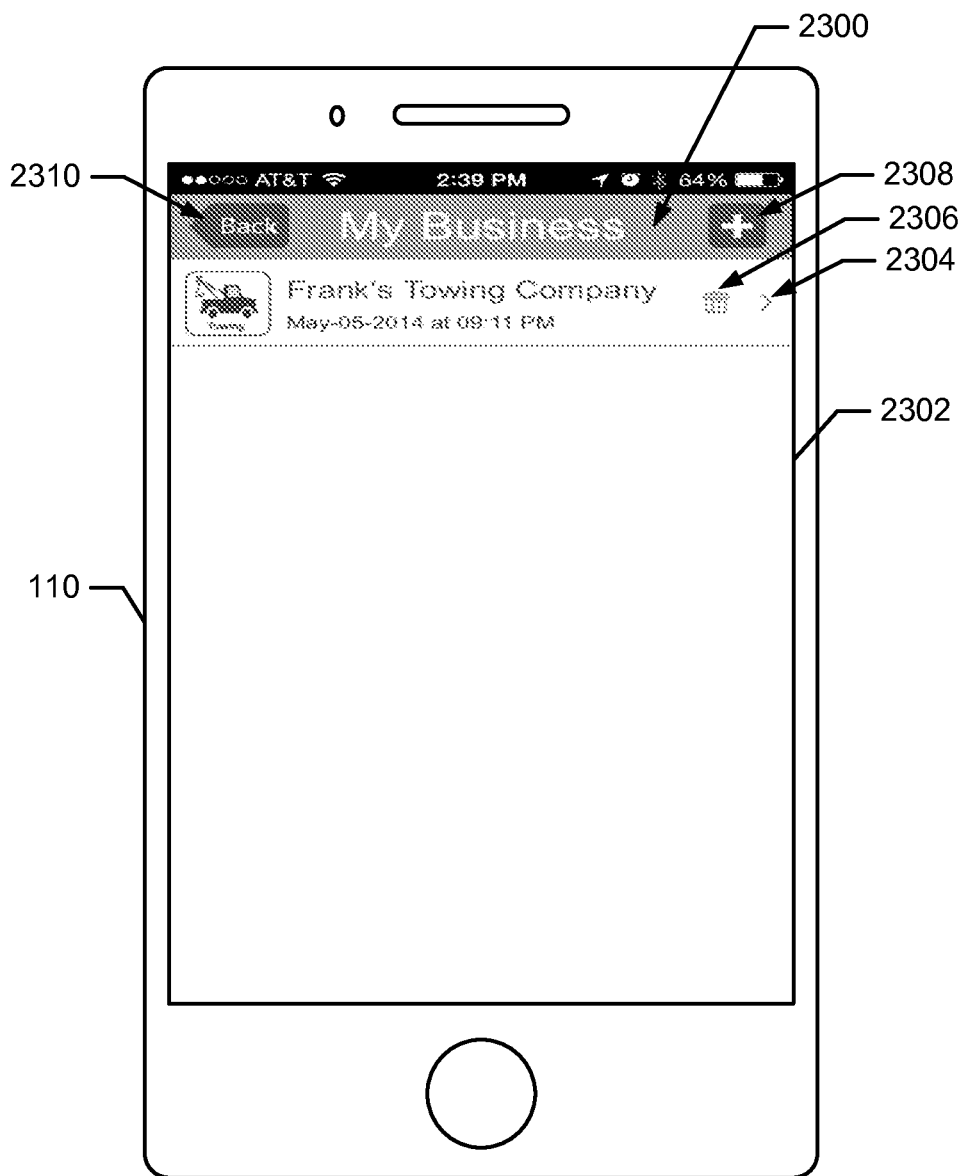
FIG. 23 displays a pictorial representation of a business list manager graphical user interface of the personal safety system application of the personal safety system.

After initiating operation in accordance with method 2200 at step 2202, the personal safety system manager software 104 retrieves the names, business types, and associated information for the then current businesses of the user's business list from the personal safety system database 106 and communicates the retrieved data to the personal safety system application 108 at step 2204. Then, at step 2206, the personal safety system application 108 causes display of a business list manager graphical user interface 2300 (see FIG. 23) on the system user's mobile device 110, including the name and business type symbol corresponding to the business type for the then current businesses of the system user's business list. As illustrated in FIG. 23, the business list manager graphical user interface 2300 has a window 2302 where the name and business type symbol of each business are displayed for subsequent selection. The business list manager graphical user interface 2300 also includes an arrow button 2304 and delete button 2306 associated with each business, an add button 2308, and a back button 2310. Then, at step 2208, the personal safety system application 108 receives user input including the selection of the arrow or delete buttons 2304, 2306 associated with a business, the add button 2308, or the back button 2310.

At step 2210, the personal safety system application 108 determines if a delete button 2304 has been selected by the system user 112. If a delete button 2304 has not been selected, the personal safety system 100 advances to step 2216 of method 2200 described below. Conversely, if the delete button 2304 has been selected, the personal safety system application 108 causes the system user's mobile device 110 to communicate data identifying the business associated with the selected delete button 2304 to the personal safety system manager software 104 and data/communication manager(s) 102. Then, at step 2214, the personal safety system manager software 104 causes the data/communication manager(s) 102 to update the personal safety system database 106 by deleting the identified business from the system user's business list.

Continuing at step 2216, the personal safety system application 108 determines if an arrow button 2304 associated with a business has been selected by the system user 112. If an arrow button 2304 has not been selected, the personal safety system 100 moves ahead to step 2226 of method 2200 described below. Alternatively, if an arrow button 2304 has been selected, the personal safety system 100 advances to step 2218 where the personal safety system application 108 displays an edit business information graphical user interface on the system user's mobile device 110 and the then current business information for the business associated with the arrow button 2304. Then, at step 2220, the personal safety system application 108 receives edits to the business information from the system user 112 via the edit business information graphical user interface and user's mobile device 110. Next, at step 2222, the personal safety system application 108 communicates the revised business information to the personal safety system manager software 104 and data/communication manager(s) 102. After receiving the revised business information, the personal safety system manager software 104 causes the data/communication manager(s) 102 to update the personal safety system database 106 to include the revised business information for the business in the system user's business list.

Figure 24:
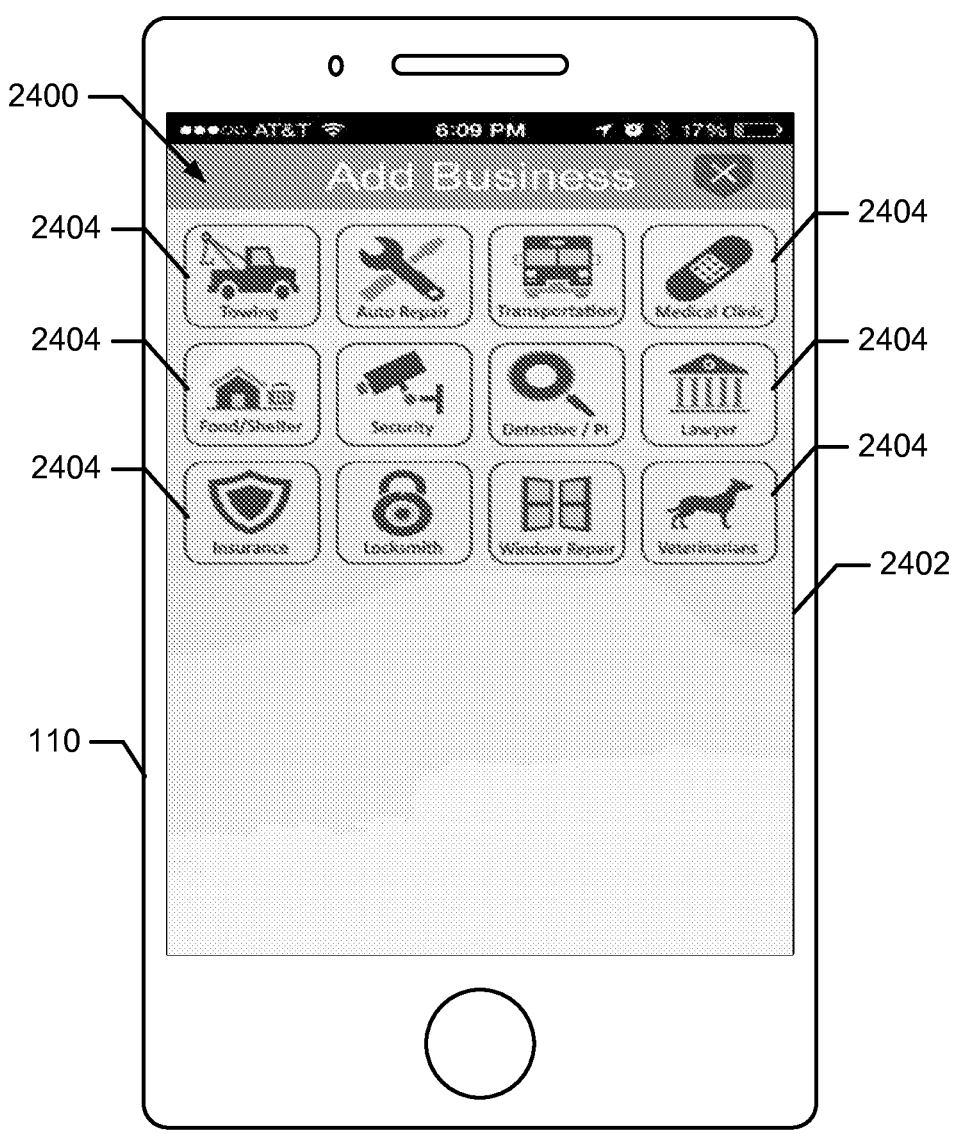
FIG. 24 displays a pictorial representation of a select business type graphical user interface of the personal safety system application of the personal safety system.

At step 2226 of method 2200, the personal safety system application 108 determines if the add button 2308 or back button 2310 has been selected by the system user 112. If the back button 2310 has been selected, the personal safety system 100 ceases operation according to method 2200 at 2228. If the add button 2308 has been selected, the personal safety system application 108 causes the user's mobile device 110 to display a select business type graphical user interface 2400 (see FIG. 24) at step 2230. As illustrated in FIG. 24, the select business type graphical user interface 2400 includes a window 2402 in which one or more business type symbols 2404 are present. Each business type symbol 2404 is representative of and associated with a particular type of business. Such business types include, for example and not limitation: towing; auto repair; transportation; medical clinic; food and/or shelter; security; detective and/or private investigator; lawyer; insurance; locksmith; window repair; and, veterinarian. It should be understood and appreciated that other business types may be used in other example embodiments.

Continuing at step 2232 of method 2200, the personal safety system application 108 receives a selection of a business type symbol 2404 and, hence, of corresponding business type from the system user 112. Then, at step 2234, the personal safety system application 108 causes display of the edit business information graphical user interface on the user's mobile device 110. Next, at step 2236, the personal safety system application 108 receives input business information from the system user 112 via the edit business information graphical user interface and user's mobile device 110. After input of the business information is complete, the personal safety system application 108 communicates the input business information to the personal safety system manager software 104 and data/communication manager(s) 102 at step 2238. Upon receiving the input business information, the personal safety system manager software 104 causes the data/communication manager(s) 102 to update the personal safety system database 106 to include the input business information for the business in the system user's business list. Subsequently, operation of the personal safety system 100 loops back to step 2204 of method 2200 to cause refreshing of the business list manager graphical user interface 2300 on the system user's mobile device 110.

Figure 25B:
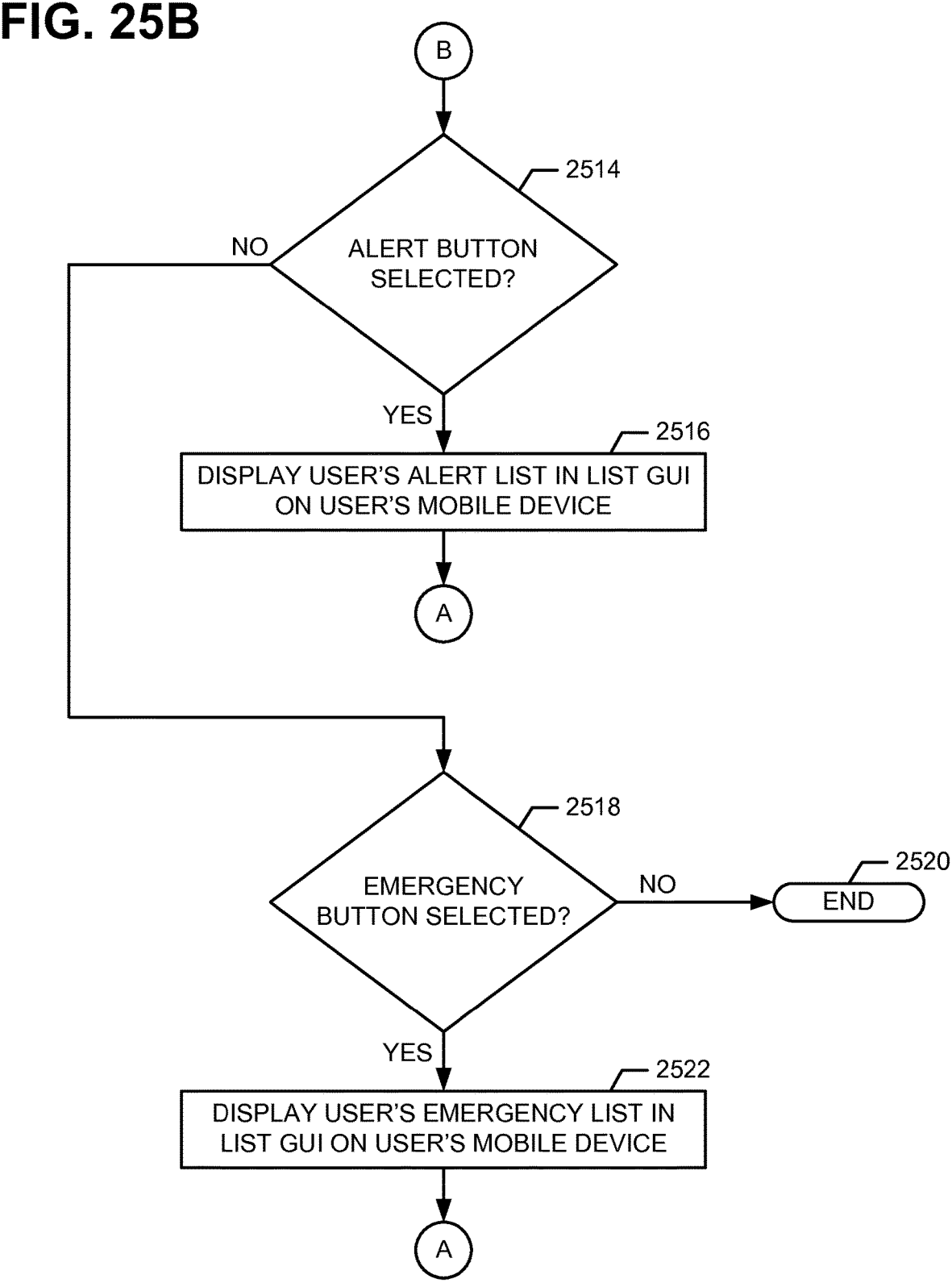
Figure 26:
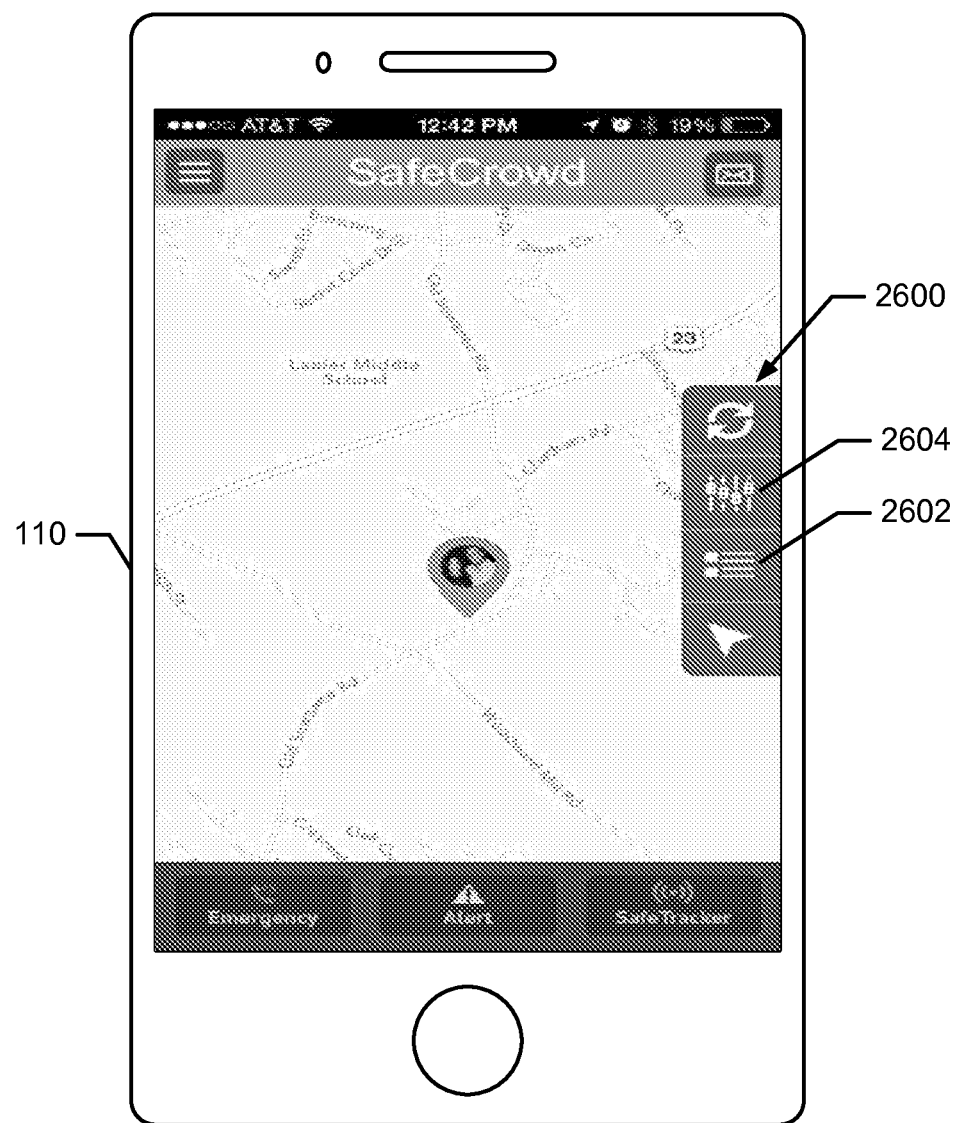
FIG. 26 displays a pictorial representation of the home page graphical user interface and a toolbar popup menu of the personal safety system application of the personal safety system.

FIGS. 25A-25B display a flowchart representation of a method 2500 of the personal safety system 100 for providing lists of a system user's businesses, alerts, and emergencies via the user's mobile device 110. The method 2500 is implemented and followed by the personal safety system 100 whenever a system user 112 desires to view his/her business list, alert list, or emergency list. Operation according to the method 2500 is initiated when the personal safety system application 108 receives a tap on the display of the user's mobile device 110 in an area of the home page graphical user interface 300 where no markers are present followed by a subsequent selection of a list option 2602 from a toolbar popup menu 2600 (see FIG. 26).

Figure 27:
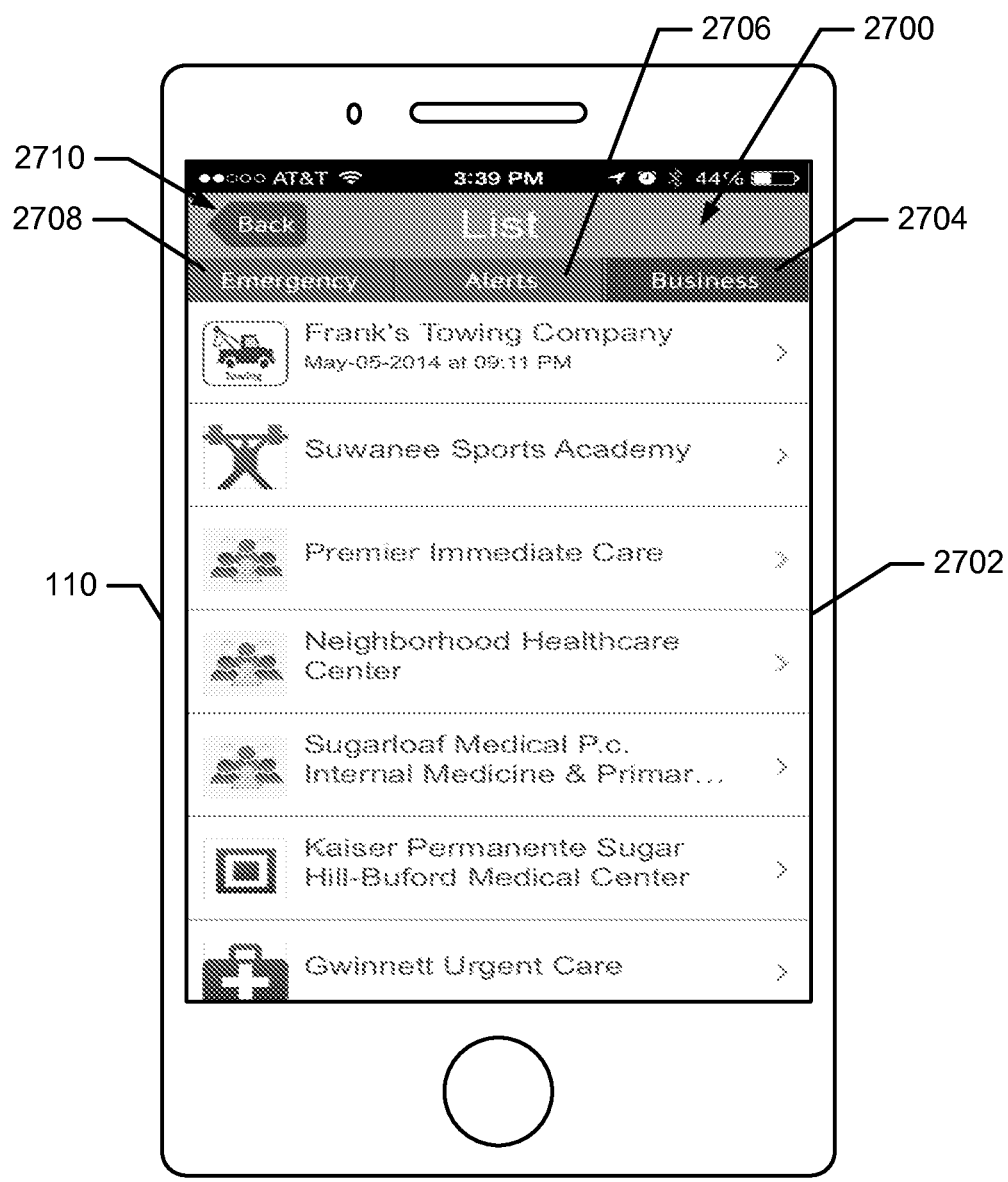
FIG. 27 displays a pictorial representation of a user list graphical user interface of the personal safety system application of the personal safety system showing the then current businesses of the system user's business list.
Figure 28:
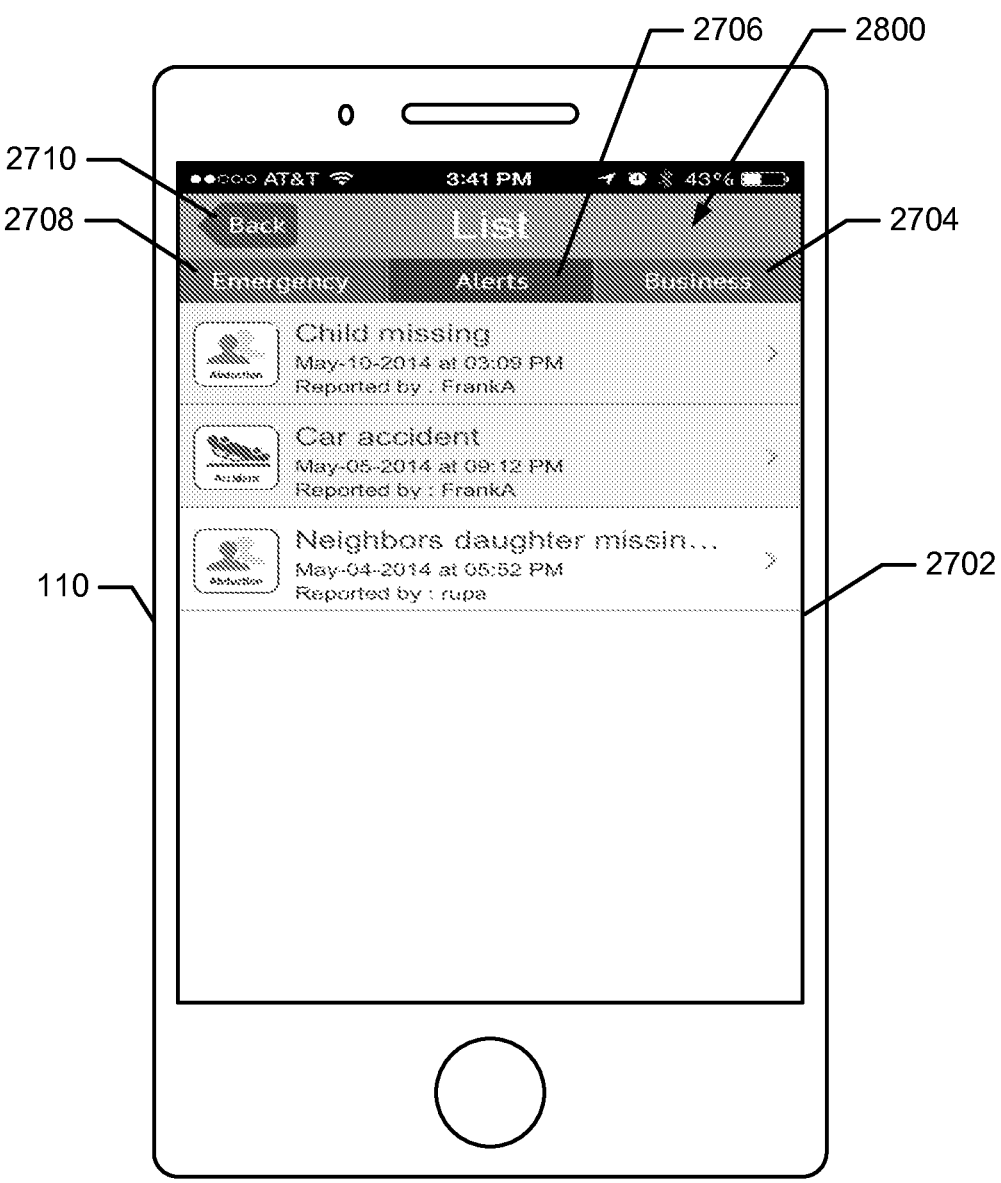
FIG. 28 displays a pictorial representation of the user list graphical user interface of the personal safety system application of the personal safety system showing the then current alerts of the system user's alert list.

After initiating operation in accordance with method 2500 at step 2502, the personal safety system manager software 104 retrieves the system user's businesses, alerts, and emergencies and respective associated information from the personal safety system database 106 and communicates the retrieved data to the personal safety system application 108 at step 2504. Then, at step 2506, the personal safety system application 108 causes display of a user list graphical user interface 2700 (see FIG. 27) on the system user's mobile device 110. In FIG. 27, the then current businesses of the system user's business list are displayed. In FIG. 28, the then current alerts of the system user's alert list are displayed. As illustrated in FIGS. 27 and 28, the user list graphical user interface 2700 has a window 2702 for displaying the user's business, alert, and emergency lists, a business button 2704, an alert button 2706, an emergency button 2708, and a back button 2710. When displaying a user business, alert, or emergency list, the personal safety system 100 sorts the businesses, alerts, or emergencies by their respective geo-locations so that the businesses, alerts, or emergencies, as the case may be, are displayed in geo-location order relative to the then current geo-location of the user's mobile device 110 with the geographically nearest business, alert, or emergency being at the top of the list and the geographically farthest business, alert, or emergency being at the bottom of the list.

Next, at step 2508, the personal safety system application 108 receives user input corresponding to the selection of the business button 2704, alert button 2706, emergency button 2708, or back button 2710. Proceeding to step 2510, the personal safety system application 108 determines if the business button 2704 has been selected by the system user 112. If so, the personal safety system application 108 causes display of the user's business list in the user list graphical user interface 2700 at step 2512 as illustrated in FIG. 27. Then, the personal safety system 100 loops back to step 2508 to receive further user input.

If, at step 2510, the personal safety system application 108 determines that the business button 2704 has not been selected, the personal safety system application 108 considers the system user's input and determines if the alert button 2706 has been selected at step 2514. If the alert button 2706 has been selected by the system user 112, the personal safety system application 108 causes display of the user's alert list in the user list graphical user interface 2700 at step 2516 as illustrated in FIG. 28. After displaying the user's alert list, the personal safety system 100 loops back to step 2508 to receive further user input.

If the personal safety system application 108 determines that alert button 2706 has not been selected, the personal safety system application 108 determines, at step 2518, whether the emergency button 2708 has been selected by the system user 112. If the emergency button 2708 has not been selected, then the back button 2710 has been selected and the personal safety system application 108 ceases operation according to method 2500 at step 2520. Alternatively, if the personal safety system application 108 determines that the emergency button 2708 has been selected, the personal safety system application 108 causes display of the user's emergency list in the user list graphical user interface 2700 at step 2522. Subsequently, the personal safety system 100 loops back to step 2508 of method 2500 to receive further user input.

Figure 29A:
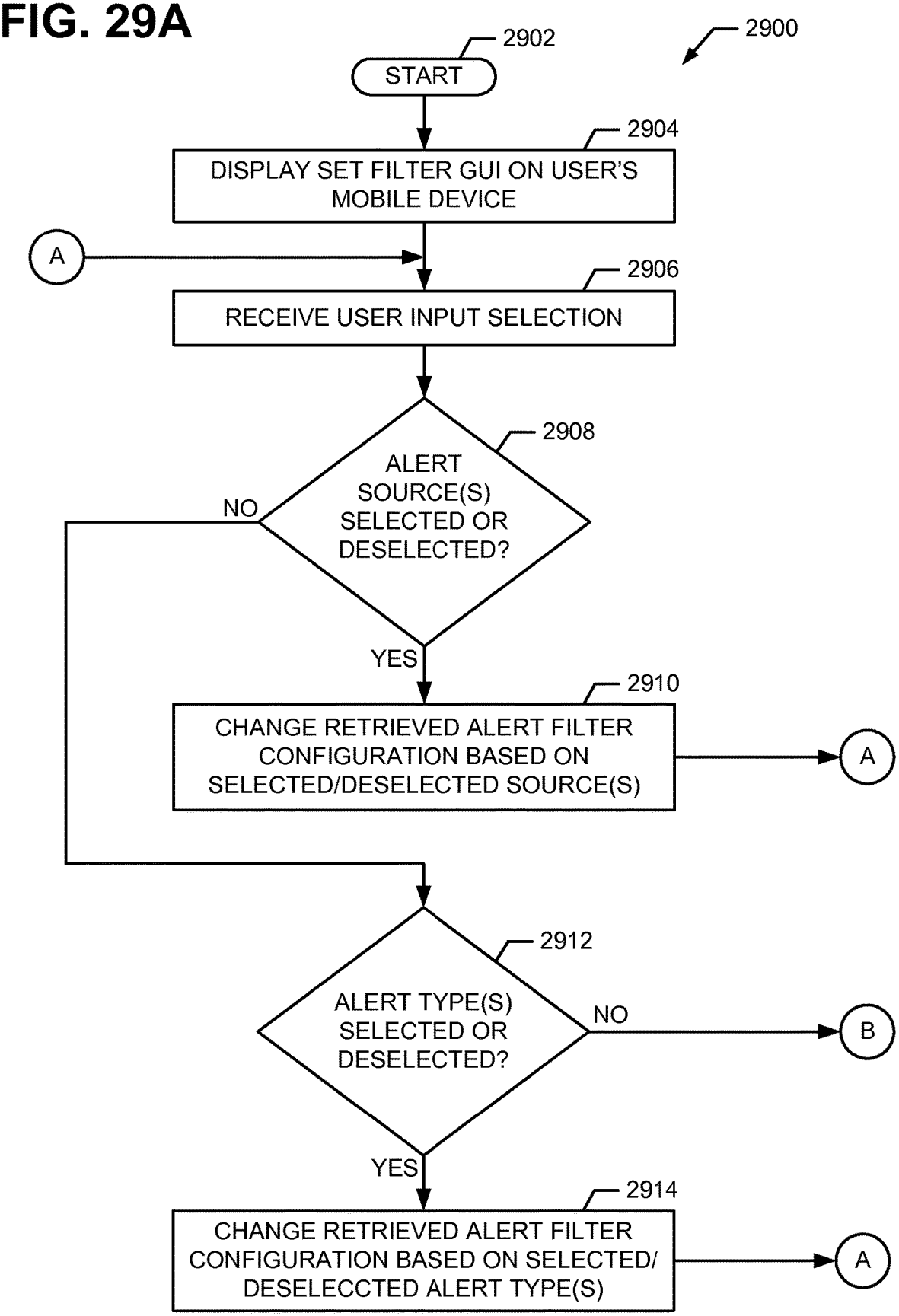

FIGS. 29A-29B display a flowchart representation of a method 2900 of the personal safety system 100 for setting/resetting the alert filter configuration that is used to determine which alerts are selected and displayed via alert markers 308 in the window 302 of the home page graphical user interface 300 and in other graphical user interfaces in which alerts or corresponding alert markers 308 are shown. The method 2900 is implemented and followed by the personal safety system 100 whenever a system user 112 desires to change the manner in which alerts are retrieved and/or selected for display on his/her mobile device 110. Operation according to the method 2900 is initiated when the personal safety system application 108 receives a tap on the display of the user's mobile device 110 in an area of the home page graphical user interface 300 where no markers are present followed by a subsequent selection of an alert filter option 2604 from a toolbar popup menu 2600 (see FIG. 26).

After initiating operation in accordance with method 2900 at step 2902, the personal safety system application 108 causes the display of the then current alert filter configuration on the system user's mobile device 110 at step 2904. To do so, the personal safety system application 108 causes the personal safety system manager software 104 to retrieve the then current alert filter configuration from the personal safety system database 106 and communicate the retrieved alert filter configuration to the personal safety system application 108. The personal safety system application 108 then causes display of an alert filter graphical user interface 3000 (see FIG. 30) on the system user's mobile device 110, including the then current alert filter configuration.

Figure 30:
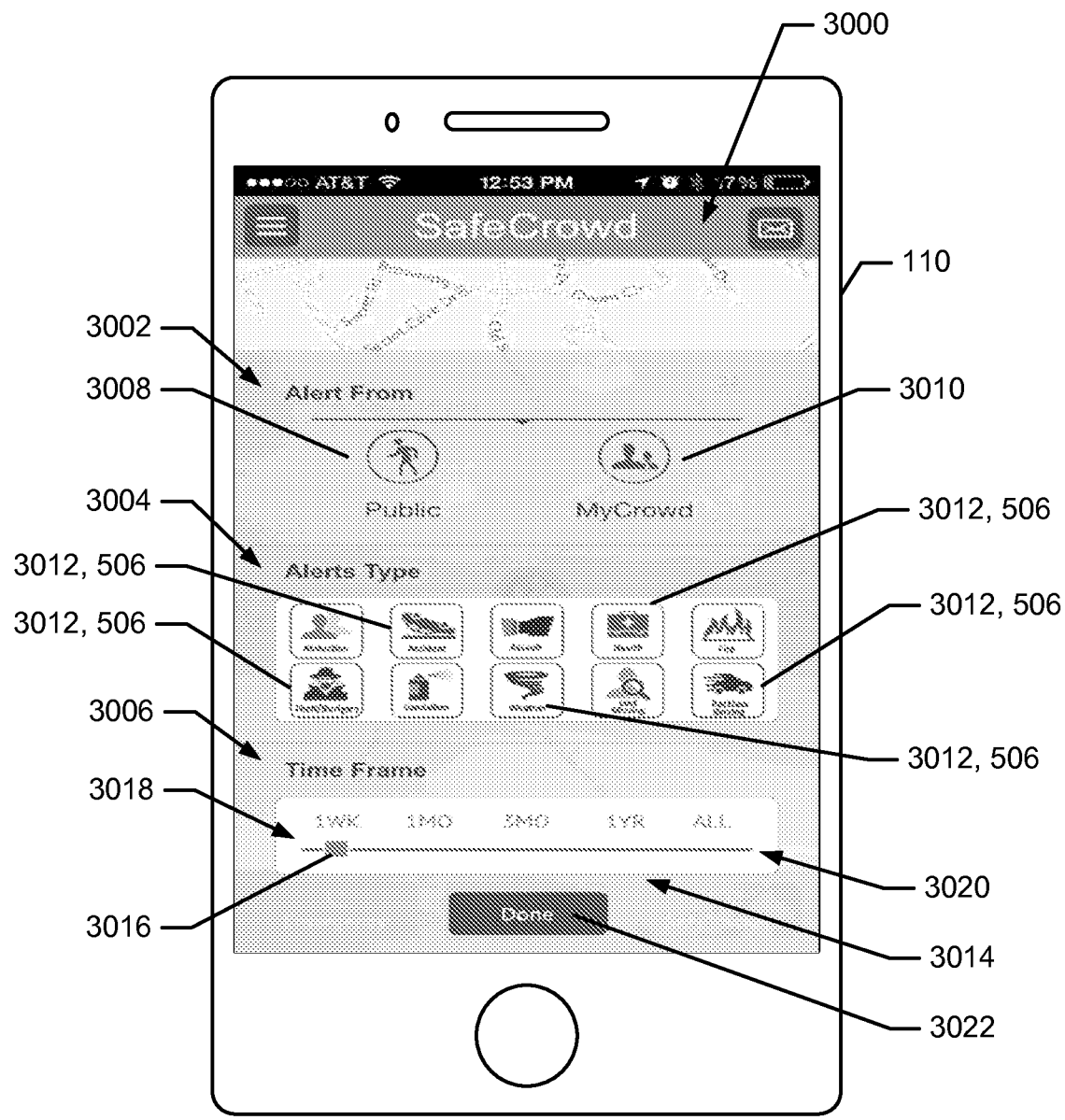
FIG. 30 displays a pictorial representation of an alert filter graphical user interface of the personal safety system application of the personal safety system.

As illustrated in FIG. 30, the alert filter graphical user interface 3000 includes an alert source portion 3002, an alert type portion 3004, and an alert time frame portion 3006. The alert source portion 3002 has a public toggle button 3008 and a crowd toggle button 3010. When the public toggle button 3008 is selected, the personal safety system 100 retrieves and displays alerts received from public sources such as, but not limited to, Facebook® and Twitter®. When the crowd toggle button 3010 is selected, the personal safety system 100 retrieves and displays alerts received from system users 112. The public toggle button 3008 and crowd toggle button 3010 may be selected independently of one another, thereby permitting a system user 112 to configure the alerts retrieved and displayed on his/her mobile device 110 to include alerts from public sources and system users 112 alone or in combination.

The alert type portion 3004 of the alert filter graphical user interface 3000 includes a plurality of alert type toggle buttons 3012, each having an associated alert type symbols 506 and corresponding respectively to a particular alert type. When an alert type toggle button 3012 is selected, the personal safety system 100 retrieves and displays alerts having an alert type corresponding to the alert type of the selected alert type toggle button 3012. When an alert type toggle button 3012 is deselected, the personal safety system 100 does not retrieve and display alerts having an alert type corresponding to the alert type of the deselected alert type toggle button 3012. Each alert type toggle button 3012 is independent of the other alert type toggle buttons 3012. This allows a system user 112 to configure the alerts retrieved and displayed on his/her mobile device to include alerts of one or more alert types.

The alert time frame portion 3006 of the alert filter graphical user interface 3000 has a slider control 3014 having a slider 3016 that is slidable in response to user input between a first end 3018 and a second end 3020 of the slider control 3014 to identify a past period of time from which alerts are to be retrieved and displayed via the system user's mobile device 110. If the slider 3016 is positioned at the control's first end 3018, alerts that were created within the past week are retrieved and displayed via the user's mobile device 110. Conversely, if the slider 3016 is positioned at the control's second end 3020, all alerts are retrieved and displayed via the user's mobile device 110. If the slider 3016 is positioned intermediately between the control's first and second ends 3018, 3020, alerts that were created within the corresponding past period of time are retrieved and displayed via the user's mobile device 110.

The alert filter graphical user interface 3000 further includes a done button 3022. When the done button 3022 is selected by a system user 112, the configuration established by the system user 112 through interaction with and selections made from the alert filter graphical user interface 3000 is stored in the personal safety system database 106 and used, until changed again, to retrieve and display only those alerts that originate from a selected source, that have a selected alert type, and that were created within a selected past period of time.

Referring back to FIGS. 29A-29B, the personal safety system application 108 receives user input at step 2906 from the system user 112. Then, at step 2908, the personal safety system application 108 determines if the public toggle button 3008 or the crowd toggle button 3010 has been selected or deselected. If so, the personal safety system application 108 changes the retrieved alert filter configuration to reflect selection or deselection of the public toggle button 3008 and/or crowd toggle button 3010 before looping back to step 2906 to receive further user input. If neither of the public toggle button 3008 or the crowd toggle button 3010 has been selected or deselected, the personal safety system application 108 advances to step 2912 of method 2900.

At step 2912, the personal safety system application 108 determines whether an alert type toggle button 3012 has been selected or deselected. If not, the personal safety system application 108 advances to step 2916 of method 2900 described below. Conversely, if the personal safety system application 108 determines that an alert type toggle button 3012 has been selected or deselected, the personal safety system application 108 changes the retrieved alert filter configuration to reflect selection or deselection of one or more alert type toggle buttons 3012 before looping back to step 2906 to receive further user input from the system user 112.

Continuing at step 2916, the personal safety system application 108 determines if a different time frame has been selected by the user 112 sliding the slider 3016 to a new position. If the personal safety system application 108 determines that the slider 3016 has been repositioned and, hence, that a different time frame has been selected, the personal safety system 100 changes the retrieved alert filter configuration to include the selected time frame at step 2918. Then, the personal safety system application 108 returns to step 2906 to receive further user input.

If, at step 2916, the personal safety system application 108 determines that a new time frame has not been selected by the system user 112, then the done button 3022 has been selected and the personal safety system application 108 communicates the revised alert filter configuration to the personal safety system backend application 104 and data/communication manager(s) 102 at step 2920. Then, at step 2922, the personal safety system backend application 104 causes the data/communication manager(s) 102 to store the revised alert filter configuration in the personal safety system database 106. Subsequently, at step 2924, the personal safety system 100 ends operation according to method 2900.

Figure 31:
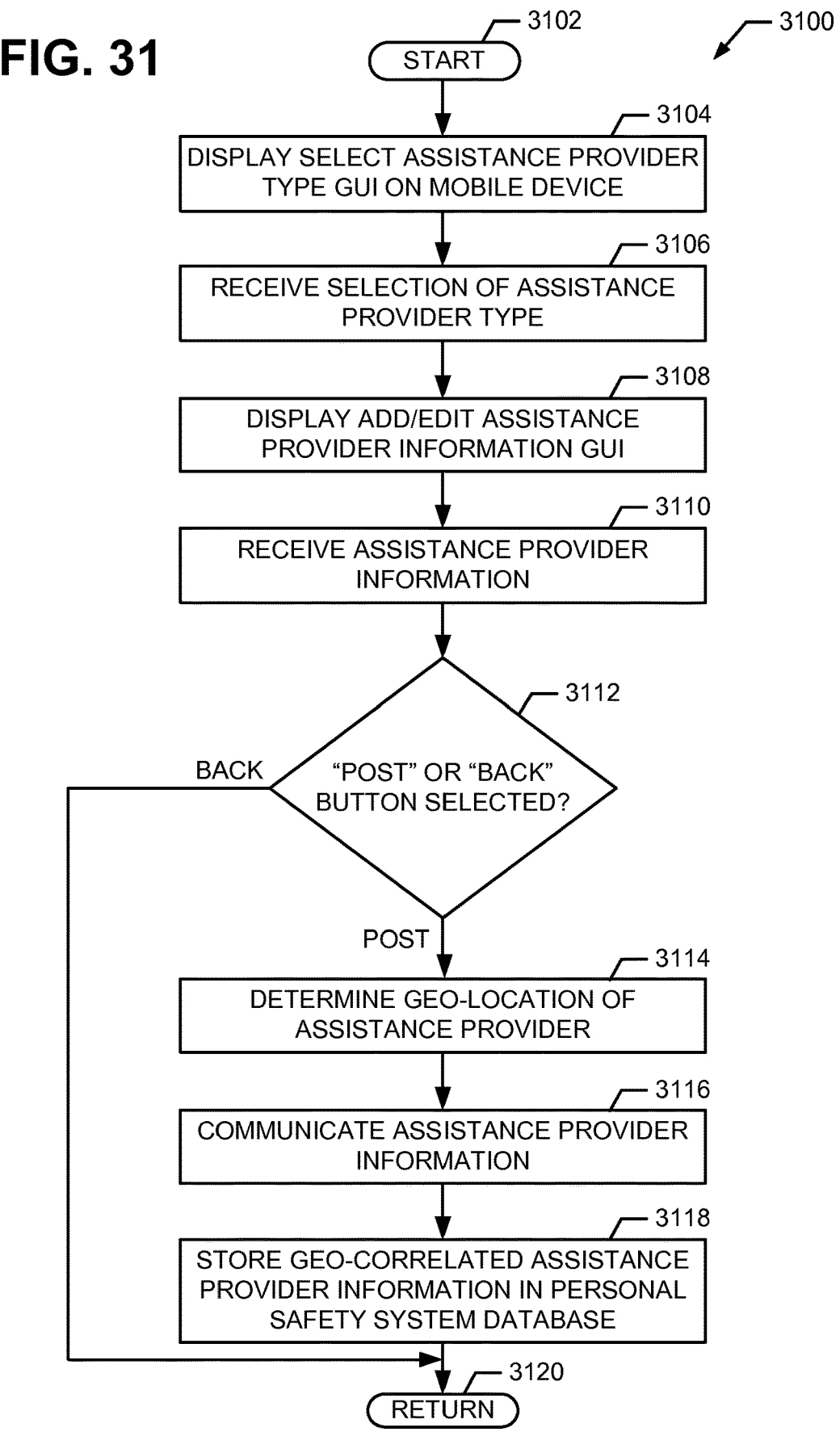
FIG. 31 displays a flowchart representation of a method of the personal safety system for adding an assistance provider and associated assistance provider information to the personal safety system.

FIG. 31 displays a flowchart representation of a method 3100 of the personal safety system 100 for adding an assistance provider and associated assistance provider information to the personal safety system 100. The assistance provider information is used by the personal safety system 100 to identify assistance providers capable of providing the type of assistance needed in connection with an alert or emergency and to establish and conduct communications between communications devices of assistance providers and system users 112. The method 3100 is implemented and followed by the personal safety system 100 whenever an assistance provider desires to make itself available to provide assistance needed in connection with alerts and emergencies and to input corresponding information into the personal safety system 100. Operation according to the method 3100 is initiated when the personal safety system application 108 receives input instructing the application 108 to perform in accordance with the method 3100.

Figure 32:
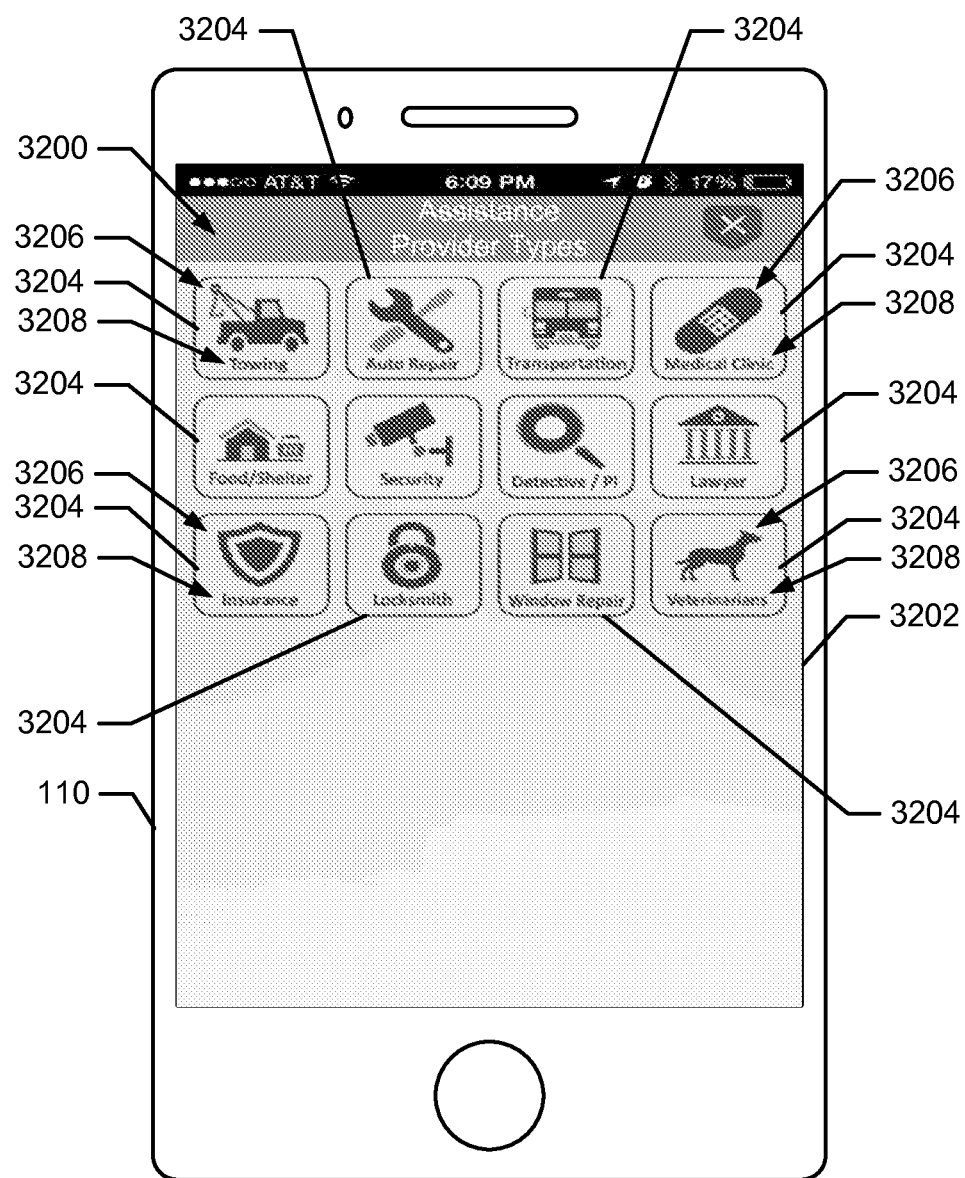
FIG. 32 displays a pictorial representation of a select assistance provider type graphical user interface of the personal safety system application of the personal safety system.

After initiating operation in accordance with method 3100 at step 3102, the personal safety system application 108 causes the display of a select assistance provider type graphical user interface 3200 (see FIG. 32) on the display of an assistance provider's mobile device 110 at step 3104. The select assistance provider type graphical user interface 3200 includes a window 3202 in which a plurality of assistance type buttons 3204 are displayed for selection by the assistance provider. Each assistance type button 3204 corresponds to a unique type of assistance, or assistance type, and includes an assistance type symbol 3206 and assistance type text 3208 that identify the assistance type in a manner that is easy to remember. As illustrated in FIG. 3200, the assistance types include, but are not limited to: towing; auto repair; transportation; medical clinic; food and/or shelter; security; detective and/or private investigator; lawyer; insurance; locksmith; window repair; and, veterinarian. It should be understood and appreciated that other assistance types may be used in other example embodiments. The assistance provider selects an assistance type by tapping on the corresponding assistance type button 3204 of the select assistance type graphical user interface 3200.

Figure 33:
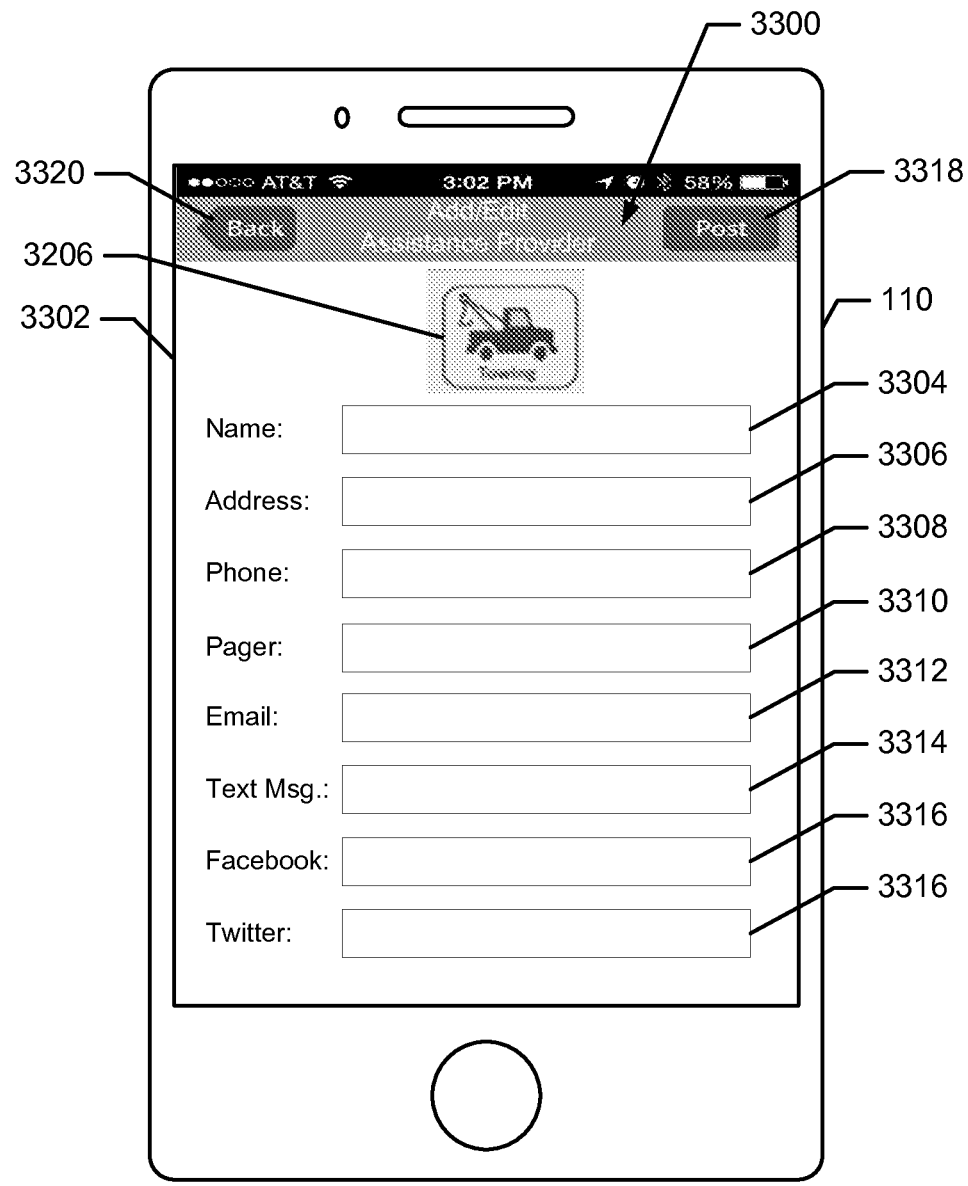
FIG. 33 displays a pictorial representation of an add/edit assistance provider information graphical user interface of the personal safety system application of the personal safety system.

Continuing at step 3106 of method 3100, the mobile device 110 and personal safety system application 108 receive a selection of an assistance type from the select assistance type graphical user interface 3200 by the assistance provider. Next, at step 3108, the personal safety system application 108 causes the assistance provider's mobile device 110 to display an add/edit assistance provider information graphical user interface 3300 (see FIG. 33) on the device's display. The add/edit assistance provider information graphical user interface 3300 includes a window 3302 having an assistance type symbol 3206 corresponding to the assistance type selected by the assistance provider via the select assistance type graphical user interface 3200, a name field 3304 for receiving the assistance provider's name, a street address field 3306 for receiving a street address for the assistance provider, a phone number field 3308 for receiving a phone number for the assistance provider, a pager number field 3310 for receiving a pager number for the assistance provider, an electronic mail address field 3312 for receiving an electronic mail address for the assistance provider, a text messaging handle field 3314 for receiving a text message handle for the assistance provider, and one or more social media fields 3316 for receiving social media handles for the assistance provider used in connection with social media websites. Collectively, the received assistance provider's name, street address, phone number, pager number, electronic mail address, text messaging handle, social media handles, and geo-location (x,y coordinates corresponding to the assistance provider's street address) comprise and are referred to herein as "assistance provider information". Upon receiving selection of the name field 3304, street address field 3306, phone number field 3308, pager number field 3310, electronic mail address field 3312, text messaging handle field 3314, or social media fields 3316, the personal safety system application 108 causes the mobile device 110 to display a keypad for use by the assistance provider in providing respective input. The add/edit assistance provider information graphical user interface 3300 also includes a post button 3318 and back button 3320.

After receiving input of assistance provider information for the assistance provider via the add/edit assistance provider information graphical user interface 3300 at step 3110, the personal safety system application 108 checks, at step 3112, to see if the assistance provider has selected the post button 3318 or the back button 3320. If the back button 3320 has been selected, then the personal safety system 100 advances to step 3120 of method 3100 described below. If, at step 3112, the personal safety system application 108 determines that the post button 3318 was selected by the assistance provider, the personal safety system application 108 determines the geo-location of the assistance provider based on the input street address at step 3114. Then, the personal safety system application 108 causes the assistance provider information to be communicated to the data/communication manager(s) 102 and personal safety system manager software 104 at step 3116. After receiving the assistance provider information, the personal safety system manager software 104 causes the data/communication manager(s) 102, at step 3118, to store the geo-correlated assistance provider information for the assistance provider in the personal safety system database 106. At step 3120, the personal safety system 100 returns to operating in accordance with method 200 and loops back to step 214 where the personal safety system 100 begins to update the map, alert and emergency data displayed on the system user's mobile device 110 via the home page graphical user interface 300.

Figure 34A:
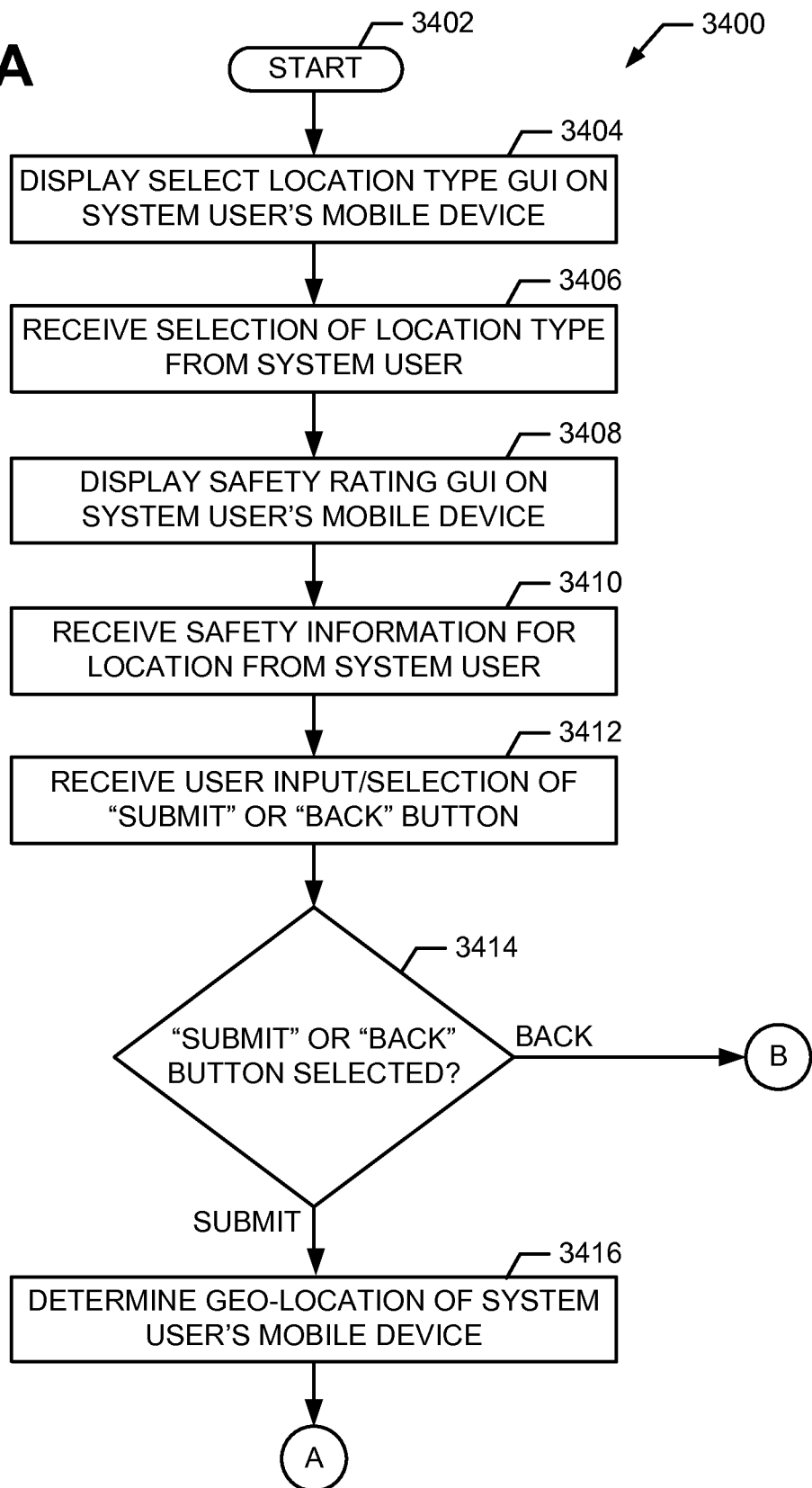
FIGS. 34A and 34B display a flowchart representation of a method of the personal safety system for receiving safety ratings for locations at which system users are present.
Figure 34B:
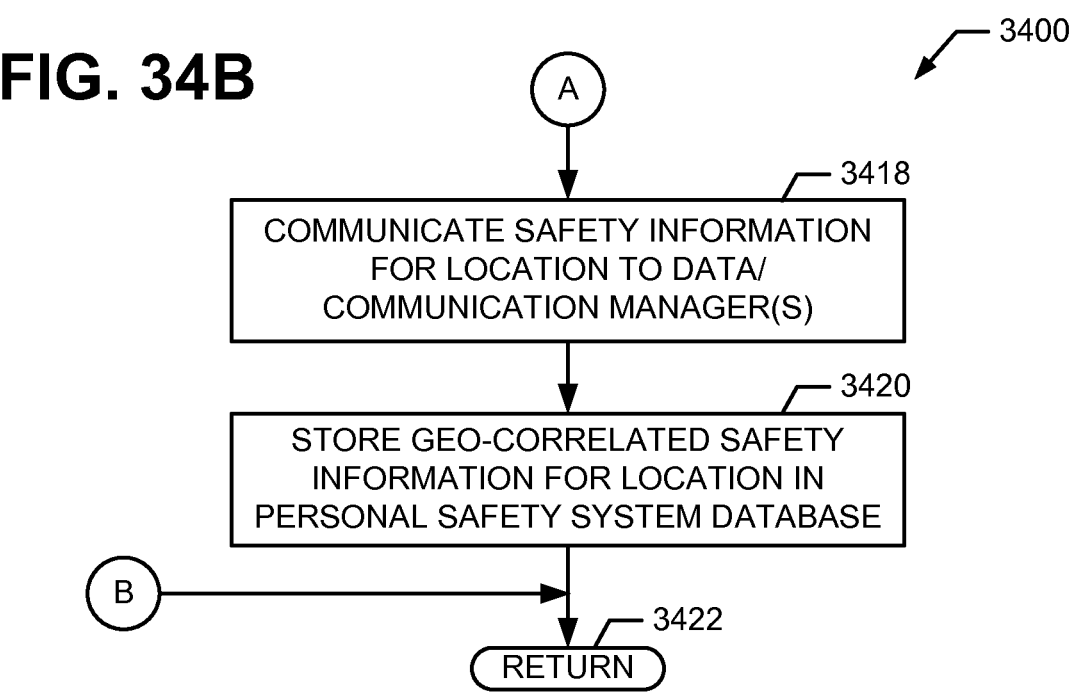

FIGS. 34A and 34B display a flowchart representation of a method 3400 of the personal safety system 100 for receiving safety ratings for locations at which system users 112 are present. The collected safety ratings are subsequently used by the personal safety system 100 to determine the safest route for a system user 112 to take when traveling between a first location and a second location. The method 3400 is implemented and followed by the personal safety system 100 whenever a system user 112 desires to input a safety rating for a location to the personal safety system 100. According to the example embodiment, a received safety rating for a location may have one of three (3) values corresponding to three (3) different safety levels including a "safe" safety level, an "average" safety level, or a "below average" safety level. It should be understood and appreciated that in other embodiments, a received safety rating may include a greater or lesser number of safety levels, may include a numerical value corresponding to a safety level, or may utilize another method for indicating a qualitative or quantitative safety level. Operation of the personal safety system 100 according to the method 3100 is initiated when the personal safety system application 108 receives input directing the application 108 to perform in accordance with the method 3400.

Figure 35:
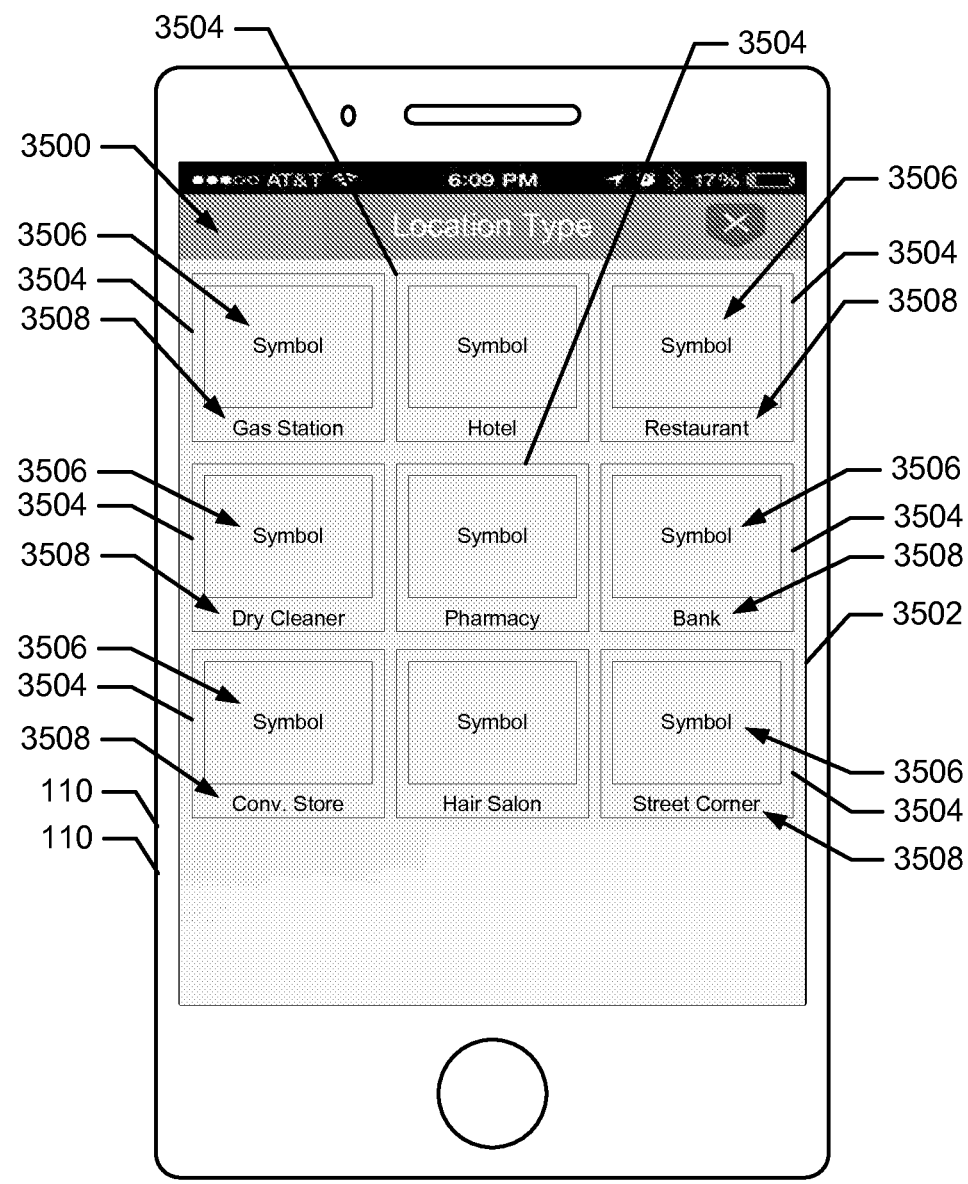
FIG. 35 displays a pictorial representation of a select location type graphical user interface of the personal safety system application of the personal safety system.

After starting operation in accordance with method 3400 at step 3402, the personal safety system application 108 causes the system user's mobile device 110 to display the select location type graphical user interface 3500 (see FIG. 35) on the device's display at step 3404. The select location type graphical user interface 3500 includes a window 3502 in which a plurality of location type buttons 3504 are displayed for selection by the system user 112. Each location type button 3504 corresponds to a unique type of location, or location type, and includes a location type symbol 3506 and location type text 3508 that identify the location type in a manner that is easy for system users 112 to remember. As illustrated in FIG. 35, the location types include, but are not limited to: hotels, gas stations, convenience stores, grocery stores, dry cleaners, street corners, and other locations. The system user 112 selects a location type by tapping on the corresponding location type button 3504 of the select location type graphical user interface 3500. At step 3406, the personal safety system application 108 receives a selection of a location type from the system user 112.

Figure 36:
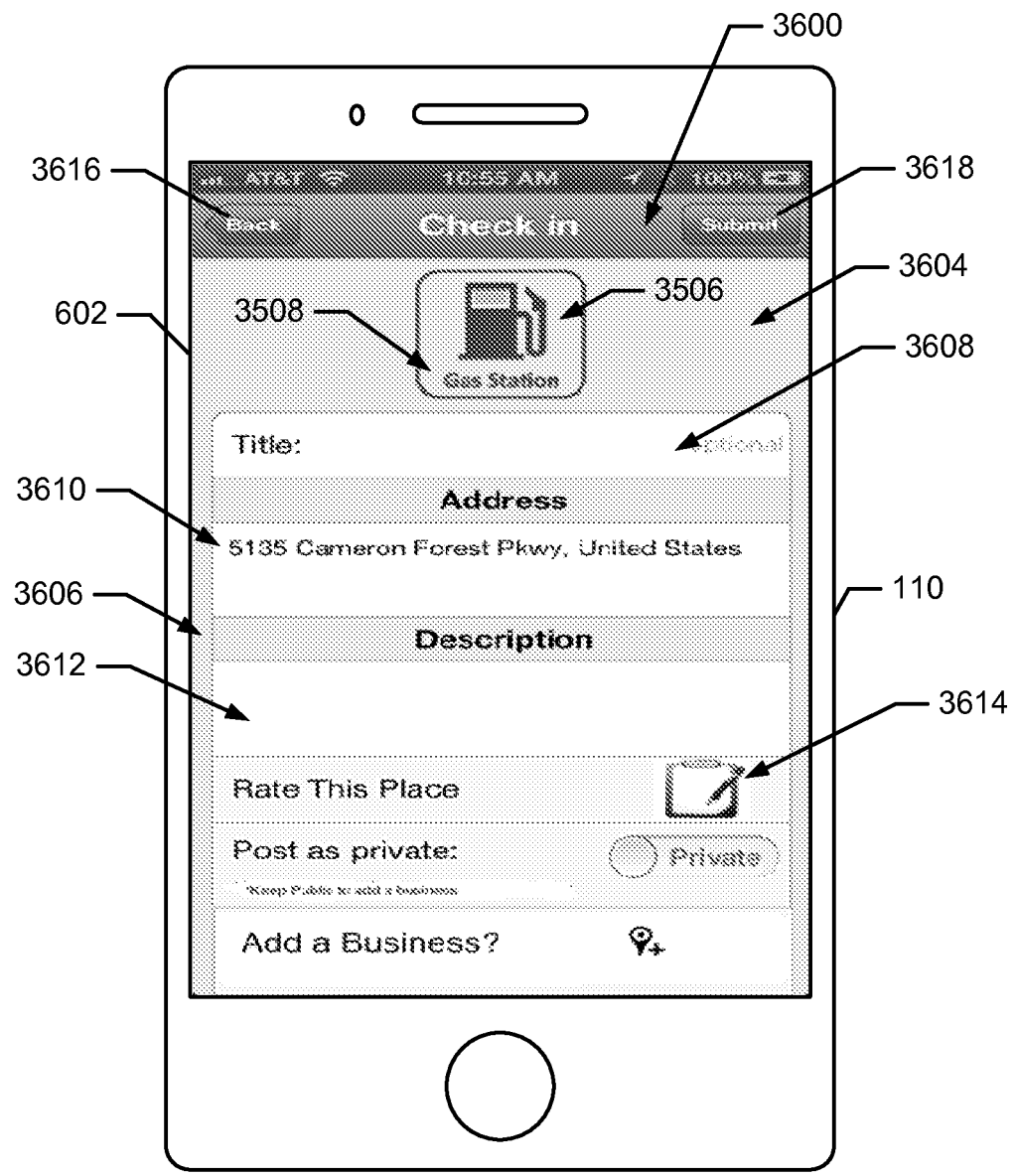
FIG. 36 displays a pictorial representation of a safety rating graphical user interface of the personal safety system application of the personal safety system.

Continuing at step 3406 of method 3400, the mobile device 110 and personal safety system application 108 receive a selection of a location type from the select location type graphical user interface 3500 by the system user 112. Next, at step 3408, the personal safety system application 108 causes the system user's mobile device 110 to display a safety rating graphical user interface 3600 (see FIG. 36) on the device's display. As illustrated in FIG. 36, the safety rating graphical user interface 3600 includes a window 3602 having a first portion 3604 in which the location type symbol 3506 and location type text 3508 corresponding to the location type selected from the select location type graphical user interface 3500 are displayed. The window 3602 also has a second portion 3606 having a title/name field 3608 for receiving an optional name or title for the location being rated for safety, a street address field 3610 for receiving a street address for the location, a description field 3612 for receiving descriptive information about the location, and a user-selectable safety rating icon 3614 for receiving selection of a safety level from the system user 112 for the location. Upon receiving selection of the title/name field 3608, street address field 3610, or description field 3612, the personal safety system application 108 causes the system user's mobile device 110 to display a keypad for use by the system user 112 in providing input and the personal safety system application 108 in receiving such input. Upon receiving selection of the user-selectable safety rating icon 3614, the safety rating icon 3614 changes color to indicate the then current safety rating for the location. Collectively, the location type, title/name, street address, description, safety rating, and geo-location for a location comprise and are referred to herein as "safety information" for the location. The safety rating graphical user interface 3600 also includes a submit button 3616 and back button 3618.

After receiving a title/name, street address, description, and safety rating from the system user 112 via the safety rating graphical user interface 3600 at step 3410, the system user's mobile device 112 and personal safety system application 108 receive selection of the submit button 3616 or back button 3618 from the system's user at step 3412. Then, at step 3414, the personal safety system application 108 determines whether the submit button 3616 or back button 3618 has been selected. If the back button 3618 has been selected, the personal safety system 100 advances to step 3422 of method 3400 described below. Alternatively, if the submit button 3618 has been selected, the personal safety system 100 advances to step 3416 where the personal safety system application 108 determines the then current geo-location of the system user's mobile device 110 (which is presumed to correspond to the geo-location of the location for which the safety information has been received by the personal safety system 100).

Proceeding to step 3418, the personal safety system application 108 causes the system user's mobile device 110 to communicate the safety information for the location to the data/communication manager(s) 102 and personal safety system manager software 104. Next, at step 3420, the personal safety system manager software 104 causes the data/communication manager(s) 102 to store the geo-correlated safety information in the personal safety system database 106 for later use. Having stored the geo-correlated safety information for the location, at step 3422, the personal safety system 100 returns to operating in accordance with method 200 and loops back to step 214 where the personal safety system 100 begins to update the map, alert and emergency data displayed on the system user's mobile device 110 via the home page graphical user interface 300.

Figure 37A:
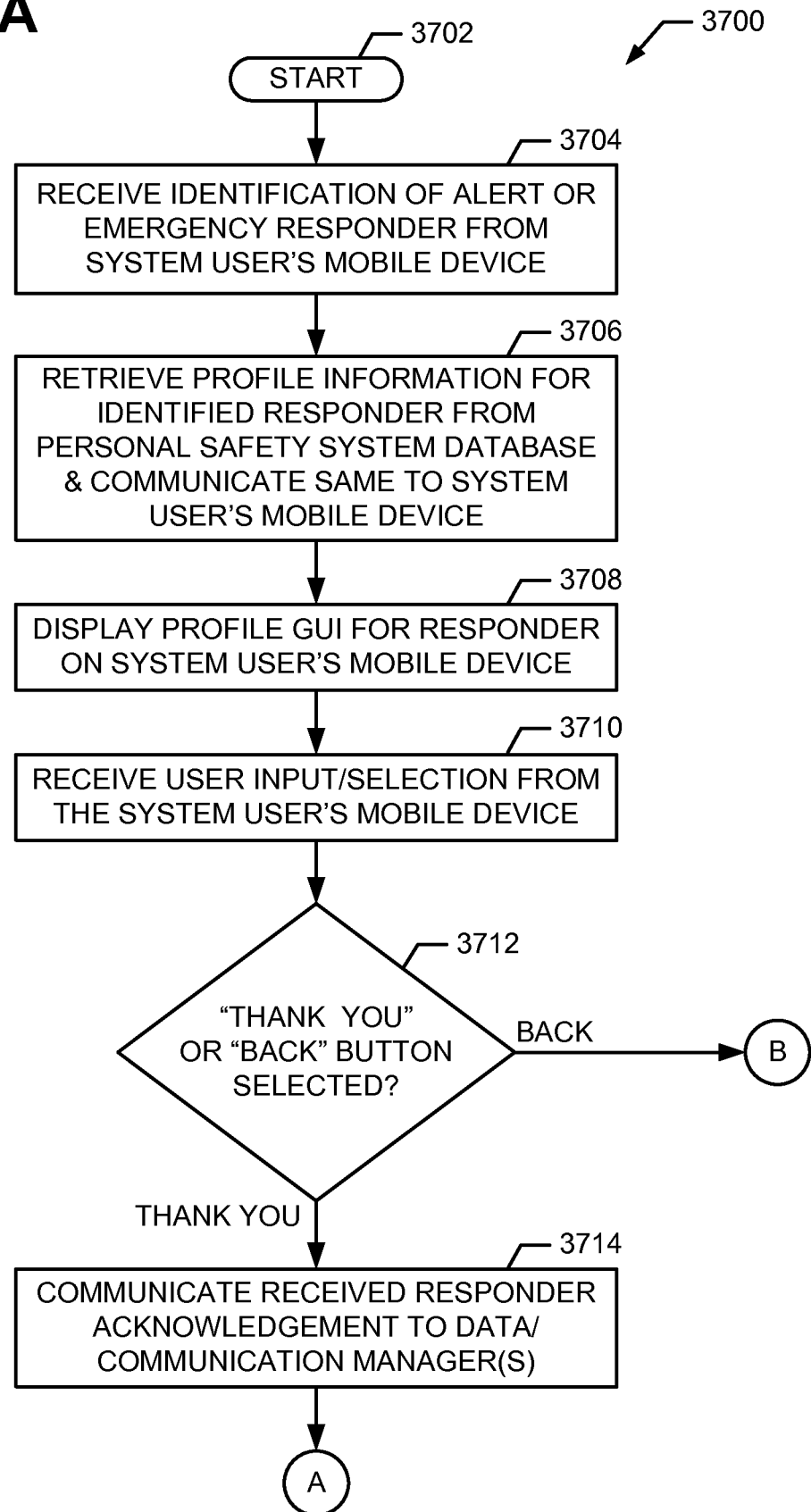
FIGS. 37A-37B display a flowchart representation of a method of the personal safety system for acknowledging responders who respond and provide assistance in connection with alerts or emergencies.
Figure 37B:
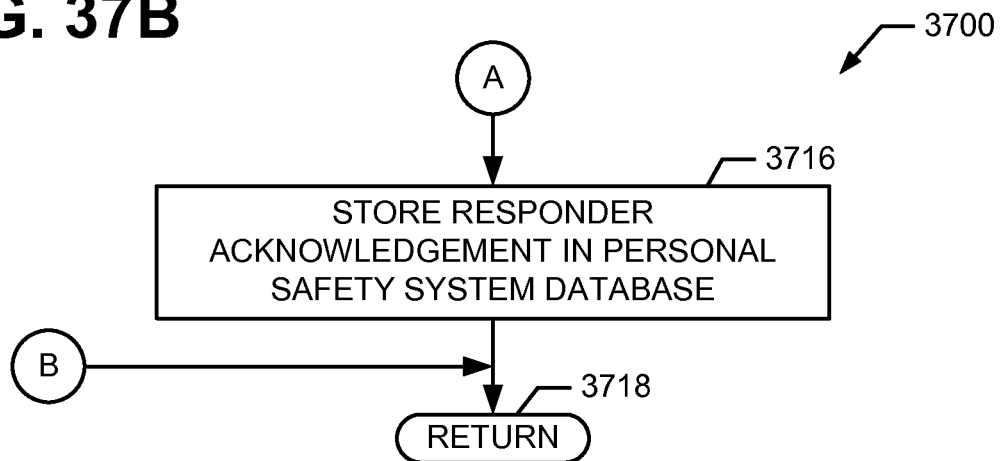

FIGS. 37A and 37B display a flowchart representation of a method 3700 of the personal safety system 100 for acknowledging responders who respond and provide assistance in connection with alerts or emergencies. A responder may be an assistance provider, a business, organization, or another system user 112. The method 3700 is implemented and followed by the personal safety system 100 whenever a system user 112 desires to acknowledge such a responder and to show gratitude and thanks for the responder's efforts. The personal safety system 100 tracks and stores data for responder acknowledgements and makes available to system users 112 the number of responder acknowledgements received by each responder. The number of responder acknowledgements received by a responder may be a factor in a subsequent decision by a system user 112 to select and request assistance from a particular assistance provider or business. Operation according to the method 3700 is initiated whenever the personal safety system application 108 receives user input selecting a button or option from a system graphical user interface associated with the method 3700.

After initiating operation in accordance with method 3700 at step 3702, the personal safety system application 108 receives identification or selection of an alert or emergency responder via the system user's mobile device 110 at step 3704. To do so, the personal safety system application 108 causes display of a graphical user interface on the system user's mobile device 110 that permits the system user 112 to identify or select an assistance provider, business, or other system user 112 for acknowledgement. Upon receiving such identification or selection, the personal safety system application 108 causes the personal safety system manager software 104 to retrieve profile information for the assistance provider, business or other system user 112 from the personal safety system database 106 and communicate the retrieved profile information to the system user's mobile device 110 and personal safety system application 108 at step 3706.

Figure 38:
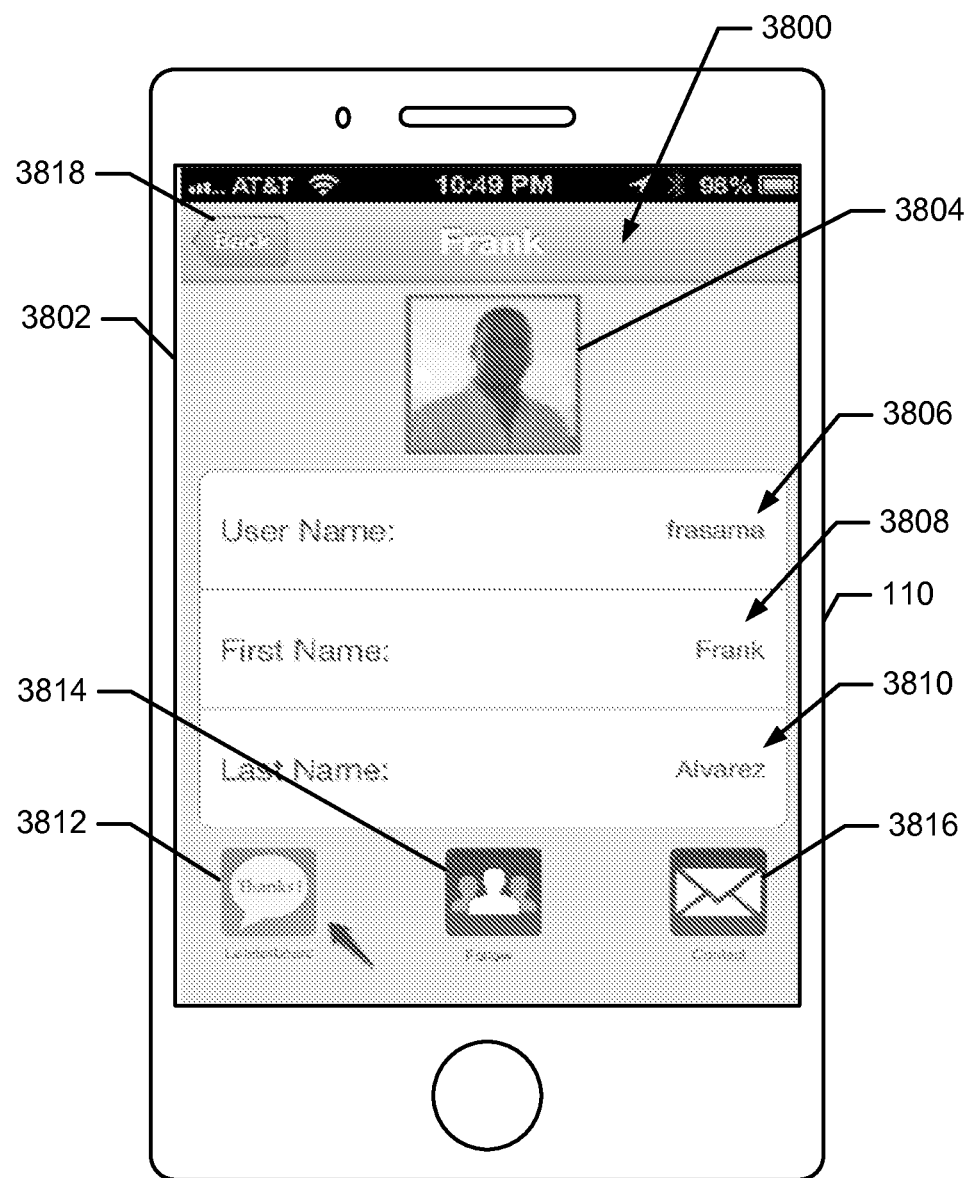
FIG. 38 displays a pictorial representation of a responder profile graphical user interface of the personal safety system application of the personal safety system.
Figure 39A:
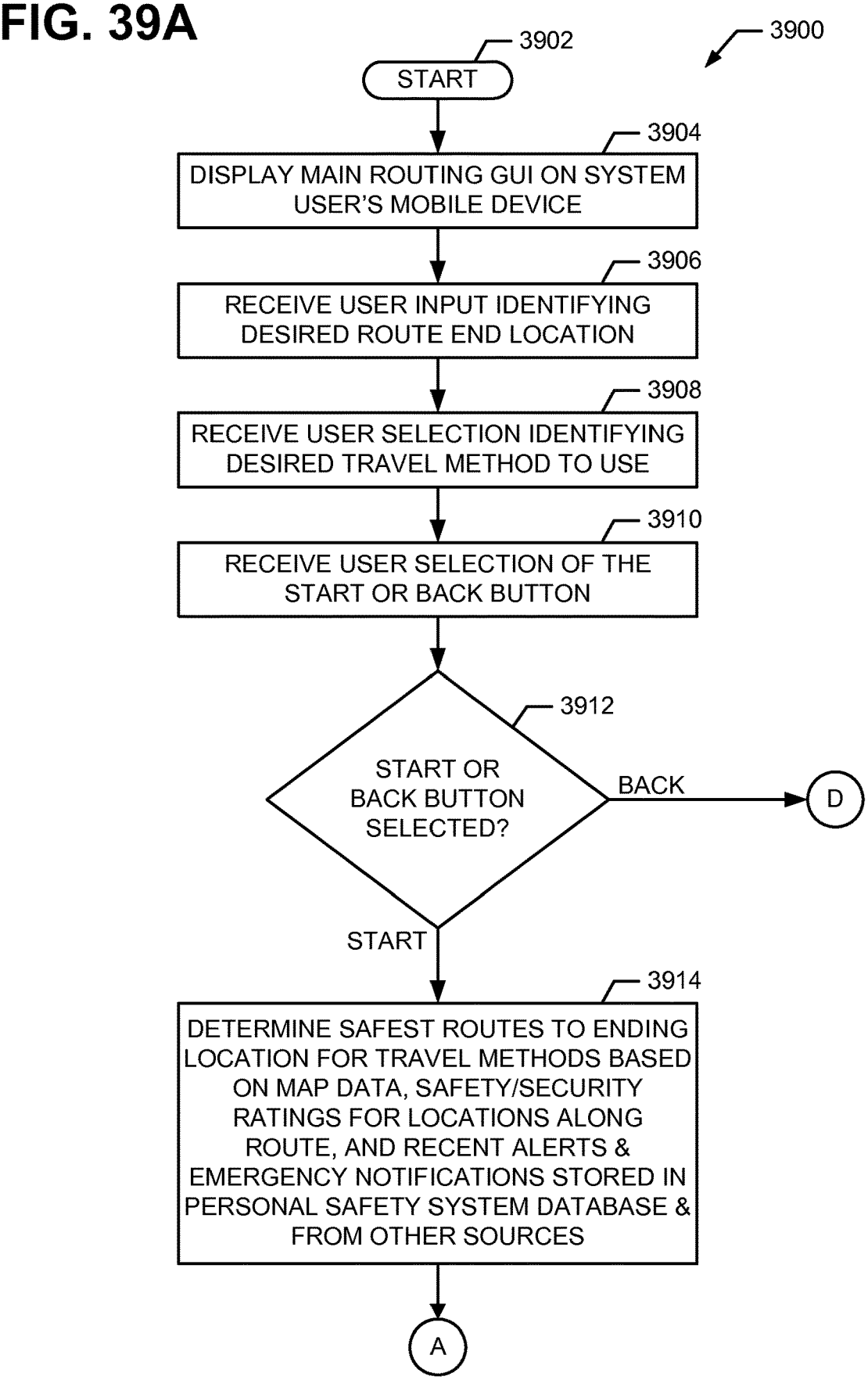
Figure 39B:
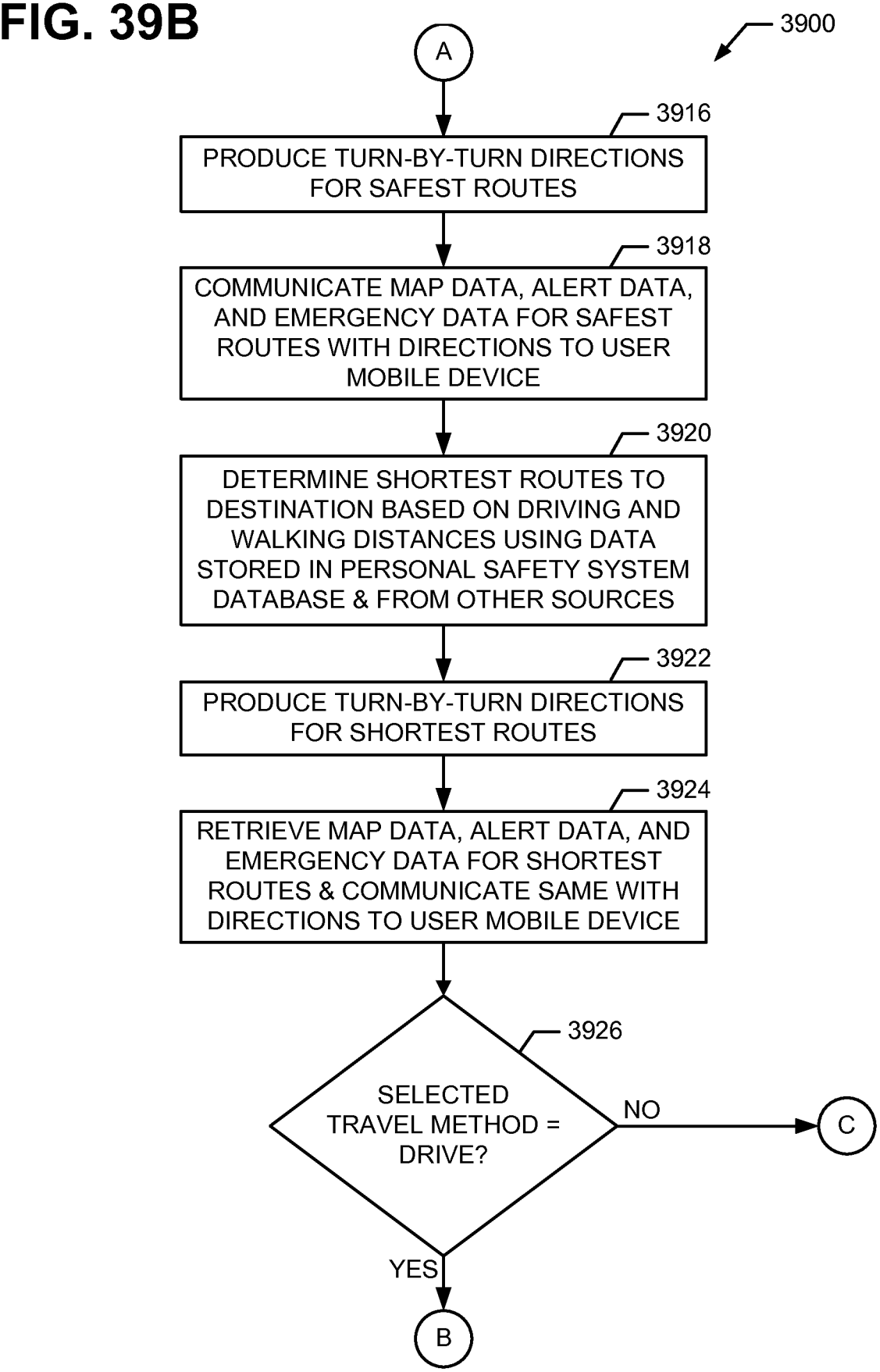
Figure 39D:
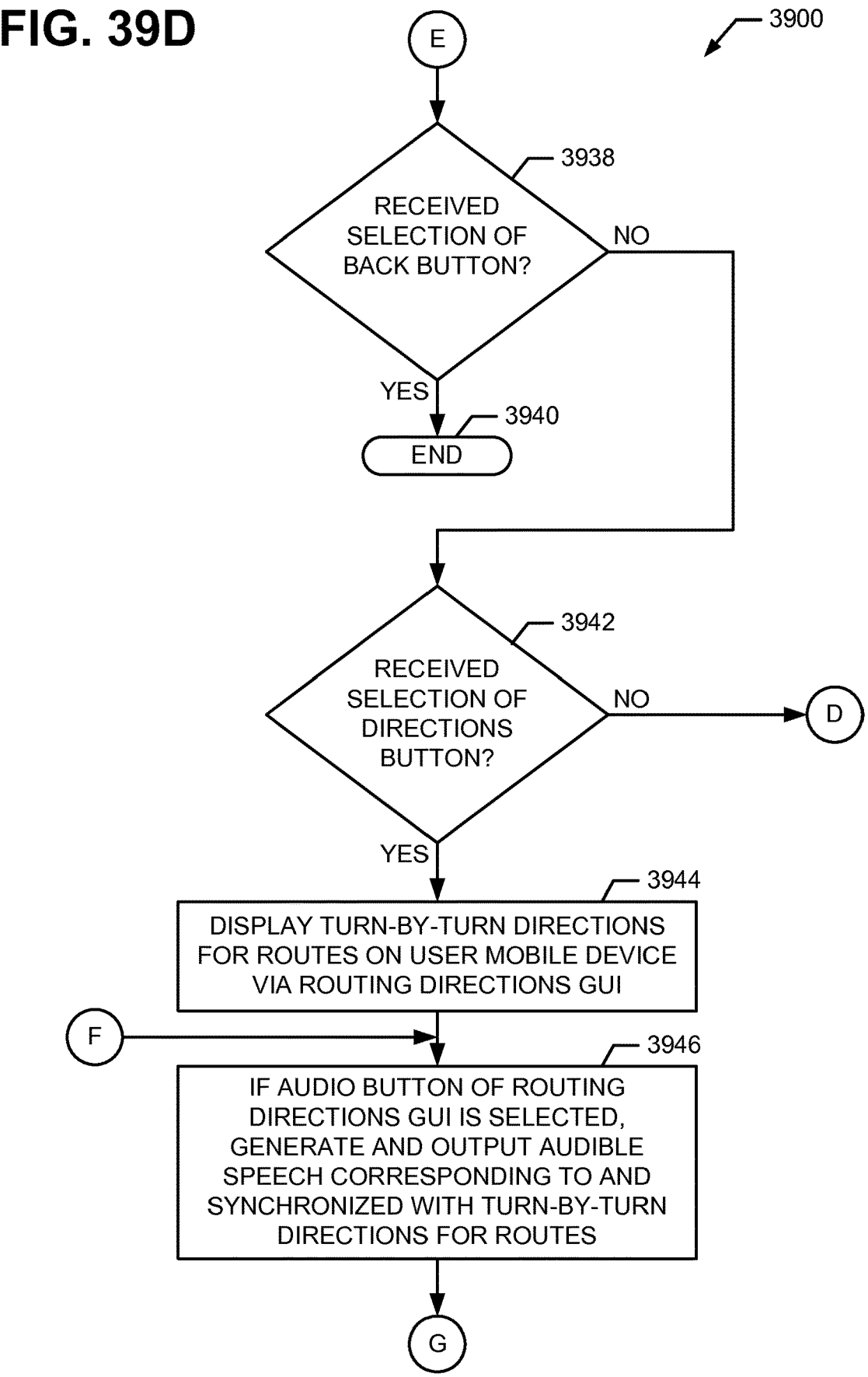
Figure 39E:
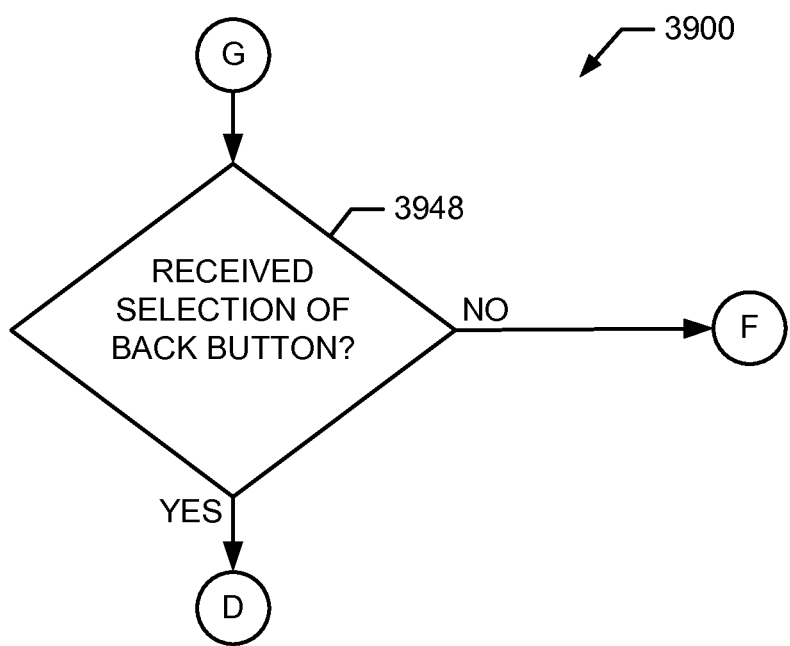

Proceeding to step 3708 of method 3700, the personal safety system application 108 causes display of a responder profile graphical user interface 3800 (see FIG. 38) on the system user's mobile device 110 including at least some of the information retrieved from the personal safety system database 106. The displayed responder profile graphical user interface 3800 is appropriate for the type of responder being acknowledged and, hence, may include profile information pertaining to a responding business, organization or person. In FIG. 38, a responder profile graphical user interface 3800 appropriate for a responding person is illustrated. The responder profile graphical user interface 3800 includes a window 3802 in which an image 3804 of the person is displayed. The window 3802 has a user name field 3806, first name field 3808, and last name field 3810 for, respectively, displaying the responder's user name, first name, and last name. The window 3802 also has a thank you button 3812 for receiving an acknowledgement of the responder's efforts from the system user 112, a follow button 3814 for enabling the system user 112 to follow the responder on social media, and a contact button 3816 for enabling the system user 112 to communicate with the responder via voice call, electronic mail, text message, or other form of communication. Additionally, the window 3802 has a back button 3818 for causing the personal safety system application 108 to end display of the responder's profile. It should be understood and appreciated that in responder profile graphical user interfaces for other types of responders an image or logo of a business or organization may be displayed together with the name of the business or organization and other profile information relevant to the business or organization in lieu of some of the information displayed in FIG. 38.

Continuing at step 3710, the personal safety system application 108 receives user input and/or selection from the system user's mobile device 112 via the responder profile graphical user interface 3800. Then, at step 3712, the personal safety system application 108 determines if the received input and/or selection corresponds to selection of the thank you button 3812 or the back button 3818. If the personal safety system application 108 determines that the received input and/or selection corresponds to the back button 3818, operation of the personal safety system 100 advances to step 3718 described below. If, however, the personal safety system application 108 determines that the received input and/or selection corresponds to selection of the thank you button 3812 indicating the system user's acknowledgement of the responder's efforts in connection with an alert or emergency, the personal safety system application 108 communicates such responder acknowledgement to the personal safety system manager software 104 and data/communication manager(s) 102 at step 3714. Next, at step 3716, the personal safety system manager software 104 causes the data/communication manager(s) 102 to store the responder acknowledgement (or data representative thereof) in the personal safety system database 106. Subsequently, at step 3718, the personal safety system 100 returns to operating in accordance with method 200 and loops back to step 214 where the personal safety system 100 begins to update the map, alert and emergency data displayed on the system user's mobile device 110 via the home page graphical user interface 300.

FIGS. 39A-39E display a flowchart representation of a method 3900 of the personal safety system 100 for generating and providing a route for traveling from a starting location to an ending location where the route corresponds to the safest route or the shortest route between the locations, and where the route corresponds to a walking route or a driving route. Based on input received from a system user 112, the personal safety system 100 determines the safest route or the shortest route for either walking or driving. In determining the safest route, the personal safety system 100 considers safety ratings for locations previously received by the system 100 and also considers alerts and emergencies received by the system 100 along each possible route that have occurred within a pre-established and pre-determined period of time prior to the then current time. Additionally, the personal safety system 100 considers information related to crimes, accidents, and other alerts or emergencies from other sources. In determining the shortest route, the personal safety system 100 evaluates possible routes based on the shortest overall travel distance along streets. The personal safety system 100 displays the safest and shortest routes in visual form together with alert and emergency markers to identify the locations of alerts and emergencies that have occurred along the route within the prior month or other period of time used by the personal safety system 100. The personal safety system application 108 also causes display of turn-by-turn directions for the routes in textual form in synchronization with the map data, highlighted route, and then current geo-location of the system user's mobile device 110. The personal safety system 100 operates according to method 3900 whenever a system user 112 desires to travel by walking or driving between starting and ending locations via the safest or shortest route, and whenever the personal safety system application 108 receives user input selecting a button or option from a system graphical user interface associated with method 3900.

Figure 40:
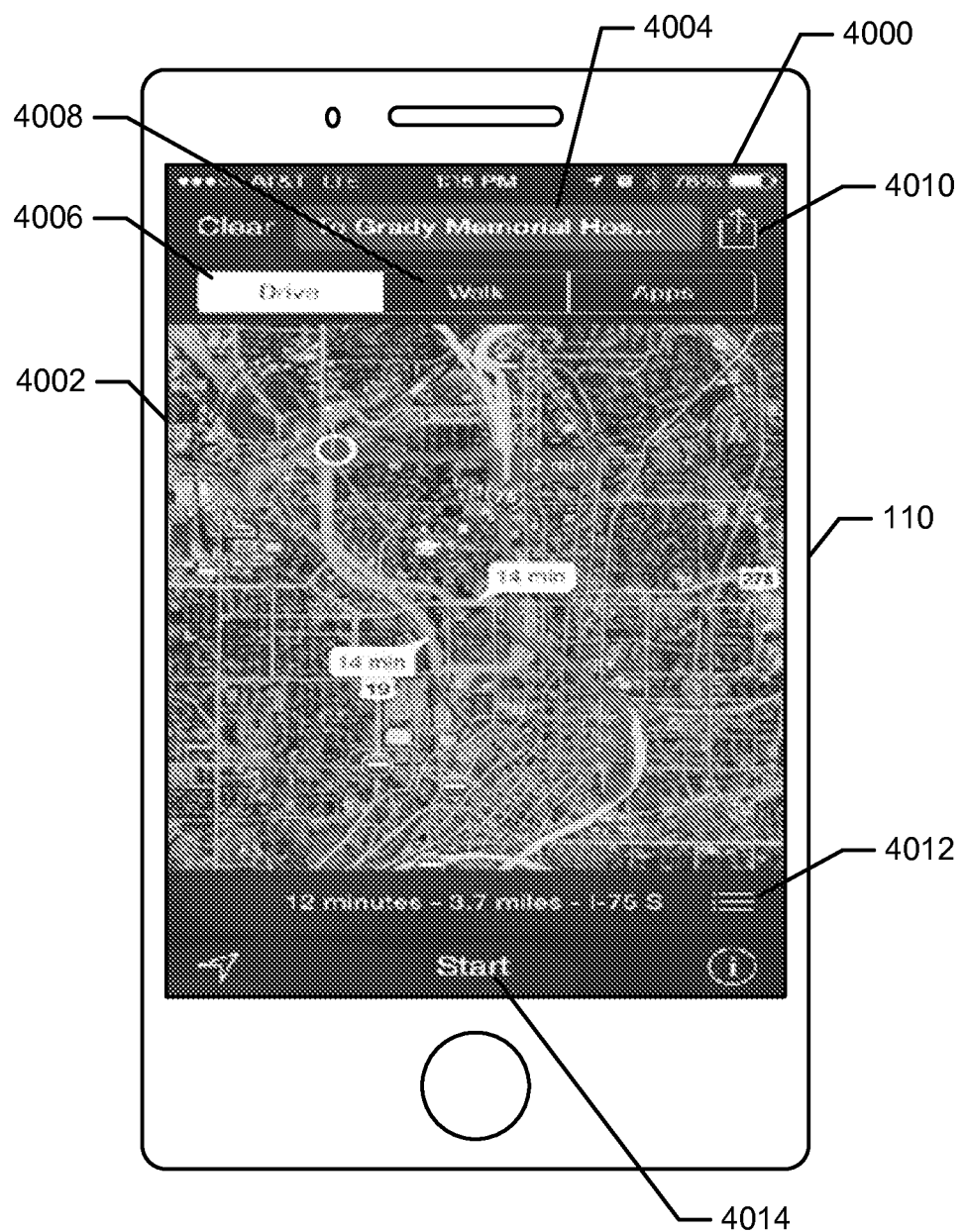
FIG. 40 displays a pictorial representation of a main routing graphical user interface of the personal safety system application of the personal safety system.

After initiating operation in accordance with method 3900 at step 3902, the personal safety system application 108 causes the display of a main routing graphical user interface 4000 (see FIG. 40) on the system user's mobile device 110 at step 3904. The main routing graphical user interface 4000 enables the personal safety system application 108 to receive input from the system user 112 and to present the safest and shortest routes for both driving and walking travel methods to the system user 112. The main routing graphical user interface 4000 has a window 4002 and includes an ending location field 4004 for receiving user input of the name of a building or landmark corresponding to the routes' ending location or of a street address corresponding to the routes' ending location. Each routes' starting location is the then current geo-location of the system user's mobile device 110. The main routing graphical user interface 4000 uses the window 4002 to display map data (or a street image) with the safest and shortest driving routes or the safest and shortest walking routes (depending on which of the drive or walk buttons 4006, 4008 described below has been selected), alert data, and emergency data superimposed atop the map data or street image.

The main routing graphical user interface 4000 also includes a drive button 4006 for receiving input from the system user 112 instructing the personal safety system application 108 to select and present the safest and shortest routes for driving (as opposed to the safest and shortest routes for walking) between the starting and ending locations, and a walk button 4008 for receiving input from the system user 112 instructing the personal safety system application 108 to select and present the safest and shortest routes for walking (as opposed to the safest and shortest routes for driving) between the starting and ending locations. The drive button 4006 and walk button 4008 are configured to toggle such that when the personal safety system application 108 receives selection of the drive button 4006 by the system user 112, the personal safety system application 108 deselects the walk button 4008. Similarly, when the personal safety system application 108 receives selection of the walk button 4008 by the system user 112, the personal safety system application 108 deselects the drive button 4006.

Additionally, the main routing graphical user interface 4000 further includes a back button 4010 for causing the personal safety system application 108 to end operation according to method 3900 when selected by the system user 112, and a directions button 4012 for causing the personal safety system application 108 to display the routing directions graphical user interface 41 Ox (described below) and the textual turn-by-turn directions for a selected route being presented by the personal safety system application 108. Additionally, the main routing graphical user interface 4000 includes a start button 4014 for starting determination of the safest and shortest routes between the starting and ending locations.

Advancing to step 3906, the personal safety system application 108 receives user input of an ending location for a route via the ending location fields 4004 of the main routing graphical user interface 4000. The user input may comprise either the name of a building or other landmark or a street address. Next, at step 3908, the personal safety system application 108 receives, via the drive and walk buttons 4006, 4008 of the main routing graphical user interface 4000, selection of a travel method (e.g., driving or walking) to use in generating the safest and shortest routes. Then, at step 3910, the personal safety system application 108 receives selection of the start button 4014 indicating the system user's desire to have the personal safety system 100 generate routes or the back button 4010 indicating the system user's desire to terminate the route generation process.

At step 3912, the personal safety system application 108 determines whether selection of the start button 4014 or the back button 4010 has been received. If selection of the back button 4010 has been received, the personal safety system 108 branches ahead to step 3932 of method 3900 described below. Alternatively, if selection of the start button 4014 has been received, the personal safety system 100 determines the safest routes for both driving and walking between the starting and ending locations at step 3914. In doing so, the personal safety system manager software 104 causes the data/communication manager(s) 102 to retrieve map data and safety ratings from the personal safety system database 106 for locations along possible driving and walking routes between the starting and ending locations. The personal safety system manager software 104 also causes the data/communication manager(s) 102 to retrieve alerts and emergency notifications from the personal safety system database 106 that were received by the personal safety system 100 for locations along the possible routes between the starting and ending locations within a pre-established period of time measured back from the current date. Additionally, the personal safety system manager software 104 causes the data/communication manager(s) 102 to retrieve information from other sources pertaining to crimes, accidents, and other types of alerts and emergencies at other locations along the possible routes between the starting and ending locations. Generally, according to the example embodiment, the personal safety system 100 considers alerts, emergencies, and other information occurring within the past month, but it should be understood and appreciated that other periods of time may be used in other example embodiments. The personal safety system 100 also considers and utilizes the retrieved information in accordance with whether a route is to be driven or walked, as certain information may be more relevant or less relevant to a particular form of travel. Further, it should be understood and appreciated that in other example embodiments, safety ratings and certain types of alerts and emergencies may not be considered to be of equal import in identifying a safest route, but instead may be given greater or lesser weight depending on their nature and/or frequency of occurrence.

Once the safest routes have been determined for driving and walking, operation of the personal safety system 100 proceeds to step 3916 where the personal safety system manager software 104 produces sets of turn-by-turn directions in textual, visual and/or audible form for the safest routes. Then, at step 3918, the personal safety system manager software 104 causes the data/communication manager(s) 102 to communicate map data, alert data, and emergency data for the safest routes along with the produced turn-by-turn directions for them to the system user's mobile device 110 and personal safety system application 108.

Next, at step 3920, the personal safety system application 108 determines the shortest routes for both driving and walking between the starting and ending locations. To do so, the personal safety system manager software 104 uses map data stored in the personal safety system database 106 and from other sources (if necessary) to calculate the cumulative distances for multiple routes, if possible, along streets between the starting and ending locations and selects the routes having, respectively, the shortest cumulative driving and walking distances. Then, at step 3922, the personal safety system manager software 104 produces a set of turn-by-turn directions in textual, visual and/or audible form for the shortest routes. Next, at step 3924, the personal safety system manager software 104 causes the data/communication manager(s) 102 to retrieve map data, alert data, and emergency data for the shortest routes and causes the data/communication manager(s) 102 to communicate such data along with the produced turn-by-turn directions to the system user's mobile device 110 and personal safety system application 108.

Subsequently, at step 3926, the personal safety system application 108 determines whether the drive button 4006 or walk button 4008 (i.e., which travel method) has been selected by the system user 112. If the drive button 4006 has been selected, the personal safety system application 108 causes presentation in visual form, at step 3928, of the safest and shortest driving routes superimposed on the received map data, alert data, and emergency data with markers for the starting and ending locations in window 4002 of the main routing graphical user interface 4000. Then, operation of the method 3900 advances to step 3932 described below. If, at step 3926, the personal safety system application 108 determines that the walk button 4008 has been selected by the system user 112, the personal safety system application 108 causes presentation in visual form, at step 3930, of the safest and shortest walking routes superimposed on the received map data, alert data, and emergency data with markers for the starting and ending locations in window 4002 of the main routing graphical user interface 4000.

At step 3932, the personal safety system manager software 104 causes the data/communication manager(s) 102 to retrieve alert data and emergency data from the personal safety system database 106 corresponding to alerts and emergencies occurring after generation of the routes, and to communicate the retrieved data to the system user's mobile device 110 and personal safety system application 108. Then, at step 3934, the personal safety system application 108 causes updating of the alert markers and emergency markers along the routes so that the system user 112 is presented with up-to-date information and is generally alerted of any currently occurring situations along the routes.

Figure 41:
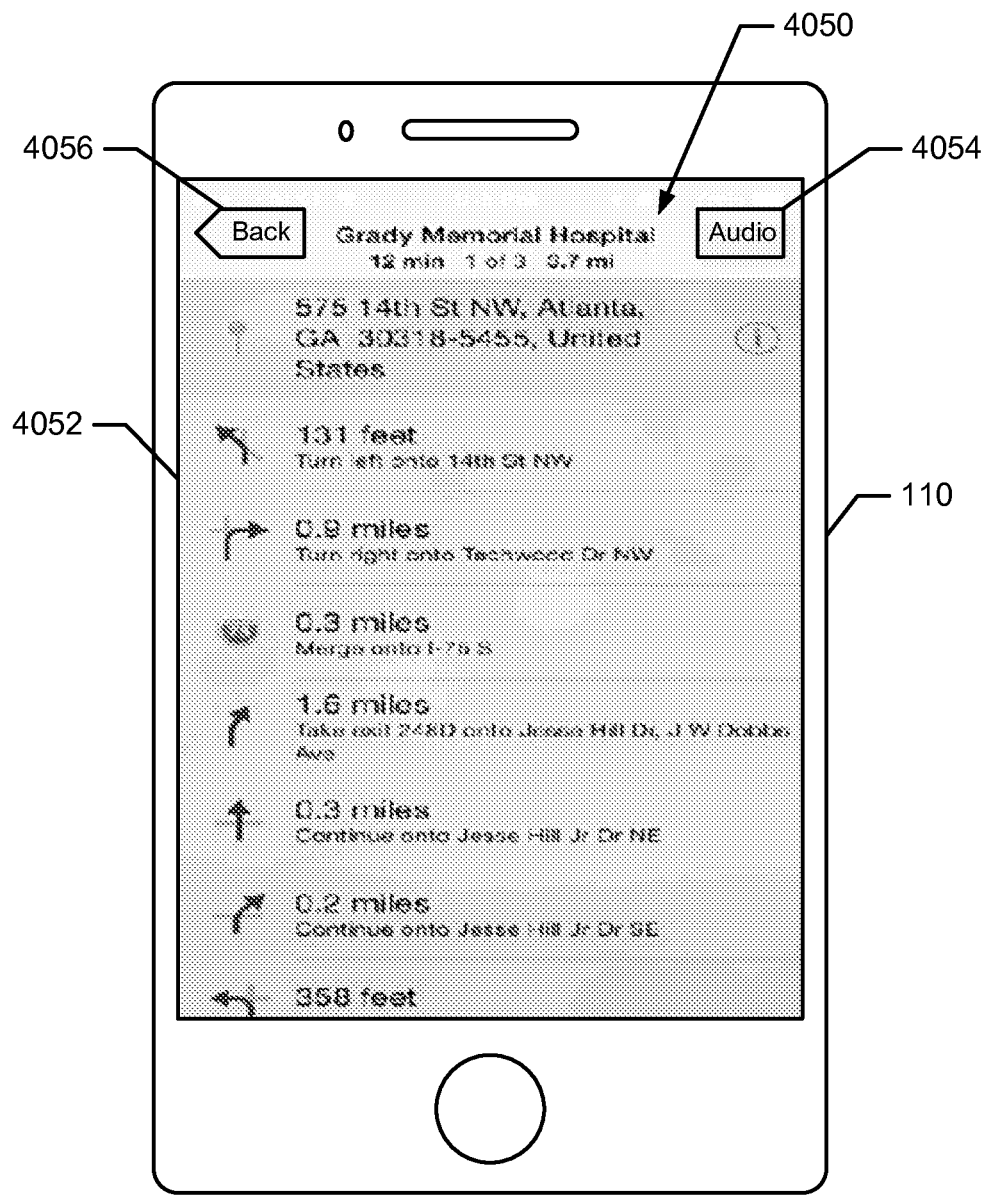
FIG. 41 displays pictorial representation of a routing directions graphical user interface of the personal safety system application of the personal safety system.
Figure 42C:
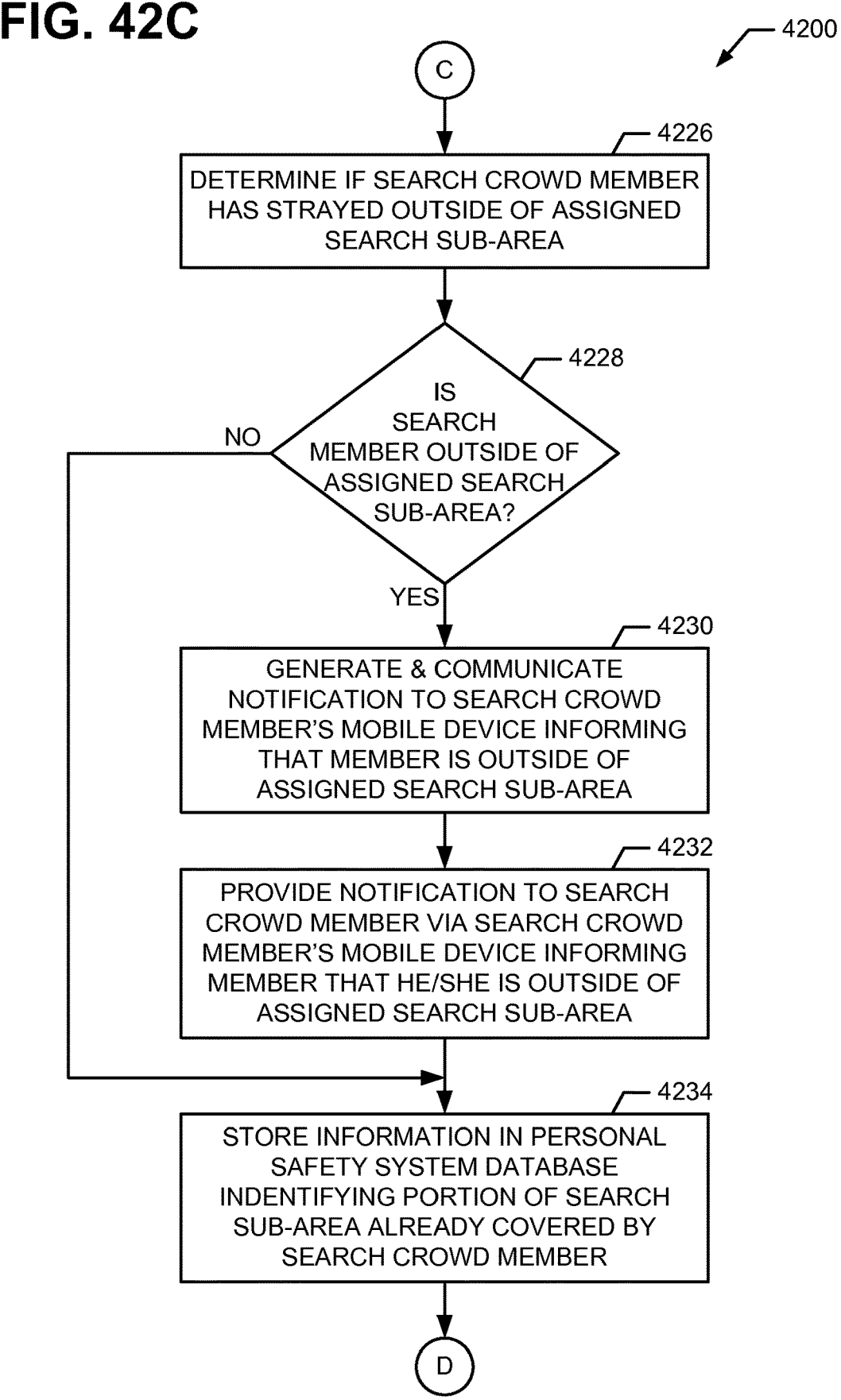
Figure 42D:
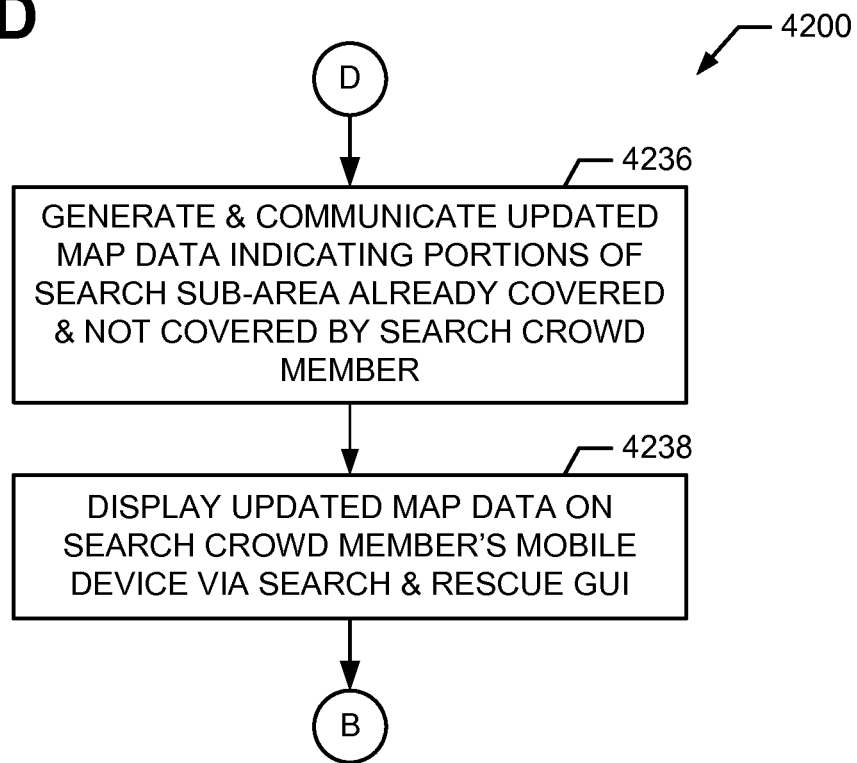
Figure 43B:
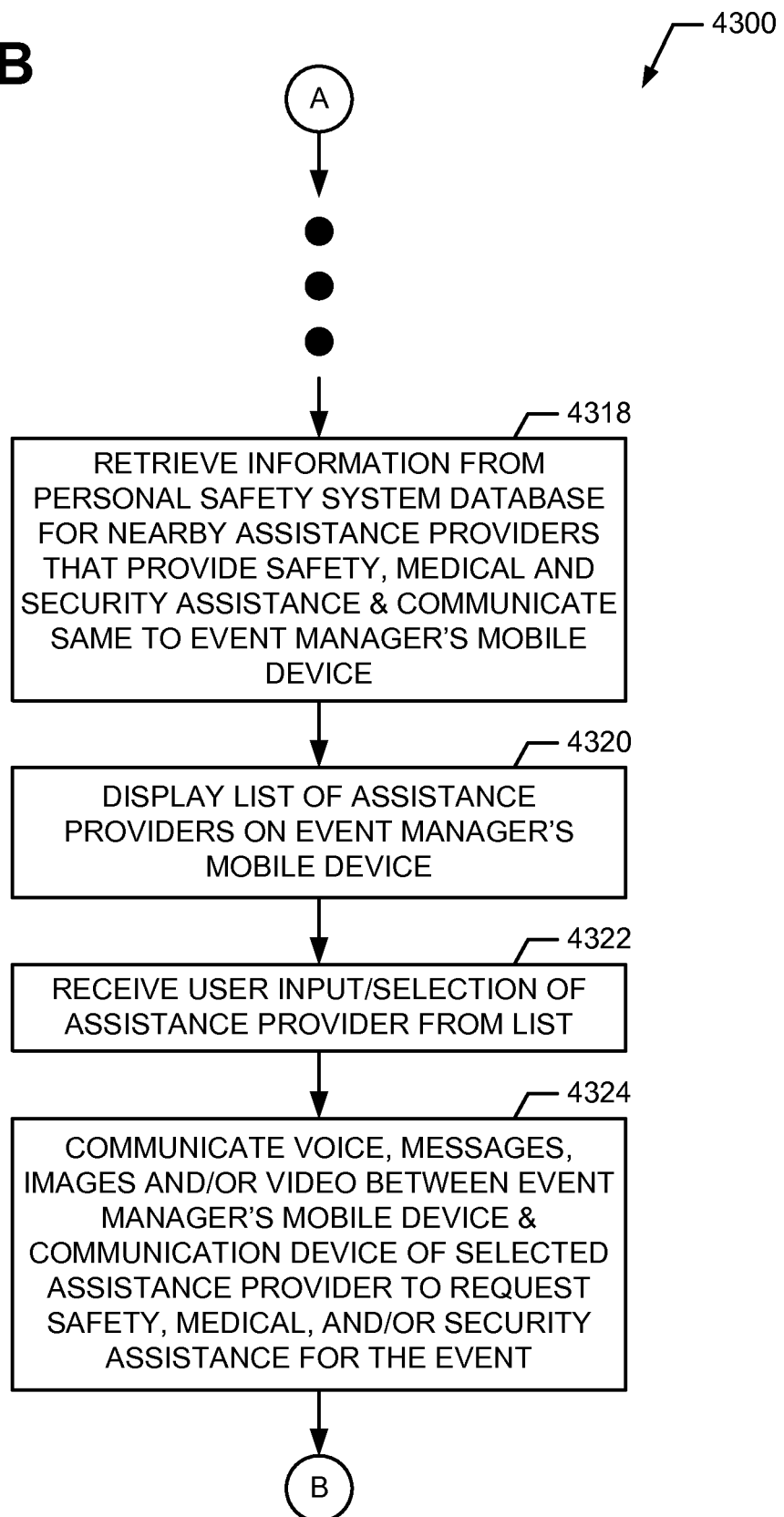
Figure 43C:
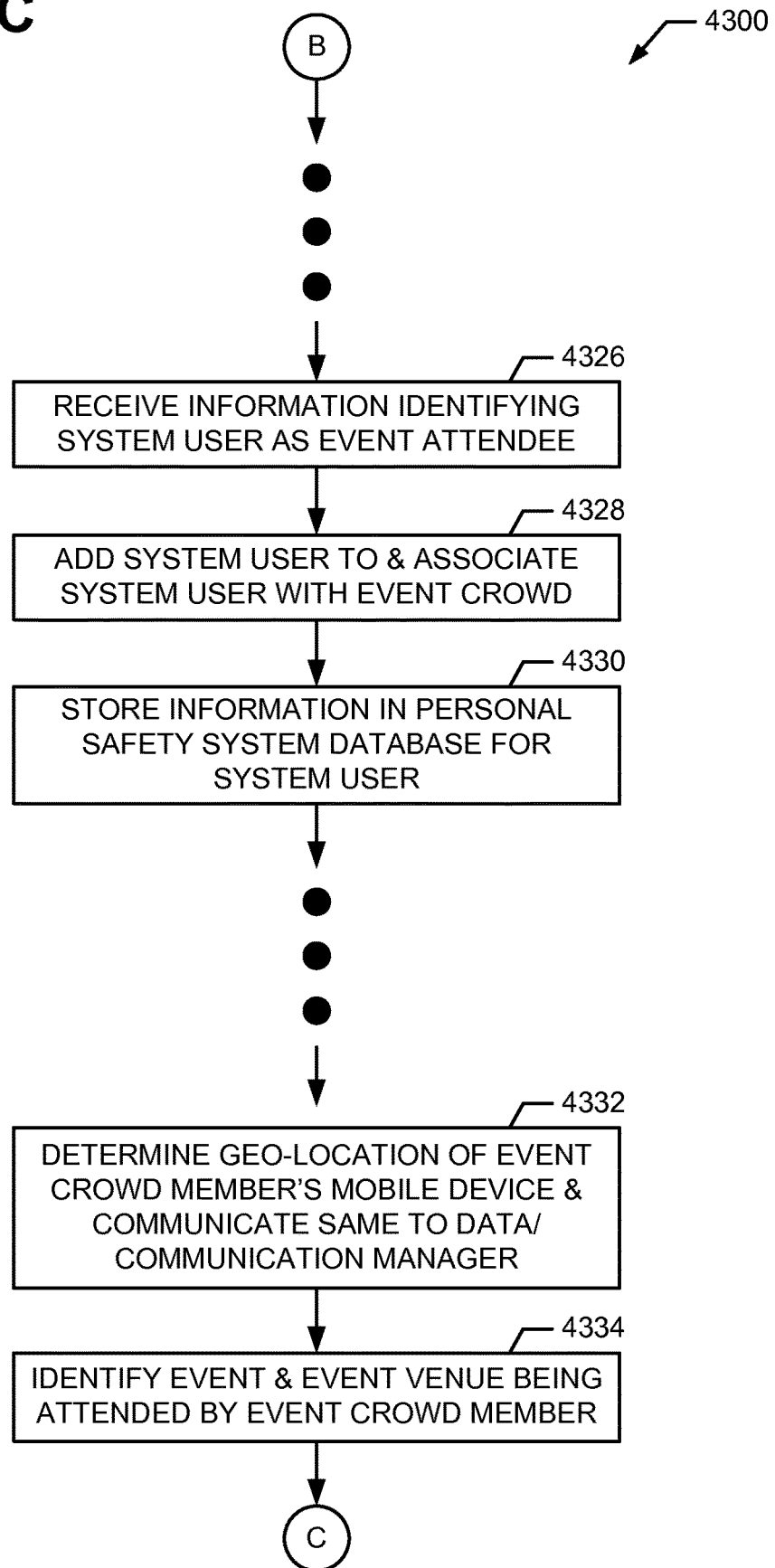
Figure 43D:
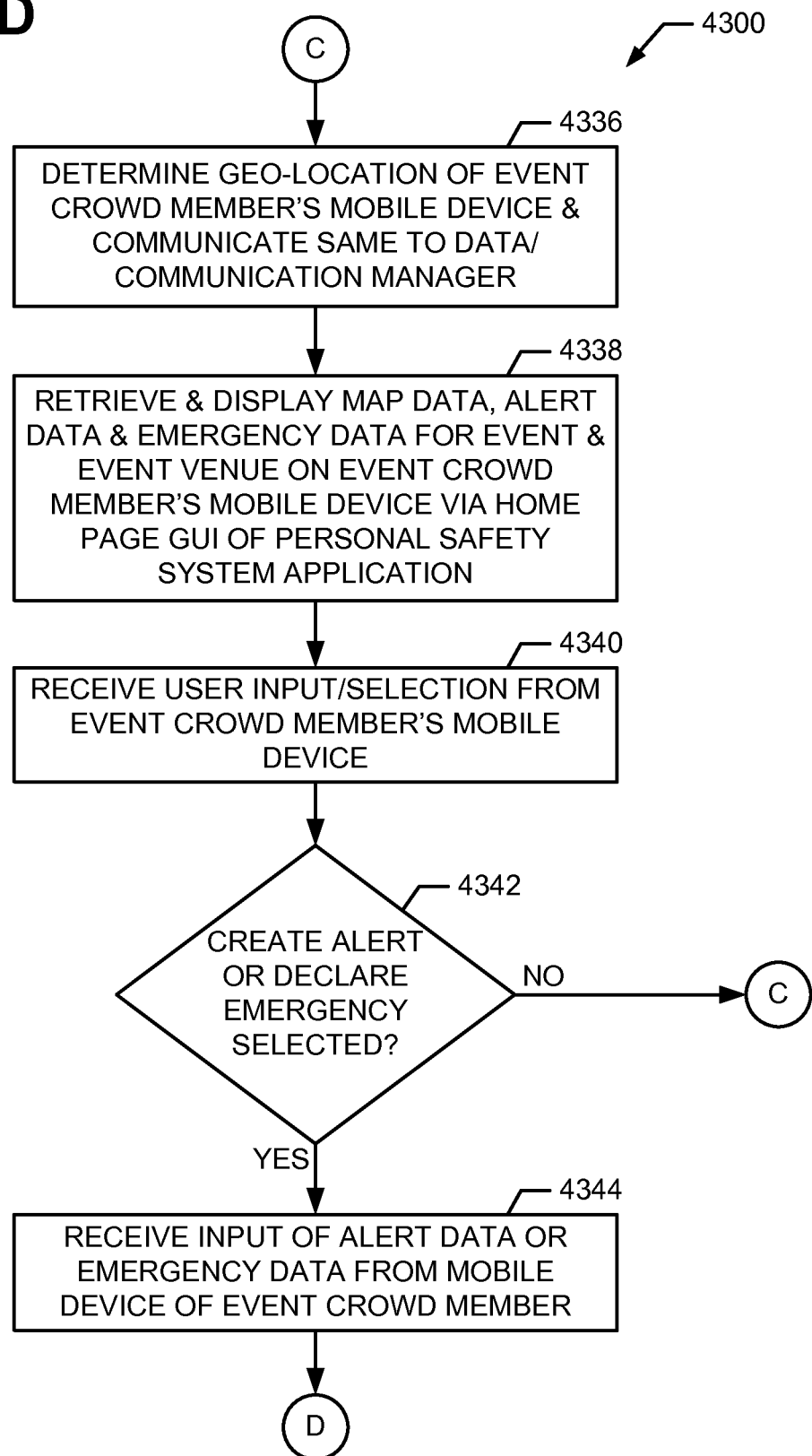

Next, at step 3936, the personal safety system application 108 checks to see if user input and/or selection has been received by the system user's mobile device 110 via the main routing graphical user interface 4000. The personal safety system application 108 then determines, at step 3938, if selection of the back button 4010 has been received. If so, at step 3940, the personal safety system 100 returns to operating in accordance with method 200 and loops back to step 214 where the personal safety system 100 begins to update the map, alert and emergency data displayed on the system user's mobile device 110 via the home page graphical user interface 300. If selection of the back button 4010 has not been received, the personal safety system 100 determines, at step 3942, if selection of the directions button 4012 has been received from the system user 112. If selection of the directions button 4012 has not been received, operation of the personal safety system 100 loops back to step 3932 of method 3900 described above. If, at step 3942, the personal safety system application 108 determines that selection of the directions button 4012 has been received, the personal safety system application 108 causes display of a routing directions graphical user interface 4050 (see FIG. 41) at step 3944 and the turn-by-turn directions corresponding to and synchronized with the routes.

The routing directions graphical user interface 4050 has a window 4052 in which the personal safety system application 108 displays turn-by-turn driving directions for the safest and shortest driving routes or turn-by-turn walking directions for the safest and shortest walking routes based on which of the drive or walk buttons 4006, 4008 has been selected. The routing directions graphical user interface 4050 includes an audio button 4054, the selection of which causes the personal safety system application 108 to toggle on and off the generation and output of audible speech corresponding to and synchronized with the displayed turn-by-turn directions. Additionally, the routing directions graphical user interface 4050 includes a back button 4056 for causing the personal safety system application 108 to end display of the routing directions graphical user interface 4050 (and, hence, to end the display of turn-by-turn directions and, as appropriate, the generation of audible speech corresponding to the turn-by-turn directions) when selected by the system user 112.

Continuing at step 3946 of method 3900, if selection of the audio button 4054 has been previously received from the system user 112, the personal safety system application 108 causes the generation and output of audible speech corresponding to the turn-by-turn directions displayed in window 4052. Then, at step 3948, the personal safety system application 108 determines if selection of the back button 4056 has been received from the system user 112. If so, operation of method 3900 loops back to step 3932 described above. If not, operation of method 3900 returns to step 3946.

FIGS. 42A-42D display a flowchart representation of a method 4200 of the personal safety system 100 for searching for a lost or missing person, animal, aircraft, vehicle, or article. Using input information received from one or more persons organizing and directing a search (sometimes referred to herein as a "search coordinators") for such missing person, animal, aircraft, vehicle, or article, a geographical search area identified for the search is subdivided into smaller geographical search sub-areas with one or more system users 112 being assigned to search each geographical search sub-area. Collectively, the assigned system users 112 are referred to herein as a "search crowd" with individual assigned system users 112 being referred to herein as a "search crowd member". Once the personal safety system 100 has received assignments of search crowd members to geographical search sub-areas and searching begins, the personal safety system 100 monitors the locations of the mobile devices 110 of the search crowd members while they search and provides each search crowd member's mobile device 110 with information identifying the corresponding search member's geo-location relative to his/her assigned geographical search sub-area, informing the search member of the portions of his/her assigned geographical search sub-area that has and has not been searched, and notifying the search member when he/she has strayed outside of his/her assigned geographical search sub-area. The personal safety system 100 also provides such information to the mobile devices 110 of search coordinators, thereby allowing search coordinators to monitor the progress of an ongoing search. The personal safety system 100 operates according to method 4200 whenever a search of a geographical search area needs to be conducted, and the personal safety system application 108 receives user input selecting a button or option from a system graphical user interface associated with method 4200.

After initiating operation in accordance with method 4200 at step 4202, the personal safety system application 108 causes the display of a search and rescue graphical user interface on a search coordinator's mobile device 110 at step 4204. The search and rescue graphical user interface is configured with appropriate input fields, buttons and other interface elements to interact with the search coordinator and allow the search coordinator to provide input information about the search, including, but not limited to, information defining the geographical search area and its boundaries, information defining the geographical search sub-areas and their boundaries, information identifying search crowd members and their respective geographical search sub-areas, and information identifying the portions of geographical search sub-areas covered and not covered by the assigned search crowd members. The search and rescue graphical user interface is also configured to output map data, markers, and other data and/or information in connection with the functionality described herein.

Continuing according to method 4200 at step 4206, the personal safety system application 108 receives information from the search coordinator via the search and rescue graphical user interface about and describing the search, defining the geographical search area and its boundaries, and defining geographical search sub-areas and their boundaries for subsequent assignment to search crowd members. The geographical search area and geographical search sub-areas may be defined using man-made structures such as streets, buildings, and railroad tracks, using natural features such as lakes, ponds, rivers, and streams, using search grids, and/or using x,y-coordinate data (including x,y-coordinate data received from the Global Positioning System). After receiving such information, the personal safety system application 108 causes the information to be stored in the personal safety system database 106 at step 4208. To do so, the personal safety system application 108 communicates the information to personal safety system manager software 104 executed by a data/communication manager 102 which, in turn, causes the data/communication manager 102 to store the information in the personal safety system database 106.

Next, at step 4210 of method 4200, the personal safety system application 108 receives information from the search coordinator, via the search and rescue graphical user interface and the search coordinator's mobile device 110, identifying the search crowd members and defining the search crowd for the search. The personal safety system application 108 causes this information to be stored in the personal safety system database 106, at step 4212, through interaction with the personal safety system manager software 104 and a data/communication manager 102 similar to that described at step 4208 described above.

Proceeding to step 4214 of method 4200, the personal safety system application 108 receives information from the search coordinator selecting and assigning one or more search crowd members to each geographical search sub-area through use of the search and rescue graphical user interface and the search coordinator's mobile device 110. Then, at step 4216, the personal safety system 108 causes the personal safety system 100 to store the information identifying the search crowd member(s) in association with the particular geographical search sub-area to which the search crowd member(s) are assigned in the personal safety system database 106. To do so, the personal safety system application 108 communicates the information to personal safety system manager software 104 operating on a data/communication manager 102 for subsequent storage by the data/communication manager 102.

Upon the expiration of some period of time which may be small or large depending on a variety of factors and as indicated by the ellipses of FIG. 42B, each search crowd member begins to physically search his/her assigned geographical search sub-area for the missing person or item, and initiates operation of the personal safety system application 108 and the search and rescue graphical user interface on his/her mobile device 110. After beginning operation on the search member's mobile device 110 and at step 4218, the personal safety system application 108 retrieves map data corresponding to the geographical search sub-area assigned to the search crowd member through interaction with the personal safety system manager software 104 executing on a data/communication manager 102. Then, at step 4220, the personal safety system application 108 causes display of the retrieved map data (and, hence, of a map of the search member's geographical search sub-area) on the search crowd member's mobile device 110 via the search and rescue graphical user interface.

At step 4222, the personal safety system application 108 determines the geo-location of the search crowd member's mobile device 110 and, presumably, of the search crowd member via the mobile device's Global Positioning System (GPS) capabilities (or other similar capabilities or methods), and communicates data corresponding to the then current geo-location of the mobile device 110 to the data/communication manager(s) 102 and the personal safety system manager software 104. The personal safety system manager software 104 then causes the personal safety system application 108 to display a marker on the map of the search crowed member's geographical search sub-area visible to the search crowd member via the search and rescue graphical user interface. The marker indicates the search crowd member's then current geo-location relative to the remainder of the search member's geographical search sub-area. This enables the search member to know where he/she is then located relative to his/her geographical search sub-area and to determine which direction to move in order to cover a desired portion of his/her assigned geographical search sub-area.

Subsequently, at step 4226 of method 4200, the personal safety system manager software 104 determines if the search crowd member has strayed outside of the assigned geographical search sub-area assigned to the search crowd member. If the search member is not outside of his/her assigned geographical search sub-area, operation of the personal safety system 100 branches ahead at step 4228 and continues at step 4234 described below. If the search member is outside of his/her assigned geographical search sub-area, operation of the personal safety system 100 advances from step 4228 to step 4230 of method 4200 where the personal safety system manager software 104 generates and communicates a notification to the search crowd member's mobile device 110 (and to the personal safety system application 108 operating on the search crowd member's mobile device 110) informing the search crowd member that he/she is outside of his/her assigned geographical search sub-area. After receiving the notification, the personal safety system application 108 provides notification to the search crowd member, via the search crowd member's mobile device 110, that he/she has strayed outside of his/her geographical search sub-area at step 4232. The provision of such notification may made through display of a textual message or a flashing marker or symbol on the search and rescue graphical user interface, through an electronic mail, through social media, through generation of an audible message or tone on the search crowd member's mobile device 110, or through one or more other methods.

At step 4234, the personal safety system manager software 104 uses the then current geo-location determined for the search crowd member to store information in the personal safety system database 106 indentifying the portion of the search crowd member's geographical search sub-area already covered by the search crowd member. Then, at step 4236, the personal safety system manager software 104 generates updated map data for the search crowd member's mobile device 110 indicating the portions of the geographical search sub-area covered and not covered by the search crowd member and communicates the updated map data to the personal safety system application 108 operating on the search crowd member's mobile device 110. Next, at step 4238, the personal safety system application 108 causes display of the updated map data via the search and rescue graphical user interface already displayed on the search crowd member's mobile device 110. By viewing the updated map data, the search crowd member can see how much of his/her assigned geographical search sub-area he/she has covered and not covered. Also, the search crowd member can determine which direction he/she needs to walk in order to cover any previously uncovered portion of his/her assigned geographical search sub-area. Once the updated map data has been displayed, operation of the personal safety system 100 loops back to step 4222 of method 4200 to again determine the then current geo-location of the search crowd member and proceed as described above.

FIGS. 43A-43E display a flowchart representation of a method 4300 for enhancing the personal safety of persons attending or present at an event at an event venue. In accordance with the method 4300, the personal safety system 100 collects information pertaining to events and their venues, identifies and communicates with assistance providers near such venues to obtain assistance in connection with the events, receives and distributes information for alerts and emergencies related to the event, event venue, and nearby areas, and provides information pertaining to event venue safety related facilities and personnel.

After starting operation according to method 4300 at step 4302, the personal safety system 100 receives information related to event venues at which events are to be held (such information being sometimes possibly referred to herein as "event venue information" or "event venue data") at step 4304. The event venue information may be received via an event venue graphical user interface that may be displayed on the mobile device 110 or other device of the event venue's manager, via data transfer from another device or system, or via other methods. For each event venue, the event venue information comprises, without limitation: the name, street address and geo-location of the venue; map data for the venue identifying the geo-locations of seats, normal and emergency exits, security offices and medical/paramedic facilities, defibrillators, restrooms, and concession stands; information identifying persons in charge of such event venue and for providing safety, medical/paramedic assistance, and security for the event venue, together with their respective contact information; and, information related to businesses, other organizations, and assistance providers near the event venue that provide safety, medical/paramedic, security, or other forms of assistance and that may be helpful to persons operating or attending the event. After receiving such event venue information, the personal safety system 100, through communication and interaction between the personal safety system application 108 and the personal safety system manager software 104, causes a data/communication manager 102 to store such event venue information in the personal safety system database 106 at step 4306.

Next, at step 4308 of method 4300 and in response to input received from an event manager via the personal safety system application 108 indicating his/her desire to configure an event within the personal safety system 100, the personal safety system application 108 causes the mobile device 110 of an event manager to display a list of event venues for selection via a select venue graphical user interface. To do so, the personal safety system application 108 causes the personal safety system manager software 104, via a data/communication manager 102, to retrieve event venue information from the personal safety system database 106 and communicate the retrieved event venue information to the event manager's mobile device 110. Advancing to step 4310, the event manager's mobile device 110 receives input corresponding to the selection of an event venue from the select venue graphical user interface.

Continuing operation according to method 4300 at step 4312, the personal safety system application 108 causes display of an add/edit event graphical user interface on the event manager's mobile device 110. The add/edit event graphical user interface enables interaction between the personal safety system 100 and the event manager and allows the personal safety system 100 and personal safety system application 108 to receive information related to events (sometimes possibly referred to herein as "event information" or "event data") to be held at the previously selected/identified event venue. For each event, the event information includes, but is not limited to, information identifying the event and the event's venue, information describing the event, the day/time of the event, information identifying persons involved with the event and their contact information, and information pertaining to the event or the event's medical and security coverage or plan that constitutes an addition or exception to the normal coverage or plan for the event's venue. The personal safety system application 108 receives event information from the event manager for an event via the add/edit event graphical user interface and event manager's mobile device 110 at step 4314. Then, at step 4316, the personal safety system application 108 communicates the received event information to the personal safety system manager software 104 of a data/communication manager 102, which stores the received event information in the personal safety system database 106.

Once the personal safety system 100 has received and stored event information for an event and, perhaps, after the passage of a period of time as indicated by the ellipses, at step 4318, the personal safety system manager software 104 retrieves information for businesses, other organizations, and assistance providers near the venue associated with the event that are available to provide safety, medical/paramedic, and/or security assistance for the event and communicates such information to the event manager's mobile device 110 and the personal safety system application 108 executing thereon. The personal safety system application 108 causes the names of the assistance providers and/or associated information to be displayed on the event manager's mobile device 110 via an assistance provider graphical user interface at step 4320. Then, at step 4322, the personal safety system application 108 receives input from the event manager, via the assistance provider graphical user interface, selecting an assistance provider from which to request safety, medical, and/or security assistance in connection with the event. Advancing to step 4324, the personal safety system application 108 causes the event manager's mobile device 110 to communicate with a communication device of the selected assistance provider via voice, messages, images, and/or video to request desired assistance for the event from the assistance provider.

Operation according to method 4300 continues at step 4326 and, perhaps, after the passage of another period of time as indicated by the ellipses, when a system user 112 purchases or is provided with a ticket for an event at an event venue and the personal safety system 100 is made aware of such purchase. Upon receiving information that the system user 112 has a ticket for such event, the personal safety system 100 and, more particularly, the personal safety system manager software 104 and data/communication manager 102 adds the system user 112 to and associates the system user 112 with other system users 112 having tickets to such event at step 4328 and stores information for such system user 112 in the personal safety system database 106 indicating he/she holds a ticket or plans to attend such event at step 4330. Collectively, system users 112 having a ticket to or attending such event are referred to herein as an "event crowd" with individual system users 112 being referred to as "event crowd members". The personal safety system 100 may receive information indicating a system user 112 has purchased or received a ticket to such event directly from the system user 112 via, for example, the personal safety system application 108 or indirectly by receiving data from a ticket seller's computer system, the event manager's computer system, or the event venue's computer system.

After the passage of another period of time indicated by the ellipses and when an event crowd member attends the event at the event venue, the event crowd member initiates execution of the personal safety system application 108 on his/her mobile device 110. Then, at step 4332, the personal safety system application 108 determines the then current geo-location for event crowd member and communicates the same to the personal safety system manager software 104 and data/communication manager 102. The personal safety system manager software 104 then identifies, at step 4334, the event and event venue by comparing the event crowd member's geo-location and other information such as, but not limited to, the current day and time to event venue data (including, but not limited to, the geo-locations of event venues) previously stored in the personal safety system database 106 for all event venues.

Proceeding to step 4336 of method 4300, the personal safety system application 108 again determines the then current geo-location of the event crowd member's mobile device 110 and communicates data corresponding to the geo-location to the personal safety system manager software 104 at a data/communication manager 102. Then, at step 4338, the personal safety system 100 retrieves from the personal safety system database 106 and causes the display of map data, alert data and emergency data for the event venue and event on the event crowd member's mobile device 110 via the home page graphical user interface of the personal safety system application 108. Through such display, the personal safety system 100 graphically provides the location of (generally, via the display of markers or symbols superimposed on the event venue's map at the geo-locations corresponding to such alerts and emergencies) and information pertaining to, alerts and emergencies in and around the event venue with respect to the event crowd member's then current geo-location. The personal safety system 100 also graphically provides, relative to the event crowd member's then current geo-location, the geo-locations of event venue exits, emergency exits, security offices, medical/paramedic facilities, restrooms, concession stands, and other facilities or things that may be helpful in improving the event crowd member's safety or in providing him/her with assistance.

Next, at step 4340, the personal safety system application 108 receives an input and/or selection from the personal safety system application 108 of the event crowd member's mobile device 110. At step 4342, the personal safety system application 108 decides if the received input and/or selection indicates the event crowd member's desire to create an alert or declare an emergency for an occurrence or situation at the event venue. If the received input and/or selection does not indicate that the event attendee desires to create an alert or declare an emergency, operation according to method 4300 loops back to step 4336 described above to again determine the event crowd member's then current geo-location. Alternatively, if the received input and/or selection indicates that the event crowd member desires to create an alert or declare an emergency, the personal safety system application 108 receives alert data or emergency data from the event crowd member at step 4344 that pertains to the alert or emergency situation using appropriate graphical user interfaces of the personal safety system application 108 as described in more detail above.

Advancing to step 4346 of method 4300, the personal safety system application 108 communicates the received alert data or emergency data to the personal safety system manager software 104 of a data/communication manager 102 of the personal safety system 100 which, in turn, directs and causes storing of the received alert data or emergency data in the personal safety system database 106. Then, at step 4348, the personal safety system 100 pushes an alert and/or emergency notification related to the alert or emergency situation to the communication devices of event safety, medical and/or security personnel and assistance providers. Through such alert and/or emergency notification, the personal safety system 100 rapidly informs the event safety, medical and/or security personnel and assistance providers of the alert or emergency situation so that they can respond appropriately.

Continuing at step 4350 of method 4300, the personal safety system 100 communicates voice, messages, images and/or videos related the alert or emergency situation between the event crowd member's mobile device 110 and the communication devices of event safety, medical and/or security personnel. Such voice, messages, images and/or videos allow event safety, medical and/or security personnel to better assess the alert or emergency situation and provide necessary and appropriate resources to address the alert or emergency situation. Subsequently, at step 4352, the personal safety system 100 communicates alert data and/or emergency data to social media websites and posts them on such websites in order to distribute information related to the underlying alert or emergency situation to other event crowd members and persons. After alert data and/or emergency data is communicated to social media websites, operation of the personal safety system 100 loops back to step 4336 to again determine the geo-location of the event attendee's mobile device 110.

Whereas the present invention has been described in detail above with respect to an example embodiment and configurations thereof, it should be appreciated that variations and modifications might be effected within the spirit and scope of the present invention.

What is claimed:

1. A method for searching a geographical area for a missing person or article, the method comprising the steps of:
    grouping a plurality of users into a search crowd and a search coordinator crowd;
    receiving information from one or more users in the search coordinator crowd defining a plurality of geographical sub-areas of a geographical area to be searched for the presence of a missing person or article;
    assigning a user in the search crowd having a mobile device to search a particular geographical sub-area based on the information received from the one or more users in the search coordinator crowd;
    continually determining the geographical location of the mobile device relative to the particular geographical sub-area; and
    displaying on the mobile device a map of the particular geographical sub-area and a marker on the map corresponding to the then current geographical location of the mobile device relative to the particular geographical sub-area.

2. The method of claim 1, wherein the method further comprises the steps of:
    identifying a first portion of the particular geographical sub-area already searched by the user in the search crowd and a second portion of the particular geographical sub-area not searched by the assigned user in the search crowd based at least on the then current geographical location of the mobile device, and displaying visual representations of the first and second portions on the map of the particular geographical sub-area.

3. The method of claim 1, wherein the method further comprises the steps of:
    detecting movement of the mobile device outside of the particular geographical sub-area; and
    alerting the user in the search crowd via the mobile device that the then current geographical location of the mobile device is outside of the particular geographical sub-area.

4. The method of claim 3, wherein the step of alerting comprises producing an audible spoken message.

5. The method of claim 3, wherein the step of alerting comprises producing an audible sound not corresponding to a spoken message.

6. The method of claim 3, wherein the step of alerting comprises generating a text message.

7. The method of claim 1, wherein the user in the search crowd comprises a first user in the search crowd and the particular geographical sub-area comprises a first particular geographical sub-area, and wherein the method further comprises the steps of:
    assigning a second user in the search crowd having a mobile device to search a second particular geographical sub-area;
    continually determining the geographical location of the mobile device of the second user in the search crowd relative to the second particular geographical sub-area; and
    tracking the portion of the first particular geographical sub-area searched by the first user in the search crowd and the portion of the second particular geographical sub-area searched by the second user in the search crowd.

8. The method of claim 1, further comprising:
    receiving information corresponding to structures and natural features; and
    dividing the geographic search area based on the information corresponding to the structures and natural features.

* * * * *